(12) United States Patent
Chang et al.

(10) Patent No.: US 10,353,183 B2
(45) Date of Patent: *Jul. 16, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Nai-Yuan Tang, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/926,112

(22) Filed: Mar. 20, 2018

(65) Prior Publication Data
US 2019/0033557 A1    Jan. 31, 2019

(30) Foreign Application Priority Data

Jul. 27, 2017    (TW) .............................. 106125351 A

(51) Int. Cl.
*G02B 13/00*    (2006.01)
*G02B 9/64*     (2006.01)
*G02B 3/04*     (2006.01)

(52) U.S. Cl.
CPC ........... *G02B 13/0045* (2013.01); *G02B 3/04* (2013.01); *G02B 9/64* (2013.01)

(58) Field of Classification Search
CPC ............... G02B 3/04; G02B 9/00–9/64; G02B 13/002–13/0045; G02B 13/18
USPC ................. 359/676–695, 708–718, 745–795
See application file for complete search history.

(56) References Cited

U.S. PATENT DOCUMENTS

| | | | |
|---|---|---|---|
| 7,675,694 B2* | 3/2010 | Kim ................... | G02B 13/0045 359/793 |
| 9,995,910 B1* | 6/2018 | Hudyma ................. | G02B 9/64 |
| 2017/0192200 A1* | 7/2017 | Hsieh ..................... | G02B 13/04 |
| 2017/0293110 A1* | 10/2017 | Kim ........................ | B60R 11/04 |
| 2018/0039049 A1* | 2/2018 | Lee .................... | G02B 13/0045 |
| 2018/0180844 A1* | 6/2018 | Fu ........................... | G02B 1/041 |
| 2018/0239117 A1* | 8/2018 | Lee ........................ | G02B 13/06 |

* cited by examiner

*Primary Examiner* — Nicholas R. Pasko
(74) *Attorney, Agent, or Firm* — Muncy, Geissler, Olds & Lowe, P.C.

(57) ABSTRACT

The invention discloses an eight-piece optical lens for capturing image and an eight-piece optical module for capturing image. In the order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; a seventh lens with refractive power; and an eighth lens with refractive power; and at least one of the image side and object side of each of the eight lens can be aspheric. The optical lens can increase aperture value and improve the imagining quality for use in compact cameras.

21 Claims, 30 Drawing Sheets

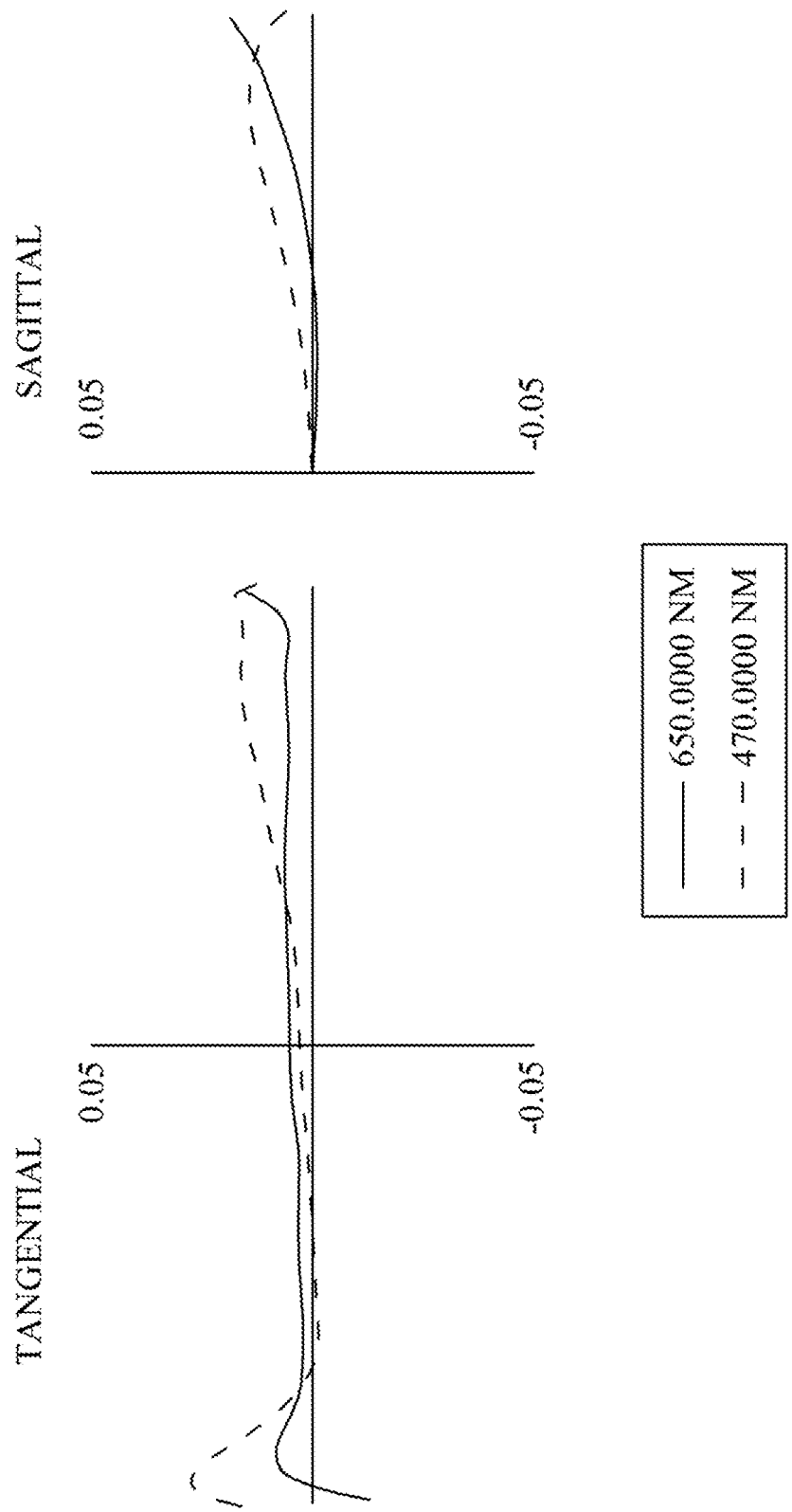

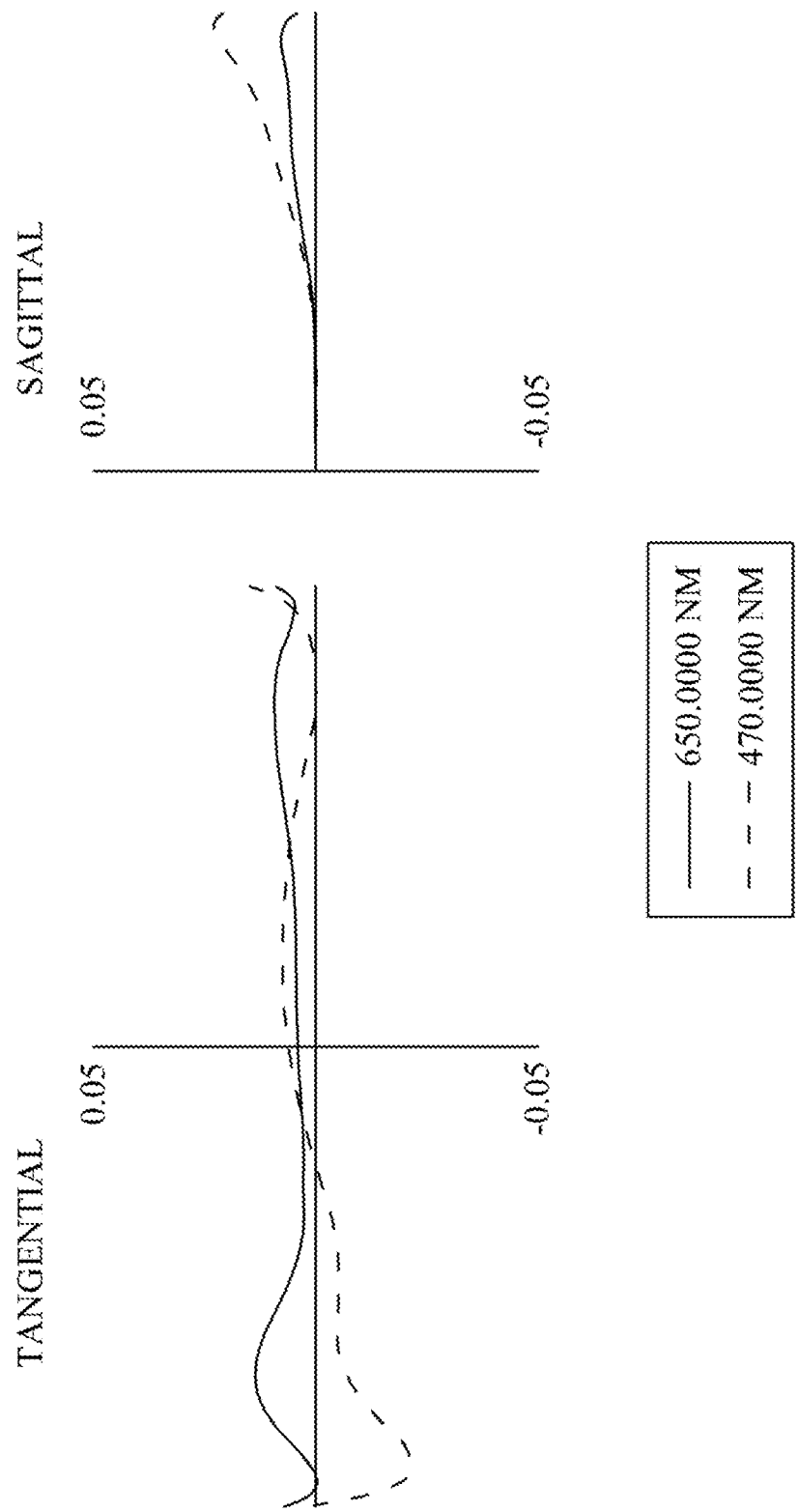

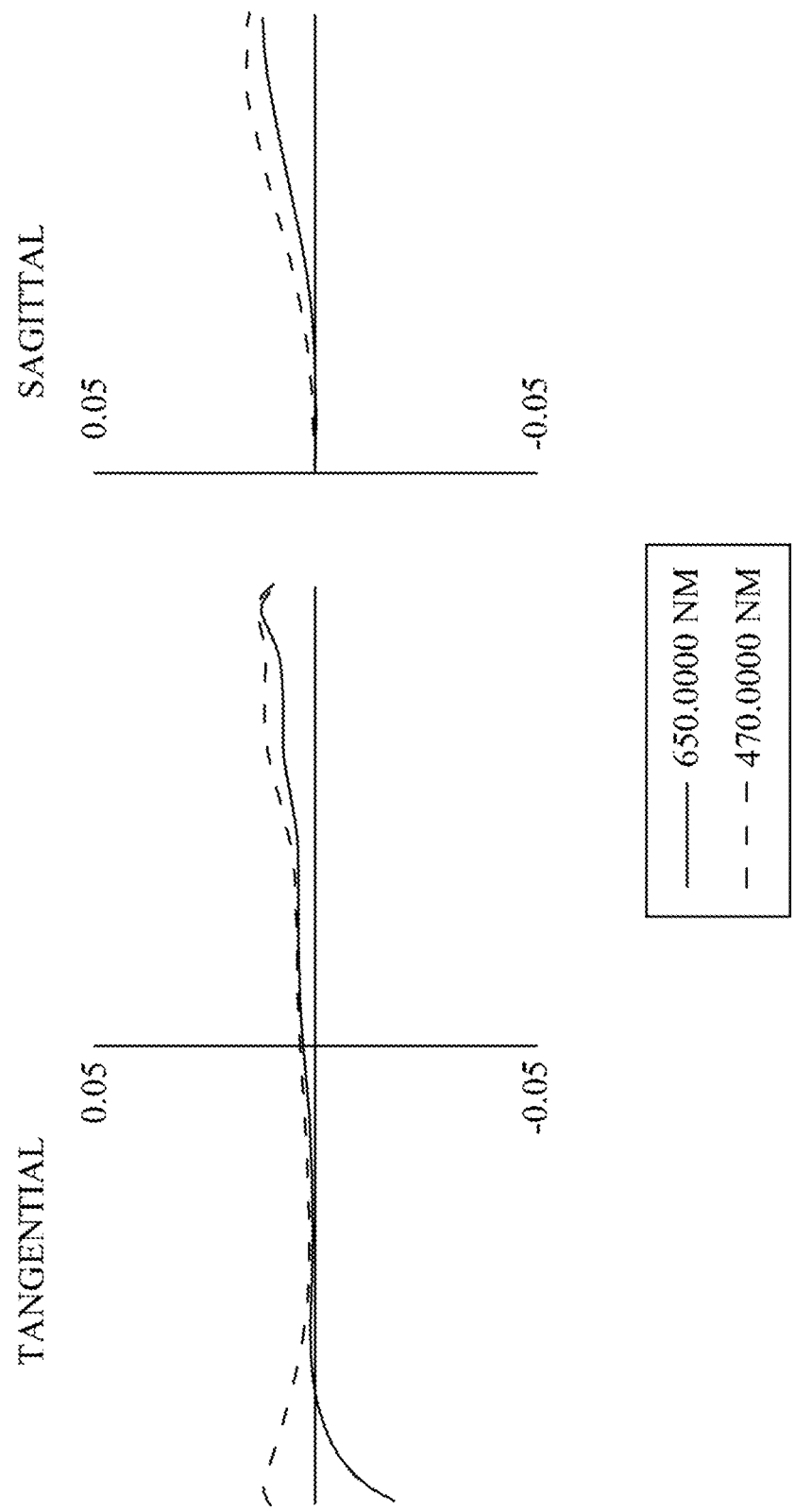

OPTICAL IMAGE CAPTURING SYSTEM

CROSS-REFERENCE TO RELATED APPLICATION

This application claims priority from Taiwan Patent Application No. 106125351, filed on Jul. 27, 2017, in the Taiwan Intellectual Property Office, the disclosure of which is hereby incorporated by reference in its entirety for all purposes.

BACKGROUND OF THE INVENTION

1. Field of the Invention

The present invention relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical system. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel field by degrees. Therefore, the demand of the quality of the image is daily increased.

Conventional optical systems of portable electronic devices usually adopt six lenses or seven lenses structure as main structure. However, since the pixel of the portable electronic devices continuously raises, and more end-users are demanding for cameras having large aperture, which is equipped with functionalities such as low light mode or night mode. The conventional optical image capturing systems may not be sufficient to meet those more advanced photography requirements.

Thereby, it is an important issue about how to effectively increase the amount of light admitted into the optical image capturing system and further elevate the image quality thereof.

SUMMARY OF THE INVENTION

The aspect of embodiment of the present invention directs to an optical image capturing system and an optical image capturing lens which use combination of refractive powers, convex surfaces and concave surfaces of eight lenses (the convex surface or concave surface in the present invention is the description of the change of geometrical shape of an object side or an image side of each lens at different heights from an optical axis in principle) to further increase the amount of light admitted into the optical image capturing system, and to improve quality of image formation, so as to be applied to minimized electronic products.

In addition, when it comes to certain application field of optical imaging, there will be a need to conduct the image formation with respect to light sources having the visible light wavelength and the infrared light wavelength, and an example of this kind of application is the IP video surveillance camera, which is equipped with the Day & Night function. The main reason is that the visible light spectrum for human vision is in the wavelength range from 400 to 700 nm, but the image formed on the camera sensor includes infrared light, which is invisible to human eyes. Therefore, based on the circumstances, an IR cut filter removable (ICR) is placed in front of the camera lens of the IP video surveillance camera in order to increase the "fidelity" of the image, which can not only prevent the infrared light and color shift at the daytime, but also allow the infrared light coming at night to elevate luminance. Nevertheless, the ICR elements occupy a significant amount of space and are expensive, which impede to the design and manufacture of miniaturized surveillance cameras in the future.

The type of embodiment of the present disclosure simultaneously directs to an optical image capturing system and an optical image capturing lens, which utilize the refractive power of eight lenses, combination of convex and concave surfaces as well as the selection of materials thereof, so as to make the image capturing system reduce the difference between the image focal length of visible light and the image focal length of infrared light, that is, to achieve the near "confocal" effect without the ICR elements.

The Lens Parameters Related to the Magnification Rate of the Optical Image Capturing System and the Optical Image Capturing Lens The optical image capturing system and the optical image capturing camera lens may be designed for the application of the biometric characteristics identification, for example, facial recognition. When the embodiment of the present invention is configured to capture image for facial recognition, the infrared light may be selected as the operation wavelength. At the same time a face of about 15 centimeters (cm) wide at a distance of 25-30 cm, at least 30 horizontal pixels can be formed in the horizontal direction of an photosensitive element (pixel size of 1.4 micrometers (μm)). The linear magnification of the infrared light of the image plane is LM, which meets the following conditions: LM=(30 horizontal pixels)*(1.4 m, pixel size)/(15 cm, width of the photographed object); LM≥0.0003. When the visible light is adopted as the operation wavelength, for a face of about 15 cm wide at a distance of 25-30 cm, at least 50 horizontal pixels can be formed in the horizontal direction of a photosensitive element (pixel size of 1.4 micrometers (μm)).

The terms together with their numerals for the lens parameters related to the embodiment of the present disclosure are provided in the following paragraphs for reference to subsequent descriptions:

Regarding the visible light spectrum, the present disclosure may select the wavelength of 555 nm as the primary reference wavelength and the basis for the measurement of focus shift; while regarding the infrared light spectrum (700-1000 nm), the present disclosure may select the wavelength of 850 nm as the primary reference wavelength and the basis for the measurement of focus shift.

The optical image capturing system may have a first image plane and a second image plane. The first image plane which is perpendicular to the optical axis is an image plane specifically for visible light, and the through focus modulation transfer rate (value of MTF) at the first spatial frequency has a maximum value at the central field of view of the first image plane; and the second image plane which is perpendicular to the optical axis is an image plane specifically for infrared light, and the through focus modulation transfer rate (value of MTF) at the first spatial frequency has a maximum value at the central field of view of the second image plane. The optical image capturing system may further have a first average image plane and a second average image plane. The first average image plane which is perpendicular to the optical axis is an image plane specifically for visible light. And the first average image plane is disposed at the average position of the defocusing positions, where the values of MTF of the visible light at the central field of view, 0.3 field of view, and the 0.7 field of view of the optical image capturing system are at their respective maximum at the first spatial frequency. The second average image plane which is perpendicular to the optical axis is an image plane specifically for infrared light. The second average image plane is disposed at the average position of the defocusing positions, where the values of MTF of the infrared light at the central field of view, 0.3 field of view, and the 0.7 field of view of the optical image capturing system are at their respective maximum at the first spatial frequency.

The aforementioned first spatial frequency is set to be an half spatial frequency (half frequency) of the image sensing device (sensor) used in the present disclosure. For example, for an image sensing device including the pixel size of 1.12 µm or less, the quarter spatial frequency, half spatial frequency (half frequency) and full spatial frequency (full frequency) in the characteristic diagram of modulation transfer function thereof are at least 110 cycles/mm, 220 cycles/mm and 440 cycles/mm, respectively. Lights of any field of view may be further divided into the sagittal ray and the tangential ray.

The focus shifts, where the through focus MTF values of the visible sagittal ray at the central field of view, 0.3 field of view, and 0.7 field of view of the optical image capturing system are at their respective maxima, are respectively expressed as VSFS0, VSFS3, and VSFS7 (unit of measurement: mm). The maximum values of the through focus MTF of the visible sagittal ray at the central field of view, 0.3 field of view, and 0.7 field of view are respectively expressed as VSMTF0, VSMTF3, and VSMTF7. The focus shifts, where the through focus MTF values of the visible tangential ray at the central field of view, 0.3 field of view, and 0.7 field of view of the optical image capturing system are at their respective maxima, are respectively expressed as VTFS0, VTFS3, and VTFS7 (unit of measurement: mm). The maximum values of the through focus MTF of the visible tangential ray at the central field of view, 0.3 field of view, and 0.7 field of view are respectively expressed as VTMTF0, VTMTF3, and VTMTF7. The average focus shift (position) of both of the aforementioned focus shifts of the visible sagittal ray at three fields of view and focus shifts of the visible tangential ray at three fields of view is expressed as AVFS (unit of measurement: mm), which meets the absolute value |(VSFS0+VSFS3+VSFS7+VTFS0+VTFS3+VTFS7)/6|.

The focus shifts where the through focus MTF values of the infrared sagittal ray at the central field of view, 0.3 field of view, and 0.7 field of view of the optical image capturing system are at their respective maxima are respectively expressed as ISFS0, ISFS3, and ISFS7. The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view, and 0.7 field of view are respectively expressed as ISMTF0, ISMTF3, and ISMTF7. The focus shifts where the through focus MTF values of the infrared tangential ray at the central field of view, 0.3 field of view, and 0.7 field of view of the optical image capturing system are at their respective maxima are respectively expressed as ITFS0, ITFS3, and ITFS7 (unit of measurement: mm). The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are respectively expressed as ITMTF0, ITMTF3, and ITMTF7. The average focus shift (position) of both of the aforementioned focus shifts of the infrared sagittal ray at the three fields of view and focus shifts of the infrared tangential ray at the three fields of view is expressed as AIFS (unit of measurement: mm), which meets the absolute value of |(ISFS0+ISFS3+ISFS7+ITFS0+ITFS3+ITFS7)/6|.

The focus shift between the focal points of the visible light and the focal points of the infrared light at their central fields of view (RGB/IR) of the entire optical image capturing system (i.e. wavelength of 850 nm versus wavelength of 555 nm, unit of measurement: mm) is expressed as FS, which meets the absolute value (VSFS0+VTFS0)/2−(ISFS0+ITFS0)/2. The difference (focus shift) between the average focus shift of the visible light at the three fields of view and the average focus shift of the infrared light at the three fields of view (RGB/IR) of the entire optical image capturing system is expressed as AFS (i.e. wavelength of 850 nm versus wavelength of 555 nm, unit of measurement: mm), which meets the absolute value of |AIFS−AVFS|.

The Lens Parameter Related to the Length or the Height

The maximum image height of the optical image capturing system is expressed as HOI. The height of the optical image capturing system is expressed as HOS. The distance from the object side of the first lens of the optical image capturing system to the image side of the eighth lens of the optical image capturing system is expressed as InTL. The distance from a fixed aperture (stop) of the optical image capturing system to the first image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material A coefficient of dispersion of the first lens in the optical image capturing system is expressed as NA1 (example); a refractive index of the first lens is expressed as Nd1 (example).

The Lens Parameter Related to Angle of View

An angle of view is expressed as AF. A half angle of view is expressed as HAF. An angle of a chief ray is expressed as MRA.

The Lens Parameter Related to the Exit/Entrance Pupil

An entrance pupil diameter of the optical image capturing system is expressed as HEP. The maximum effective half diameter (EHD) of any surface of a single lens refers to a vertical height between the optical axis and an intersection point, where the incident ray at the maximum angle of view passing through the most marginal entrance pupil intersects with the surface of the lens. For example, the maximum effective half diameter of the object side of the first lens is expressed as EHD11. The maximum effective half diameter of the image side of the first lens is expressed as EHD 12. The maximum effective half diameter of the object side of the second lens is expressed as EHD21. The maximum effective half diameter of the image side of the second lens is expressed as EHD22. The maximum effective half diameters of any surfaces of other lens in the optical image capturing system are expressed in the similar way.

The Lens Parameter Related to the Arc Length of the Lens Shape and the Outline of Surface of the Lens The outline curve length of the maximum effective half diameter of any surface of single lens refers to an arc length of a curve, which starts from a starting point which is an intersection point on the surface of the lens crossing the optical axis of the optical image capturing system, travels along the surface outline of the lens, and ends at a final point which is the maximum effective half diameter position of the surface and to the arc length between the aforementioned two points is the outline curve length of the maximum effective half diameter, and denoted as ARS. For example, the length of the maximum effective half diameter outline curve of the object side of the first lens is denoted as ARS11. The length of the maximum effective half diameter outline curve of the image side of the first lens is denoted as ARS12. The length of the maximum effective half diameter outline curve of the object side of the second lens is denoted as ARS21. The length of the maximum effective half diameter outline curve of the image side of the second lens is denoted as ARS22. The outline curve lengths of the maximum effective half diameter of any surface of the other lenses in the optical image capturing system are denoted according to the regular pattern shown above.

The outline curve length of ½ entrance pupil diameter (HEP) of any surface of single lens refers to an arc length of curve, which starts from a starting point which is an intersection point on the surface of the lens crossing the optical axis of the optical image capturing system, travels along the surface outline of the lens, and ends at a coordinate point on the surface having a vertical height of ½ entrance pupil diameter from the optical axis. The arc length between the aforementioned two points is the outline curve length of the ½ entrance pupil diameter (HEP), and denoted as ARE. For example, the outline curve length of the ½ entrance pupil diameter (HEP) of the object side of the first lens is denoted as ARE11. The outline curve length of the ½ entrance pupil diameter (HEP) of the image side of the first lens is denoted as ARE12. The outline curve length of the ½ entrance pupil diameter (HEP) of the object side of the second lens is denoted as ARE21. The outline curve length of the ½ entrance pupil diameter (HEP) of the image side of the second lens is denoted as ARE22. The outline curve lengths of the ½ entrance pupil diameter (HEP) of any surface of the other lenses in the optical image capturing system are denoted according to the regular pattern shown above.

The Lens Parameter Related to the Surface Depth of the Lens

The distance paralleling the optical axis, which is measured from the intersection point where the object side of the eighth lens crosses the optical axis to the terminal point of the maximum effective half diameter of the object side of the eighth lens is expressed as InRS81 (depth of the EHD). The distance paralleling an optical axis, which is measured from the intersection point where the image side of the eighth lens crosses the optical axis to the terminal point of the maximum effective half diameter of the image side of the eighth lens is expressed as InRS82 (depth of the EHD). The depths of the EHD (sinkage values) on the object side or the image side of other lens are expressed in similar way.

The Lens Parameter Related to the Shape of the Lens

The critical point C is a point which is tangential to the tangential plane and perpendicular to the optical axis on the specific surface of the lens except that an intersection point which crosses the optical axis on the specific surface of the lens. In addition to the description above, for example, the perpendicular distance between the critical point C51 on the object side of the fifth lens and the optical axis is HVT51 (example). The perpendicular distance between a critical point C52 on the image side of the fifth lens and the optical axis is HVT52 (example). The perpendicular distance between the critical point C61 on the object side of the sixth lens and the optical axis is HVT61 (example). The perpendicular distance between a critical point C62 on the image side of the sixth lens and the optical axis is HVT62 (example). The perpendicular distances between the critical point on the image side or object side of other lens such as the eighth lens and the optical axis are expressed in similar way.

The inflection point on the object side surface of the eighth lens that is nearest to the optical axis is expressed as IF811, and the sinkage value of that inflection point IF811 is expressed as SGI811 (example). That is, the sinkage value SGI811 is a horizontal distance paralleling the optical axis, which is measured from the intersection point where the object side of the eighth lens crosses the optical axis to the inflection point nearest to the optical axis on the object side of the eighth lens. The perpendicular distance between the inflection point IF811 and the optical axis is HIFS11 (example). The inflection point on the image side of the eighth lens that is nearest to the optical axis is expressed as IF821, and the sinkage value of the inflection point IF821 is expressed as SGI821 (example). That is, the sinkage value SGI821 is a horizontal distance paralleling the optical axis, which is measured from the intersection point where the image side of the eighth lens crosses the optical axis to the inflection point nearest to the optical axis on the image side of the eighth lens. The perpendicular distance between the inflection point IF821 and the optical axis is HIF821 (example).

The inflection point on object side of the eighth lens that is second nearest to the optical axis is expressed as IF812, and the sinkage value of the inflection point IF812 is expressed as SGI812 (example). That is, the sinkage value SGI812 is a horizontal distance paralleling the optical axis, which is measured from the intersection point where the object side of the eighth lens crosses the optical axis to the inflection point second nearest to the optical axis on the object side of the eighth lens. The perpendicular distance between the inflection point IF812 and the optical axis is HIF812 (example). The inflection point on image side of the eighth lens that is second nearest to the optical axis is expressed as IF822, and the sinkage value of that inflection point IF822 is expressed as SGI822 (example). That is, the sinkage value SGI822 is a horizontal distance paralleling the optical axis, which is measured from the intersection point where the image side of the eighth lens crosses the optical axis to the inflection point second nearest to the optical axis on the image side of the eighth lens. The perpendicular distance between the inflection point IF822 and the optical axis is HIF822 (example).

The inflection point on the object side of the eighth lens that is third nearest to the optical axis is expressed as IF813, and the sinkage value of the inflection point IF813 is expressed as SGI813 (example). That is, the sinkage value SGI813 is a horizontal distance paralleling the optical axis, which is measured from the intersection point where the object side of the eighth lens crosses the optical axis to the inflection point third nearest to the optical axis on the object side of the eighth lens. The perpendicular distance between the inflection point IF813 and the optical axis is HIF813 (example). The inflection point on the image side of the eighth lens that is third nearest to the optical axis is expressed as IF823, and the sinkage value of the inflection point IF823 is expressed as SGI823 (example). That is, the sinkage value SGI823 is a horizontal distance paralleling the optical axis, which is measured from the intersection point where the image side of the eighth lens crosses the optical axis to the inflection point third nearest to the optical axis on the image side of the eighth lens. The perpendicular distance between the inflection point IF823 and the optical axis is HIF823 (example).

The inflection point on the object side of the eighth lens that is fourth nearest to the optical axis is expressed as IF814, and the sinkage value of the inflection point IF814 is expressed as SGI814 (example). That is, the sinkage value SGI814 is a horizontal distance paralleling the optical axis, which is measured from the intersection point where the object side of the eighth lens crosses the optical axis to the inflection point fourth nearest to the optical axis on the object side of the eighth lens. The perpendicular distance between the inflection point IF814 and the optical axis is HIF814 (example). The inflection point on the image side of the eighth lens that is fourth nearest to the optical axis is expressed as IF824, and the sinkage value of the inflection point IF824 is expressed as SGI824 (example). That is, the sinkage value SGI824 is a horizontal distance paralleling the optical axis, which is measured from the intersection point where the image side of the eighth lens crosses the optical axis to the inflection point fourth nearest to the optical axis on the image side of the eighth lens. The perpendicular distance between the inflection point IF824 and the optical axis is HIF824 (example).

The inflection points on the object side or the image side of the other lens and the perpendicular distances between the foregoing inflection points and the optical axis, or the sinkage values of the foregoing inflection points are expressed in the similar way.

The Lens Parameter Related to the Aberration

Optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the image formation. The offset of the spherical aberration is expressed as DFS. The offset of the coma aberration is expressed as DFC.

The transverse aberration of the edge of the aperture is denoted as STOP Transverse Aberration (STA) and assesses the performance of specific optical image capturing system. The tangential fan or sagittal fan may be utilized to calculate the transverse aberration at any field of view. Specifically, the transverse aberration at the longest operation wavelength (for instance, the wavelength is 650 nm) and the shortest operation wavelength (for instance, the wavelength is 470 nm) respectively passing through the margin of the aperture is calculated to serve as the standard of the performance. The aforementioned coordinate direction of the tangential fan can be further divided into the positive direction (the upper ray) and the negative direction (the lower ray). The transverse aberration at the longest operation wavelength passing through the margin of the aperture defines the distance difference between the image position at the specific field of view where the longest operation wavelength passes through the margin of the aperture and projects onto the first image plane and the image position at the specific field of view where the chief ray of the reference wavelength (for instance, the wavelength is 555 nm) projects onto the first image plane. The transverse aberration at the shortest operation wavelength passing through the margin of the aperture defines the distance difference between the image position at the specific field of view where the shortest operation wavelength passes through the margin of the aperture and projects onto the first image plane and the image position at the specific field of view where the chief ray of the reference wavelength (for instance, the wavelength is 555 nm) projects onto the first image plane. To evaluate the performance of the specific optical image capturing system, we can utilize that the transverse aberration at the 0.7 field of view (i.e., the 0.7 height of an image HOI) where the longest operation wavelength passes through the margin of the aperture and projects onto the first image plane and the transverse aberration at the 0.7 field of view (i.e., the 0.7 height of an image HOI) where the shortest operation wavelength passes through the margin of the aperture and projects onto the first image plane (i.e., the 0.7 height of an image HOI) both are less than 100 µm as a way of the examination. Even further, the way of the examination can be that the transverse aberration at the 0.7 field of view where the longest operation wavelength passes through the margin of the aperture and projects onto the first image plane and the transverse aberration at the 0.7 field of view where the shortest operation wavelength passes through the margin of the aperture and projects onto the first image plane are both less than 80 µm.

The optical image capturing system has a maximum image height HOI perpendicular to the optical axis on the first image plane. A transverse aberration of the longest operation wavelength of visible light of a positive direction tangential fan of the optical image capturing system passing through an edge of the entrance pupil and incident at the position of 0.7 HOI on the first image plane is denoted as PLTA. A transverse aberration of the shortest operation wavelength of visible light of the positive direction tangential fan of the optical image capturing system passing through the edge of the entrance pupil and incident at the position of 0.7 HOI on the first image plane is denoted as PSTA. A transverse aberration of the longest operation wavelength of visible light of a negative direction tangential fan of the optical image capturing system passing through the edge of the entrance pupil and incident at the position of 0.7 HOI on the first image plane is denoted as NLTA. A transverse aberration of the shortest operation wavelength of visible light of a negative direction tangential fan of the optical image capturing system passing through the edge of the entrance pupil and incident at the position of 0.7 HOI on the first image plane is denoted as NSTA. A transverse aberration of the longest operation wavelength of visible light of a sagittal fan of the optical image capturing system passing through the edge of the entrance pupil and incident at the position of 0.7 HOI on the first image plane is denoted as SLTA. A transverse aberration of the shortest operation wavelength of visible light of the sagittal fan of the optical image capturing system passing through the edge of the entrance pupil and incident at the position of 0.7 HOI on the first image plane is denoted as SSTA.

The present invention provides the optical image capturing system, which is capable of focusing with respect to the visible light and the infrared light (dual-mode) and achieving certain performance respectively. The object side or the image side of the eighth lens of the optical image capturing system is disposed with the inflection points which can adjust each angle of view incident at the eighth lens and conduct amendment for the optical distortion and TV distortion. Besides, the surface of the eighth lens can be provided with the function of the preferable adjustment about the optical path so as to elevate the quality of the image.

The present invention provides an optical image capturing system, from an object side to an image side, comprising: a first lens, a second lens, a third lens, a fourth lens, a fifth lens, a sixth lens, a seventh lens, an eighth lens, a first image plane and a second image plane. A first image plane is an image plane specifically for visible light and perpendicular to an optical axis, and a through focus modulation transfer rate (MTF) at a central field of view of the first image plane has a maximum value at a first spatial frequency; and a second image plane is an image plane specifically for infrared light and perpendicular to the optical axis, and a through focus modulation transfer rate (MTF) at the central field of view of the second image plane has a maximum value at the first spatial frequency. All lenses among the first lens to the eighth lens have refractive power. Focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from an object side of the first lens to the first image plane is denoted as HOS. A half maximum angle of view of the optical image capturing system is denoted as HAF. The optical image capturing system has a maximum image height HOI perpendicular to the optical axis on the first image plane. The distance on the optical axis between the first image plane and the second image plane is denoted as FS. Conditions as follows are satisfied: I≤f/HEP≤10, 0 deg<HAF≤60 deg and |FS|≥100 μm.

The present invention provides another optical image capturing system, from an object side to an image side, comprising: a first lens, a second lens, a third lens, a fourth lens, a fifth lens, a sixth lens, a seventh lens, an eighth lens, a first image plane and a second image plane. A first image plane is an image plane specifically for visible light and perpendicular to an optical axis, and a through focus modulation transfer rate (MTF) at a central field of view of the first image plane has a maximum value at a first spatial frequency; while a second image plane is an image plane specifically for infrared light and perpendicular to the optical axis, and a through focus modulation transfer rate (MTF) at the central field of view of the second image plane has a maximum value at the first spatial frequency. The first lens has refractive power. The second lens has refractive power. The third lens has refractive power. The fourth lens has refractive power. The fifth lens has refractive power. The sixth lens has refractive power. The seventh lens has refractive power. The eighth lens has refractive power. At least one lens among the first lens to the eighth lens is made of plastic. The optical image capturing system has a maximum image height HOI perpendicular to the optical axis on the first image plane. At least one lens among the first lens to the eighth lens has positive refractive power. The focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from an object side of the first lens to the first image plane is denoted as HOS. A half maximum angle of view of the optical image capturing system is denoted as HAF. The optical image capturing system has a maximum image height HOI perpendicular to the optical axis on the first image plane. The distance on the optical axis between the first image plane and the second image plane is denoted as FS. The outline curve starting from an intersection point of the optical axis and any surface of any one of the eight lenses, travelling along an outline of the surface, and ending at a coordinate point on the surface which has a vertical height of ½ entrance pupil diameter from the optical axis, has an outline curve length denoted as ARE. Conditions as follows are satisfied: 1.0≤f/HEP≤10.0, 0 deg<HAF≤60 deg, 0.9≤2(ARE/HEP)≤2.0 and |FS|≤100 m.

The present invention provides one more optical image capturing system, from an object side to an image side, comprising: a first lens, a second lens, a third lens, a fourth lens, a fifth lens, a sixth lens, a seventh lens, an eighth lens, a first average image plane and a second average image plane. A first average image plane which is perpendicular to the optical axis is an image plane specifically for visible light. And the first average image plane is disposed at the average position of the defocusing positions, where the values of MTF of visible light at the central field of view, the 0.3 field of view, and the 0.7 field of view of the optical image capturing system are at their respective maximum at the first spatial frequency. A second average image plane which is perpendicular to the optical axis is an image plane specifically for the infrared light. The second average image plane is disposed at the average position of the defocusing positions, where the values of MTF of the infrared light at the central field of view, the 0.3 field of view, and the 0.7 field of view of the optical image capturing system are at their respective maximum at the first spatial frequency. Wherein, the optical image capturing system has eight lenses with refractive power. The optical image capturing system has a maximum image height HOI perpendicular to the optical axis on the first image plane. The first lens has refractive power. The second lens has refractive power. The third lens has refractive power. The fourth lens has refractive power. The fifth lens has refractive power. The sixth lens has refractive power. The seventh lens has refractive power. The eighth lens has refractive power. At least one lens among the first lens to the eighth lens has positive refractive power. The focal lengths of the eight lenses are denoted as f1, f2, f3, f4, f5, ft, f7 and f8 respectively. A focal length of the optical image capturing system is denoted as f. The entrance pupil diameter of the optical image capturing system is denoted as HEP. The distance on the optical axis from the object side of the first lens to the first average image plane is denoted as HOS. A half maximum angle of view of the optical image capturing system is denoted as HAF. The optical image capturing system has a maximum image height HOI perpendicular to the optical axis on the first average image plane. The outline curve starting from an intersection point of the optical axis and any surface of any one of the eight lenses, travelling along an outline of the surface, and ending at a coordinate point on the surface which has a vertical height of ½ entrance pupil diameter from the optical axis, has an outline curve length denoted as ARE. The distance on the optical axis between the first average image plane and the second average image plane is denoted as AFS. Conditions as follows are satisfied: 1≤f/HEP≤10, 0 deg<HAF≤60 deg, 0.9≤2(ARE/HEP)≤2.0 and |AFS|≤100 μm.

The length of the outline curve of any surface of single lens within the range of maximum effective half diameter affects the capability of correcting the surface aberration and the optical path difference between the rays at each field of view. Longer outline curve length elevates the capability for aberration correction, but simultaneously increases the difficulty of production as well. Thereby, the length of the outline curve of any surface of single lens within the range of the maximum effective half diameter has to be controlled, and especially, the proportional relationship (ARS/TP) between the length of the outline curve (ARS) of the surface within the range of the maximum effective half diameter and the thickness (TP) of the lens to which the surface belongs on the optical axis has to be controlled. For example, the length of the maximum effective half diameter outline curve of the object side of the first lens is denoted as ARS11, and the thickness of the first lens on the optical axis is TP1, wherein the ratio between ARS11 and TP1 is ARS11/TP1. The length of the maximum effective half diameter outline curve of the image side of the first lens is denoted as ARS12, and the ratio between the ARS12 and TP1 is ARS12/TP1. The length of the maximum effective half diameter outline curve of the object side of the second lens is denoted as ARS21, and the thickness of the second lens on the optical axis is TP2, wherein the ratio between ARS21 and TP2 is ARS21/TP2. The length of the maximum effective half diameter outline curve of the image side of the second lens is denoted as ARS22, wherein the ratio between ARS22 and TP2 is ARS22/TP2. The proportional relationships between the lengths of the maximum effective half diameter outline curve of any surface of the other lenses of the optical image capturing system and the thicknesses (TP) of the other lenses to which the surfaces belong on the optical axis are denoted according to the regular pattern shown above.

The outline curve length within a range of ½ entrance pupil diameter height (HEP) of any surface of single lens specifically affects the capability of correcting the aberration in the shared region of each field of view on the surface and the correcting the optical path difference between the rays at each field of view. Longer outline curve length elevates the capability for aberration correction, but simultaneously increases the difficulty of production as well. Therefore, the outline curve length within a range of ½ entrance pupil diameter height (HEP) of any surface of single lens has to be controlled, and especially, the proportional relationship between the outline curve length within a range of ½ entrance pupil diameter height (HEP) of any surface of single lens and the thickness (TP) to which the surface belongs on the optical axis has to be controlled. For example, the outline curve length of the ½ entrance pupil diameter height (HEP) of the object side of the first lens is denoted as ARE11, and the thickness of the first lens on the optical axis is TP1, wherein the ratio between ARE11 and TP1 is ARE11/TP1. The outline curve length of the ½ entrance pupil diameter height (HEP) of the image side of the first lens is denoted as ARE12, wherein the ratio of the ARE 12 to TP1 is ARE12/TP. The outline curve length of the ½ entrance pupil diameter height (HEP) of the object side of the second lens is denoted as ARE21, and the thickness of the second lens on the optical axis is TP2, wherein the ratio between ARE21 and TP2 is ARE21/TP2. The outline curve length of the ½ entrance pupil diameter height (HEP) of the image side of the second lens is denoted as ARE22, wherein the ratio of the ARE22 to TP2 is ARE22/TP2. The proportional relationships between the outline curve lengths of the ½ entrance pupil diameter height (HEP) on any surface of the other lenses of the optical image capturing system and the thicknesses (TP) on the optical axis of the other lenses to which the surfaces belong are denoted according to the regular pattern shown above.

Besides, the eighth lens may have negative refractive power, and the image side surface of the eighth lens may be a concave surface. Hereby, this configuration is beneficial to shorten the back focal length of the optical image capturing system in order to keep the optical image capturing system minimized. Moreover, at least one surface of the eighth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the fourth embodiment of the present disclosure.

FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the fifth embodiment of the present disclosure.

FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the sixth embodiment of the present disclosure.

DESCRIPTION OF THE PREFERRED EMBODIMENTS

Figure 1A:
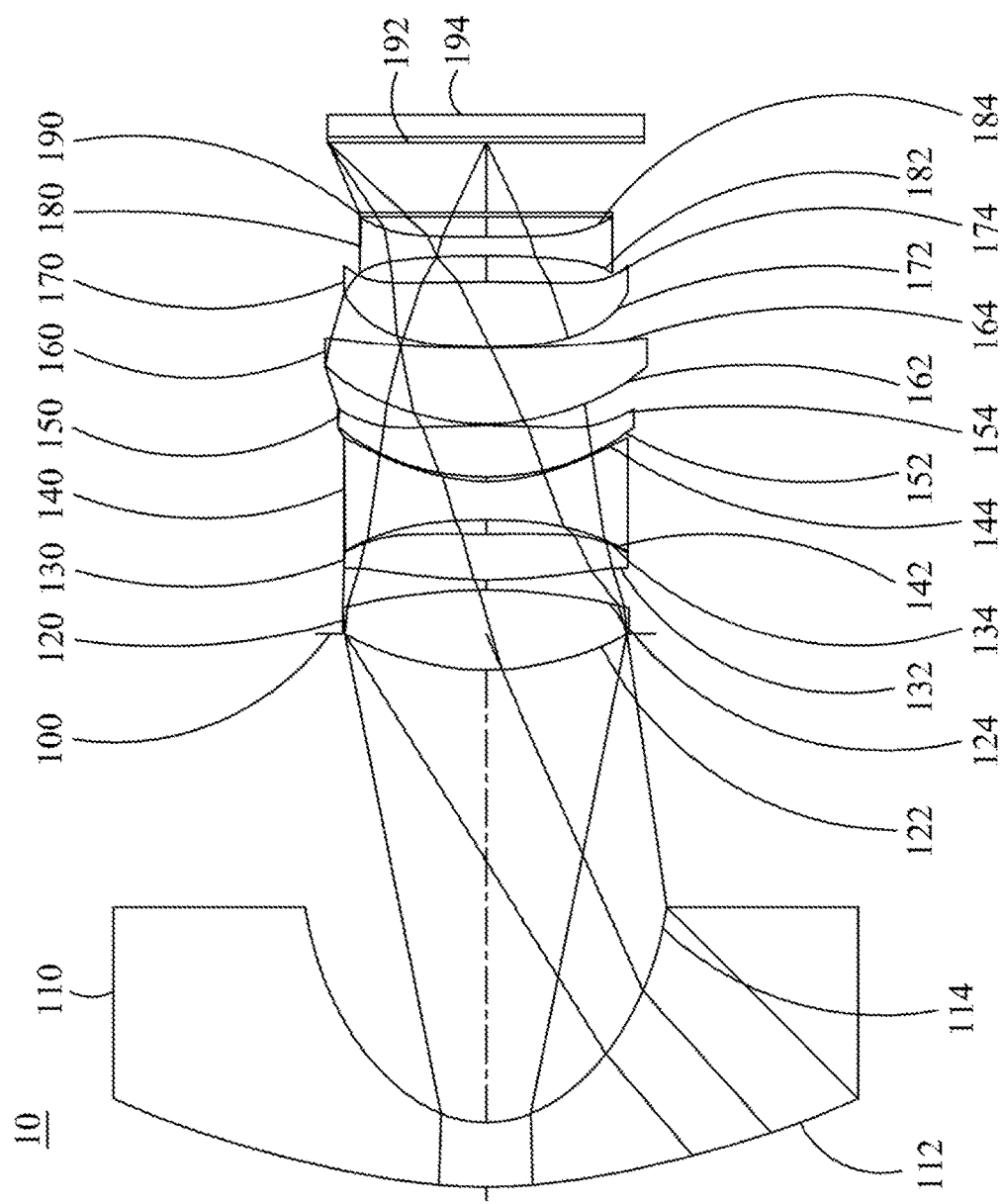
FIG. 1A is a schematic view of the optical image capturing system according to the first embodiment of the present invention.

An optical image capturing system, in the order from an object side to an image side, includes a first lens with refractive power, a second lens with refractive power, a third lens with refractive power, a fourth lens with refractive power, a fifth lens with refractive power, a sixth lens with refractive power, a seventh lens with refractive power, an eighth lens with refractive power, a first image plane and a second image plane. The optical image capturing system may further include an image sensing device, which is disposed on the first image plane.

The optical image capturing system may use three sets of operation wavelengths, which are respectively 486.1 nm, 587.5 nm and 656.2 nm, and 587.5 nm is served as the primary reference wavelength and a reference wavelength to obtain technical features of the optical image capturing system. The optical image capturing system may also use five sets of wavelengths which are respectively 470 nm, 510 nm, 555 nm, 610 nm and 650 nm, and 555 nm is served as the primary reference wavelength and a reference wavelength to obtain technical features of the optical image capturing system.

The optical image capturing system may further include an image sensing device which is disposed on the first image plane. A half diagonal of an effective detection field of the image sensing device (imaging height or the maximum image height of the optical image capturing system) is HOI. The distance on the optical axis from the object side of the first lens to the first image plane is HOS. The following conditions are met: $HOS/HOI \le 30$ and $0.5 \le HOS/f \le 30$. Preferably, the following conditions may be satisfied: $1 \le HOS/HOI \le 10$ and $1 \le HOS/f \le 10$. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and this configuration is helpful to elevate the image quality.

In the optical image capturing system of the present invention, the aperture may be a front or middle aperture. Wherein, the front aperture is the aperture disposed between a photographed object and the first lens while the middle aperture is the aperture disposed between the first lens and the first image plane. In the case that the aperture is the front aperture, it can make the optical image capturing system generate a longer distance between the exit pupil and the first image plane thereof, such that the optical image capturing system can accommodate more optical elements and the efficiency of the image sensing device in receiving image can be increased; In the case that the aperture is the middle aperture, it is helpful to expand the angle of view of the optical image capturing system, such that the optical image capturing system has an advantage of the wide angle camera lens. The distance from the foregoing aperture to the first image plane is InS. The following condition is met: $0.2 \leq InS/HOS \leq 1.5$. Therefore, the configuration can keep the optical image capturing system miniaturization with the character of wide angle of view at the same time.

In the optical image capturing system of the present invention, the distance from the object side of the first lens to the image side of the eighth lens is InTL. The sum of thicknesses of all lenses with refractive power on the optical axis is $\Sigma TP$. The following condition is met: $0.1 \leq \Sigma TP/InTL \leq 0.9$. Therefore, this configuration can keep the contrast ratio of the optical image capturing system and the yield rate about manufacturing lens at the same time, and provide the proper back focal length to accommodate other elements.

The distance between the first lens and the second lens on the optical axis is IN12. The following condition is satisfied: $IN12/f \leq 5.0$. Hereby, this configuration is helpful to improve the chromatic aberration of the lens in order to elevate their performance.

The distance between the seventh lens and the eighth lens on the optical axis is IN78. The following condition is satisfied: $IN78/f \leq 0.8$. Hereby, this configuration is helpful to improve the chromatic aberration of the lens in order to elevate their performance.

The thicknesses of the first lens and the second lens on the optical axis are TP1 and TP2, respectively. The following condition is satisfied: $0.1 \leq (TP1+IN12)/TP2 \leq 10$. Therefore, this configuration is helpful to control the sensitivity of the optical image capturing system, and improve the performance of the optical image capturing system.

The thicknesses of the seventh lens and the eighth lens on the optical axis are TP7 and TP8, respectively, and the distance between the foregoing two lens on the optical axis is IN78. The following condition are met: $0.1 \leq (TP8+N78)/TP7 \leq 10$. Therefore, this configuration is helpful to control the sensitivity of the optical image capturing system, and decrease the total height of the optical image capturing system.

The thicknesses of the third lens, fourth lens and fifth lens on the optical axis are TP3, TP4 and TP5, respectively. The distance between the third lens and the fourth lens on the optical axis is IN34. The distance between the fourth lens and the fifth lens on the optical axis is IN45. The distance between the object side of the first lens and the image side of the eighth lens is InTL. The following condition is met: $0.1 \leq TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a perpendicular distance between a critical point C81 on the object side of the eighth lens and the optical axis is HVT81. A perpendicular distance between a critical point C82 on the image side of the eighth lens and the optical axis is HVT82. A horizontal distance on the optical axis from an intersection point where the object side of the eighth lens crosses the optical axis to the critical point C81 is SGC81. A horizontal distance from an intersection point where the image side of the eighth lens crosses the optical axis to the critical point C82 on the optical axis is SGC82. The following conditions can be satisfied: 0 mm$\leq$HVT81$\leq$3 mm; 0 mm<HVT82$\leq$6 mm; 0$\leq$HVT81/HVT82; 0 mm$\leq$|SGC81|$\leq$0.5 mm; 0 mm<|SGC82|2 mm, and 0<|SGC82|/(|SGC82|+TP8)$\leq$0.9. Therefore, this configuration is helpful to correct the off-axis aberration effectively.

The optical image capturing system of the present invention meets the following condition: $0.2 \leq HVT82/HOI \leq 0.9$. Preferably, the following condition may be met: $0.3 \leq HVT82/HOI \leq 0.8$. Therefore, this configuration is helpful to correct the aberration of surrounding field of view for the optical image capturing system.

The optical image capturing system of the present invention may meet the following condition: $0 \leq HVT82/HOS \leq 0.5$. Preferably, the following condition can be satisfied: $0.2 \leq HVT82/HOS \leq 0.45$. Therefore, this configuration is helpful to correct the aberration of surrounding field of view for the optical image capturing system.

In the optical image capturing system of the present invention, the horizontal distance in parallel with the optical axis from an inflection point on the object side of the eighth lens that is nearest to the optical axis to an intersection point where the object side of the eighth lens crosses the optical axis is expressed as SGI811. The horizontal distance in parallel with the optical axis from an inflection point on the image side of the eighth lens that is nearest to the optical axis to an intersection point where the image side of the eighth lens crosses the optical axis is expressed as SGI821. The following conditions are satisfied: $0<SGI811/(SGI811+TP8) \leq 0.9$ and $0<SGI821/(SGI821+TP8) \leq 0.9$. Preferably, the following conditions may be met: $0.1 \leq SGI811/(SGI811+TP8) \leq 0.6$ and $0.1 \leq SGI821/(SGI821+TP8) \leq 0.6$.

The horizontal distance in parallel with the optical axis from the inflection point on the object side of the eighth lens that is second nearest to the optical axis to the intersection point where the object side of the eighth lens crosses the optical axis is expressed as SGI812. The horizontal distance in parallel with the optical axis from an inflection point on the image side of the eighth lens that is second nearest to the optical axis to an intersection point where the image side of the eighth lens crosses the optical axis is expressed as SGI822. The following conditions are satisfied: $0<SGI812/(SGI812+TP8) \leq 0.9$ and $0<SGI822/(SGI822+TP8) \leq 0.9$. Preferably, the following conditions may be satisfied: $0.1<SGI812/(SGI812+TP8) \leq 0.6$ and $0.1 \leq SGI822/(SGI822+TP8) \leq 0.6$.

The perpendicular distance between the inflection point on the object side of the eighth lens that is the nearest to the optical axis and the optical axis is expressed as HIF811. The distance perpendicular to the optical axis between an intersection point where the image side of the eighth lens crosses the optical axis and an inflection point on the image side of the eighth lens that is the nearest to the optical axis is expressed as HIF821. The following conditions are met: 0.001 mm$\leq$|HIF|$\leq$7.5 mm and 0.001 mm$\leq$|HIF821|$\leq$17.5 mm. Preferably, the following conditions may be satisfied: 0.1 mm$\leq$|HIF811|$\leq$5 mm and 0.1 mm$\leq$|HIF821|$\leq$5 mm.

The perpendicular distance between the inflection point on the object side of the eighth lens that is second nearest to the optical axis and the optical axis is expressed as HIF812. The distance perpendicular to the optical axis between an intersection point where the image side of the eighth lens crosses the optical axis and an inflection point on the image side of the eighth lens that is second nearest to the optical axis is expressed as HIF822. The following conditions are satisfied: 0.001 mm$\leq$|HIF812|$\leq$7.5 mm and 0.001 mm$\leq$|HIF822|$\leq$7.5 mm. Preferably, the following conditions may be satisfied: 0.1 mm$\leq$|HIF822|$\leq$6 mm and 0.1 mm$\leq$|HIF812|$\leq$0.6 mm.

The perpendicular distance between an inflection point on the object side of the eighth lens that is third nearest to the optical axis and the optical axis is expressed as HIF813. The distance perpendicular to the optical axis between an intersection point where the image side of the eighth lens crosses the optical axis and an inflection point on the image side of the eighth lens that is third nearest to the optical axis is expressed as HIF823. The following conditions are satisfied: 0.001 mm≤|HIF813|≤7.5 mm and 0.001 mm≤|HIF823|≤7.5 mm. Preferably, the following conditions may be satisfied: 0.1 mm≤|HIF823|≤7 mm and 0.1 mm≤|HIF813|≤7 mm.

The perpendicular distance between an inflection point on the object side of the eighth lens that is fourth nearest to the optical axis and the optical axis is expressed as HIF814. The distance perpendicular to the optical axis between the intersection point where the image side of the eighth lens crosses the optical axis and an inflection point on the image side of the eighth lens that is fourth nearest to the optical axis is expressed as HIF824. The following conditions are satisfied: 0.001 mm≤|HIF814|≤7.5 mm and 0.001 mm≤|HIF824|≤7.5 mm. Preferably, the following conditions may be satisfied: 0.1 mm≤|HIF824|≤7.25 mm and 0.1 mm|HIF814|≤7.25 mm.

In one embodiment of the optical image capturing system of the present invention, it can be helpful to correct the chromatic aberration of the optical image capturing system by arranging the lens with high coefficient of dispersion and low coefficient of dispersion in an interlaced manner.

The Aspheric equation for the lens can be represented by:

$$z=ch^2/[1+[I-(k+1)c^2h^2]^{0.5}]+A_4h^4+A_6h^6+A_8h^6+A_{10}h^{10}+A_{12}h^{12}+A_{14}h^{14}+A_{16}h^{16}+A_{18}h^{18}+A_{20}h^{20}+ \quad (1),$$

wherein z is a position value of the position along the optical axis and at the height h which refers to the surface apex; k is the cone coefficient, c is the reciprocal of curvature radius, and $A_4, A_6, A_8, A_{10}, A_{12}, A_{14}, A_{16}, A_{18}$, and $A_{20}$ are high order aspheric coefficients.

In the optical image capturing system provided by the present invention, the lens may be made of glass or plastic. If the lens is made of the plastic, it can reduce the cost of manufacturing as well as the weight of the lens effectively. If lens is made of glass, it can control the heat effect and increase the design space of the configuration of the lens with refractive powers in the optical image capturing system. Besides, the object side and the image side of the first lens through eighth lens may be aspheric, which can gain more control variables and even reduce the number of the used lens in contrast to the traditional glass lens in addition to the use of reducing the aberration. Therefore, the total height of the optical image capturing system can be reduced effectively.

Furthermore, in the optical image capturing system provided by the present disclosure, when the surface of lens is a convex surface, the surface of that lens is a convex surface in the vicinity of the optical axis in principle. When the surface of lens is a concave surface, the surface of that lens is a concave surface in the vicinity of the optical axis in principle.

The optical image capturing system of the present invention can be applied to the optical image capturing system with automatic focus based on the demand and have the characters of the good aberration correction and the good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the photographing.

In the optical image capturing system of the present invention, at least one lens among the first lens, second lens, third lens, fourth lens, fifth lens, sixth lens, seventh lens and eighth lens may further be a light filtering element for light with wavelength of less than 500 nm based on the design requirements. The light filtering element may be achieved by coating film on at least one surface of that lens with certain filtering function, or forming that lens with material that can filter light with short wavelength.

The first image plane or the second image plane of the optical image capturing system of the present invention may be a plane or a curved surface based on the design requirement. When the first image plane or the second image plane is a curved surface (e.g. a spherical surface with curvature radius), it is helpful to decrease the required incident angle that make the rays focus on the first image plane or the second image plane. In addition to the aid in achieving the miniaturization of the length of the optical image capturing system (TTL), this configuration is helpful to elevate the relative illumination at the same time.

According to the foregoing implementation method, the specific embodiments with figures are presented in detail as below.

The First Embodiment

Figure 1B:
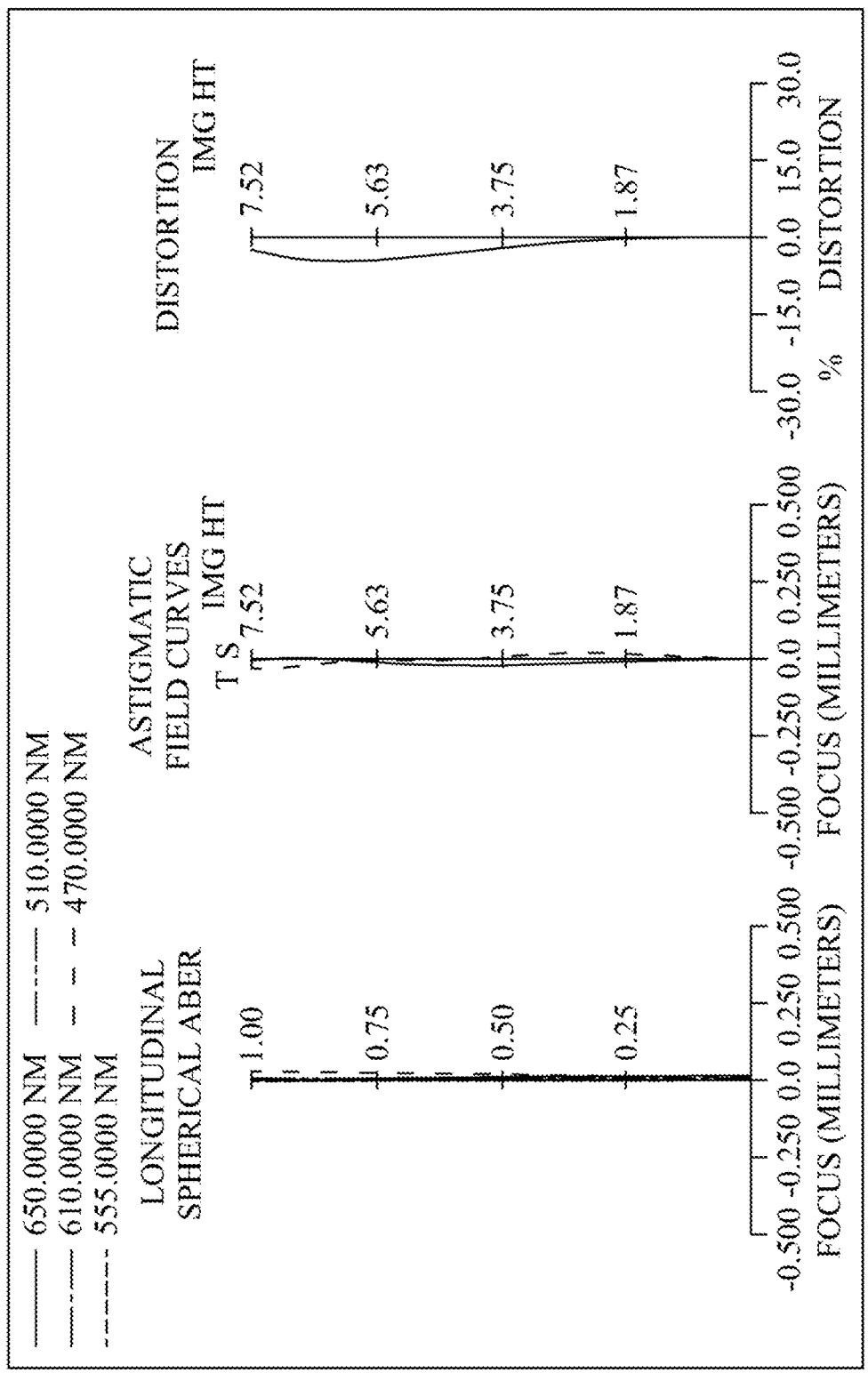
FIG. 1B shows the longitudinal spherical aberration curves, astigmatic field curves, and optical distortion curve of the optical image capturing system in the order from left to right according to the first embodiment of the present invention.
Figure 1C:
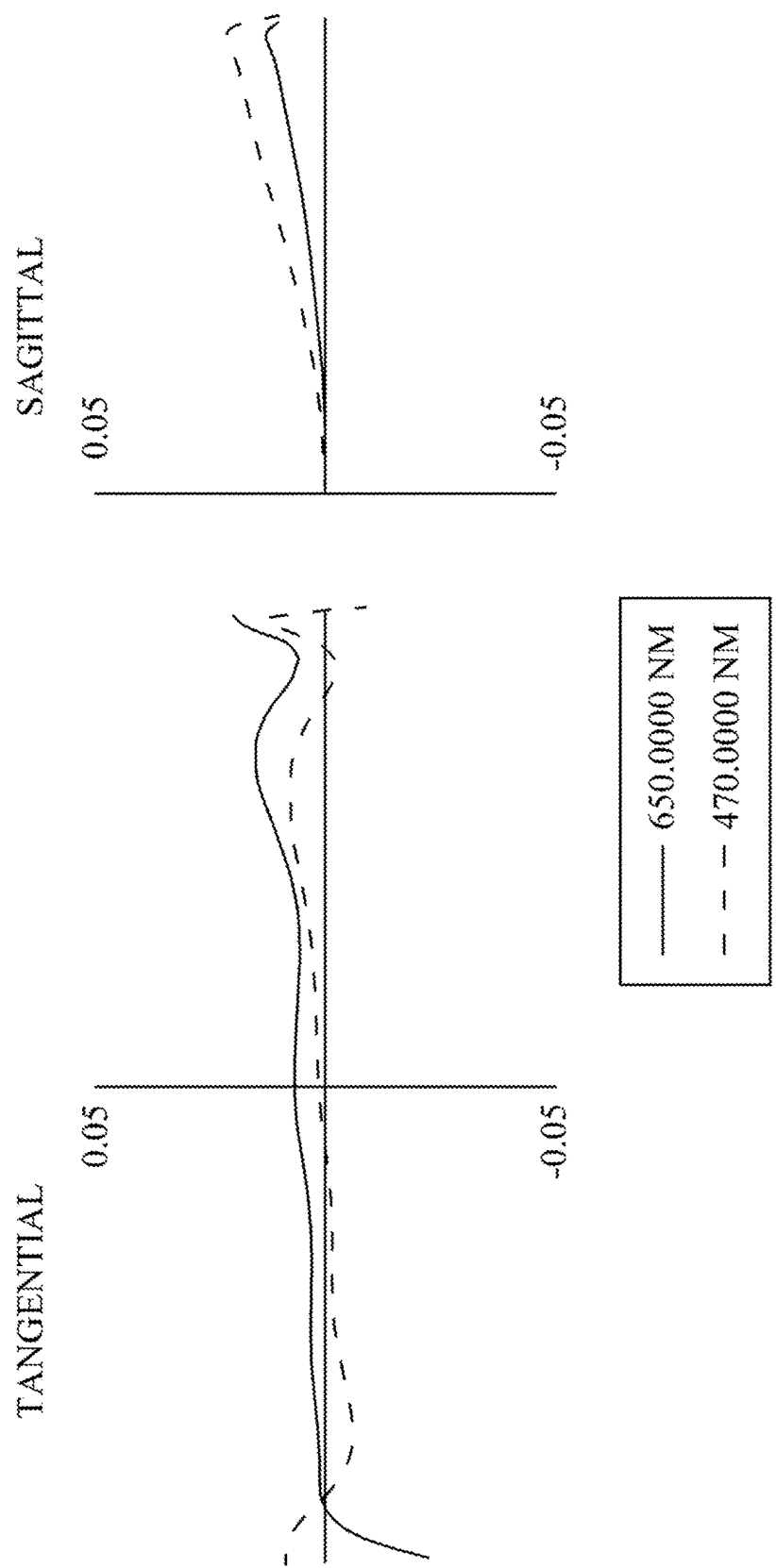
FIG. 1C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the first embodiment of the present disclosure.
Figure 1D:
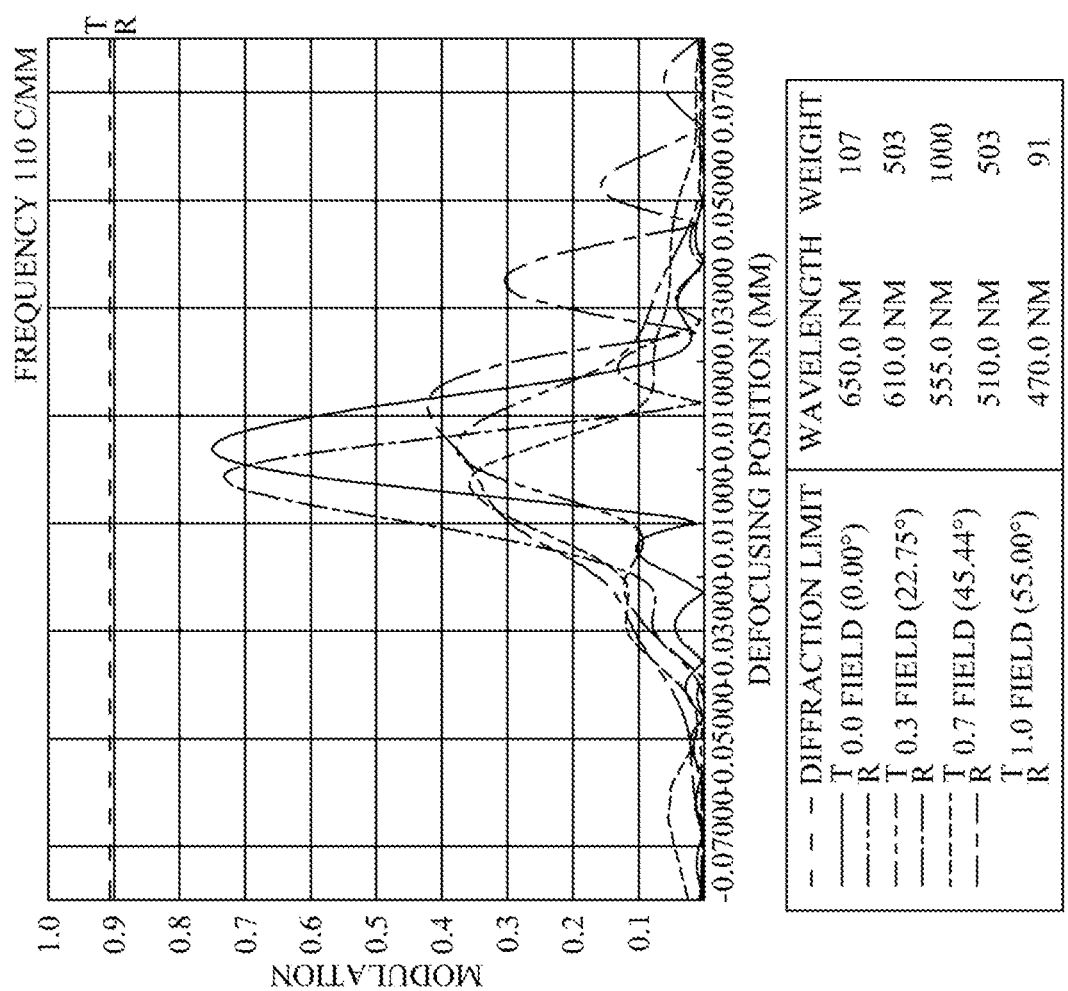
FIG. 1D is a diagram illustrating the through focus MTF values for the visible light spectrum at the central field of view, 0.3 field of view and 0.7 field of view according to the first embodiment of the present disclosure.
Figure 1E:
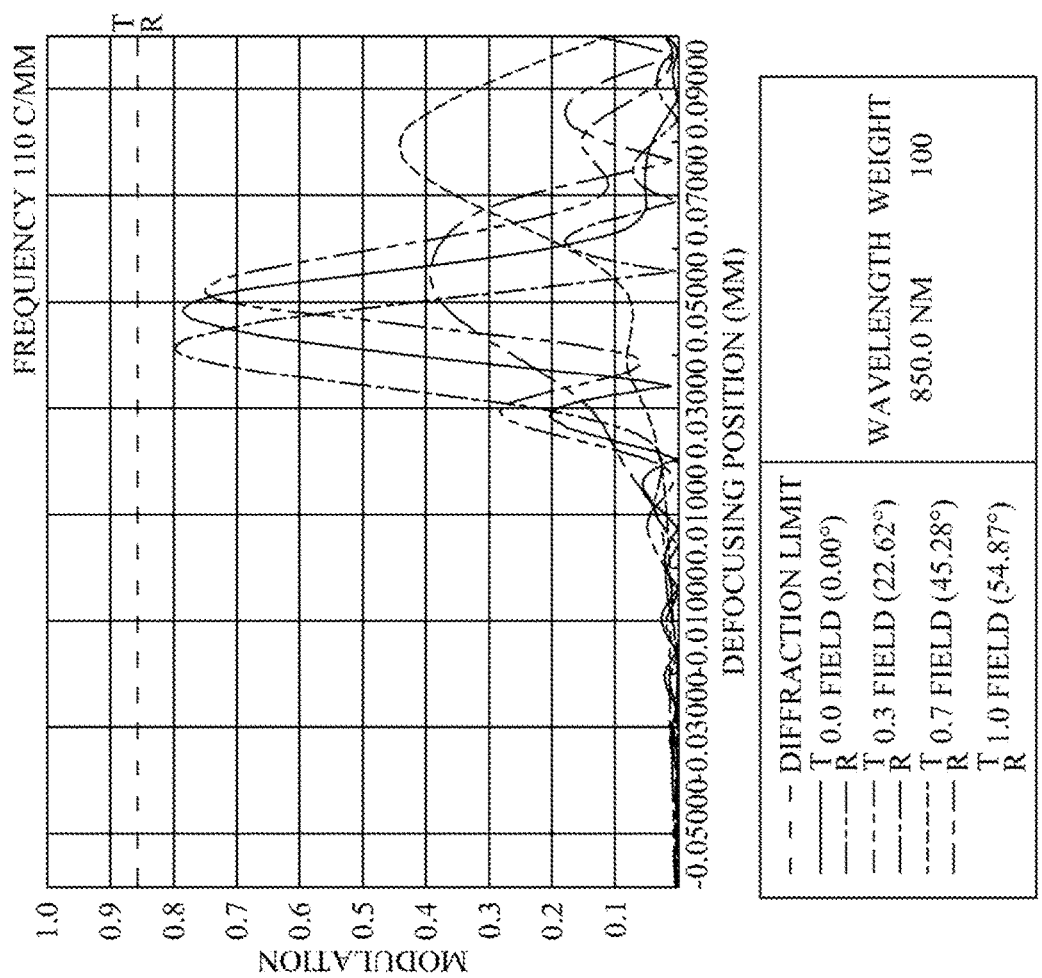
FIG. 1E is a diagram illustrating the through focus MTF values for the infrared light spectrum at the central field of view, 0.3 field of view and 0.7 field of view according to the first embodiment of the present disclosure.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the first embodiment of the present disclosure. FIG. 1D is a diagram illustrating the through focus MTF values for the visible light spectrum at the central field of view, 0.3 field of view and 0.7 field of view according to the first embodiment of the present disclosure. FIG. 1E is a diagram illustrating the through focus MTF values for the infrared light spectrum at the central field of view, 0.3 field of view and 0.7 field of view according to the first embodiment of the present disclosure.

As shown in FIG. 1A, in order from an object side to an image side, the optical image capturing system includes a first lens 110, an aperture 100, a second lens 120, a third lens 130, a fourth lens 140, a fifth lens 150, a sixth lens 160, a seventh lens 170, an eighth lens 180, an infrared filter 190, a first image plane 192, a second image plane and an image sensing device 194.

The first lens 110 has negative refractive power and is made of plastic. An object side 112 of the first lens 110 is a convex surface and an image side 114 of the first lens 110 is a concave surface, and the object side 112 and the image side 114 of the first lens 110 are both aspheric. The length of the maximum effective half diameter outline curve of the object side of the first lens is denoted as ARS11, and the length of the maximum effective half diameter outline curve of the image side of the first lens is denoted as ARS12. The outline curve length of the ½ entrance pupil diameter (HEP) of the object side of the first lens is denoted as ARE11, and the outline curve length of the ½ entrance pupil diameter (HEP) of the image side of the first lens is denoted as ARE12. The thickness of the first lens on the optical axis is denoted as TP1. The maximum effective half diameter of the object side of the first lens is expressed as EHD11. The maximum effective half diameter of the image side of the first lens is expressed as EHD 12.

The horizontal distance paralleling the optical axis from an inflection point on the object side of the first lens which is nearest to the optical axis to an intersection point where the object side of the first lens crosses the optical axis is expressed as SGI111. The horizontal distance paralleling the optical axis from an inflection point on the image side of the first lens which is nearest to the optical axis to an intersection point where the image side of the first lens crosses the optical axis is expressed as SGI121.

The horizontal distance in parallel with the optical axis from an inflection point on the object side of the first lens that is second nearest to the optical axis to the intersection point where the object side of the first lens crosses the optical axis is expressed as SG 112. The horizontal distance in parallel with the optical axis from an inflection point on the image side of the first lens that is second nearest to the optical axis to the intersection point where the image side of the first lens crosses the optical axis is expressed as SGI122.

The perpendicular distance from the inflection point on the object side of the first lens that is nearest to the optical axis to the optical axis is expressed as HIFll 1. The distance perpendicular to the optical axis from the inflection point on the image side of the first lens that is nearest to the optical axis to the intersection point where the image side of the first lens crosses the optical axis is expressed as HIF121.

The perpendicular distance from the inflection point on the object side of the first lens that is second nearest to the optical axis to the optical axis is expressed as HIF112. The distance perpendicular to the optical axis from the inflection point on the image side of the first lens that is second nearest to the optical axis to the intersection point where the image side of the first lens crosses the optical axis is expressed as HIF122.

The second lens 120 has positive refractive power and is made of plastic material. An object side 122 of the second lens 120 is a convex surface and an image side 124 of the second lens 120 is a convex surface, and the object side 122 and the image side 124 of the second lens 120 are both aspheric. The length of the maximum effective half diameter outline curve of the object side of the second lens is denoted as ARS21, and the length of the maximum effective half diameter outline curve of the image side of the second lens is denoted as ARS22. The outline curve length of the ½ entrance pupil diameter (HEP) of the object side of the second lens is denoted as ARE21, and the outline curve length of the ½ entrance pupil diameter (HEP) of the image side of the second lens is denoted as ARE22. The thickness of the second lens on the optical axis is denoted as TP2. The maximum effective half diameter of the object side of the second lens is expressed as EHD21. The maximum effective half diameter of the image side of the second lens is expressed as EHD22.

The horizontal distance in parallel with the optical axis from an inflection point on the object side of the second lens that is nearest to the optical axis to the intersection point where the object side of the second lens crosses the optical axis is expressed as SGI211. The horizontal distance in parallel with the optical axis from an inflection point on the image side of the second lens that is nearest to the optical axis to the intersection point where the image side of the second lens crosses the optical axis is expressed as SGI221.

The perpendicular distance from the inflection point on the object side of the second lens that is nearest to the optical axis to the optical axis is expressed as HIF211. The distance perpendicular to the optical axis from the inflection point on the image side of the second lens that is nearest to the optical axis to the intersection point where the image side of the second lens crosses the optical axis is expressed as HIF221.

The third lens 130 has positive refractive power and is made of plastic. An object side 132 of the third lens 130 is a convex surface and an image side 134 of the third lens 130 is a concave surface, and the object side 132 and the image side 134 of the third lens 130 are both aspheric. The object side 132 and the image side 134 of the third lens 130 both have one inflection point. The length of the maximum effective half diameter outline curve of the object side of the third lens is denoted as ARS31, and the length of the maximum effective half diameter outline curve of the image side of the third lens is denoted as ARS32. The outline curve length of the ½ entrance pupil diameter (HEP) of the object side of the third lens is denoted as ARE31, and the outline curve length of the ½ entrance pupil diameter (HEP) of the image side of the third lens is denoted as ARE32. The thickness of the third lens on the optical axis is denoted as TP3. The maximum effective half diameter of the object side of the third lens is expressed as EHD31. The maximum effective half diameter of the image side of the third lens is expressed as EHD32.

The horizontal distance in parallel with the optical axis from an inflection point on the object side of the third lens that is nearest to the optical axis to an intersection point where the object side of the third lens crosses the optical axis is expressed as SGI311. The horizontal distance in parallel with the optical axis from an inflection point on the image side of the third lens that is nearest to the optical axis to an intersection point where the image side of the third lens crosses the optical axis is expressed as SGI321. The following conditions are satisfied: SGI311=0.3764 mm, |SGI311|/(|SGI311|+TP3)=0.1428, SGI321=0.0129 mm and |SGI321|/(|SGI321|+TP3)=0.0057.

The horizontal distance in parallel with the optical axis from an inflection point on the object side of the third lens that is second nearest to the optical axis to the intersection point where the object side of the third lens crosses the optical axis is expressed as SGI312. The horizontal distance in parallel with the optical axis from an inflection point on the image side of the third lens that is second nearest to the optical axis to the intersection point on the image side of the third lens crosses the optical axis is expressed as SGI322.

The perpendicular distance between the inflection point on the object side of the third lens that is nearest to the optical axis and the optical axis is expressed as HIF311. The distance perpendicular to the optical axis between the inflection point on the image side of the third lens that is nearest to the optical axis and the intersection point where the image side of the third lens crosses the optical axis is expressed as HIF321. The following conditions are satisfied: HIF311=4.4550 mm, HIF311/HOI=0.5940, HIF321=1.3867 mm and HIF321/HO=0.1849.

The perpendicular distance between the inflection point on the object side of the third lens that is second nearest to the optical axis and the optical axis is expressed as HIF312.

The distance perpendicular to the optical axis between the inflection point on the image side of the third lens that is second nearest to the optical axis and the intersection point where the image side of the third lens crosses the optical axis is expressed as HIF322.

The fourth lens 140 has negative refractive power and is made of plastic. A object side 142 of the fourth lens 140 is a concave surface and an image side 144 of the fourth lens 140 is a concave surface, and the object side 142 and the image side 144 of the fourth lens 140 are both aspheric. The length of the maximum effective half diameter outline curve of the object side of the fourth lens is denoted as ARS41, and the length of the maximum effective half diameter outline curve of the image side of the fourth lens is denoted as ARS42. The outline curve length of the ½ entrance pupil diameter (HEP) of the object side of the fourth lens is denoted as ARE41, and the outline curve length of the ½ entrance pupil diameter (HEP) of the image side of the fourth lens is denoted as ARE42. The thickness of the fourth lens on the optical axis is denoted as TP4. The maximum effective half diameter of the object side of the fourth lens is expressed as EHD41. The maximum effective half diameter of the image side of the fourth lens is expressed as EHD42.

The horizontal distance in parallel with the optical axis from an inflection point on the object side of the fourth lens that is nearest to the optical axis to the intersection point where the object side of the fourth lens crosses the optical axis is expressed as SGI411. The horizontal distance in parallel with the optical axis from an inflection point on the image side of the fourth lens that is nearest to the optical axis to the intersection point where the image side of the fourth lens crosses the optical axis is expressed as SGI421.

The horizontal distance in parallel with the optical axis from an inflection point on the object side of the fourth lens that is second nearest to the optical axis to the intersection point where the object side of the fourth lens crosses the optical axis is expressed as SGI412. The horizontal distance in parallel with the optical axis from an inflection point on the image side of the fourth lens that is second nearest to the optical axis to the intersection point where the image side of the fourth lens crosses the optical axis is expressed as SGI422.

The perpendicular distance between the inflection point on the object side of the fourth lens that is nearest to the optical axis and the optical axis is expressed as HIF411. The distance perpendicular to the optical axis between the inflection point on the image side of the fourth lens that is nearest to the optical axis and the intersection point where the image side of the fourth lens crosses the optical axis is expressed as HIF421.

The perpendicular distance between the inflection point on the object side of the fourth lens that is second nearest to the optical axis and the optical axis is expressed as HIF412. The distance perpendicular to the optical axis between the inflection point on the image side of the fourth lens that is second nearest to the optical axis and the intersection point where the image side of the fourth lens crosses the optical axis is expressed as HIF422.

The fifth lens 150 has positive refractive power and is made of plastic. An object side 152 of the fifth lens 150 is a convex surface and an image side 154 of the fifth lens 150 is a convex surface, and the object side 152 and the image side 154 of the fifth lens 150 are both aspheric. The image side 154 of the fifth lens 150 has one inflection point. The length of the maximum effective half diameter outline curve of the object side of the fifth lens is denoted as ARS51, and the length of the maximum effective half diameter outline curve of the image side of the fifth lens is denoted as ARS52. The outline curve length of the ½ entrance pupil diameter (HEP) of the object side of the fifth lens is denoted as ARE51, and the outline curve length of the ½ entrance pupil diameter (HEP) of the image side of the fifth lens is denoted as ARE52. The thickness of the fifth lens on the optical axis is denoted as TP5. The maximum effective half diameter of the object side of the fifth lens is expressed as EHD51. The maximum effective half diameter of the image side of the fifth lens is expressed as EHD52.

The horizontal distance in parallel with the optical axis from an inflection point on the object side of the fifth lens that is nearest to the optical axis to the intersection point where the object side of the fifth lens crosses the optical axis is expressed as SGI511. The horizontal distance in parallel with the optical axis from an inflection point on the image side of the fifth lens that is nearest to the optical axis to the intersection point where the image side of the fifth lens crosses the optical axis is expressed as SGI521. The following conditions are satisfied: SGI521=−0.0777 mm and |SGI521|/(|SGI521|+TP5)=0.0296.

The horizontal distance in parallel with the optical axis from an inflection point on the object side of the fifth lens that is second nearest to the optical axis to the intersection point where the object side of the fifth lens crosses the optical axis is expressed as SGI512. The horizontal distance in parallel with the optical axis from an inflection point on the image side of the fifth lens that is second nearest to the optical axis to the intersection point where the image side of the fifth lens crosses the optical axis is expressed as SGI522.

The perpendicular distance between the optical axis and the inflection point on the object side of the fifth lens that is nearest to the optical axis is expressed as HIF511. The perpendicular distance between the optical axis and the inflection point on the image side of the fifth lens that is nearest to the optical axis is expressed as HIF521. The following conditions are satisfied: HIF521=2.1725 mm and HIF521/HOI=0.2897.

The perpendicular distance between the inflection point on the object side of the fifth lens that is second nearest to the optical axis and the optical axis is expressed as HIF512. The perpendicular distance between the inflection point on the image side of the fifth lens that is second nearest to the optical axis and the optical axis is expressed as HIF522.

The sixth lens 160 has positive refractive power and is made of plastic. An object side 162 of the sixth lens 160 is a convex surface and an image side 164 of the sixth lens 160 is a concave surface, and both the object side 162 and the image side 164 of the sixth lens 160 have one inflection point. Therefore, the incident angle of each field of view on the sixth lens can be effectively adjusted and the spherical aberration can thus be improved. The length of the maximum effective half diameter outline curve of the object side of the sixth lens is denoted as ARS61, and the length of the maximum effective half diameter outline curve of the image side of the sixth lens is denoted as ARS62. The outline curve length of the ½ entrance pupil diameter (HEP) of the object side of the sixth lens is denoted as ARE61, and the outline curve length of the ½ entrance pupil diameter (HEP) of the image side of the sixth lens is denoted as ARE62. The thickness of the sixth lens on the optical axis is denoted as TP6. The maximum effective half diameter of the object side of the sixth lens is expressed as EHD61. The maximum effective half diameter of the image side of the sixth lens is expressed as EHD62.

The horizontal distance in parallel with the optical axis from an inflection point on the object side of the sixth lens that is nearest to the optical axis to the intersection point where the object side of the sixth lens crosses the optical axis is expressed as SGI61.1. The horizontal distance in parallel with the optical axis from an inflection point on the image side of the sixth lens that is nearest to the optical axis to the intersection point where the image side of the sixth lens crosses the optical axis is expressed as SGI621. The following conditions are met: SGI1621=0.3579 mm and |SGI621|/(|SGI621|+TP6)=0.0867.

The perpendicular distance between the inflection point on the object side of the sixth lens that is nearest to the optical axis and the optical axis is expressed as HIF611. The perpendicular distance between the inflection point on the image side of the sixth lens that is nearest to the optical axis and the optical axis is expressed as HIF621. The following conditions are met: HIF621=6.3642 mm and HIF621/HOI=0.8486.

The seventh lens 170 has positive refractive power and is made of plastic. An object side 172 of the seventh lens 170 is a convex surface and an image side 174 of the seventh lens 170 is a convex surface. Hereby, this configuration is beneficial to shorten the back focal length of the optical image capturing system so as to keep its miniaturization. Besides, the image side 174 of the seventh lens 170 has one inflection point. The length of the maximum effective half diameter outline curve of the object side of the seventh lens is denoted as ARS71, and the length of the maximum effective half diameter outline curve of the image side of the seventh lens is denoted as ARS72. The outline curve length of the ½ entrance pupil diameter (HEP) of the object side of the seventh lens is denoted as ARE71, and the outline curve length of the ½ entrance pupil diameter (HEP) of the image side of the seventh lens is denoted as ARE72. The thickness of the seventh lens on the optical axis is denoted as TP7. The maximum effective half diameter of the object side of the seventh lens is expressed as EHD71. The maximum effective half diameter of the image side of the seventh lens is expressed as EHD72.

The horizontal distance in parallel with the optical axis from an inflection point on the object side of the seventh lens that is nearest to the optical axis to the intersection point where the object side of the seventh lens crosses the optical axis is expressed as SGI711. The horizontal distance in parallel with the optical axis from an inflection point on the image side of the seventh lens that is nearest to the optical axis to the intersection point where the image side of the seventh lens crosses the optical axis is expressed as SGI721. The following conditions are met: SGI721=−0.0364 mm and |SGI721|/(|SGI721|+TP7)=0.0111.

The perpendicular distance between the inflection point on the object side of the seventh lens that is nearest to the optical axis and the optical axis is expressed as HIF711. The perpendicular distance between the inflection point on the image side of the seventh lens that is nearest to the optical axis and the optical axis is expressed as HIF721. The following conditions are met: HIF721=2.5166 mm and HIF721/HOI=0.3355.

The eighth lens 180 has negative refractive power and is made of plastic. An object side 182 of the eighth lens 180 is a concave surface and an image side 184 of the eighth lens 180 is a concave surface. Hereby, this configuration is beneficial to shorten the back focal length of the optical image capturing system so as to keep its miniaturization. The length of the maximum effective half diameter outline curve of the object side of the eighth lens is denoted as ARS81, and the length of the maximum effective half diameter outline curve of the image side of the eighth lens is denoted as ARS82. The outline curve length of the ½ entrance pupil diameter (HEP) of the object side of the eighth lens is denoted as ARE81, and the outline curve length of the ½ entrance pupil diameter (HEP) of the image side of the eighth lens is denoted as ARE82. The thickness of the eighth lens on the optical axis is denoted as TP8. The maximum effective half diameter of the object side of the eighth lens is expressed as EHD81. The maximum effective half diameter of the image side of the eighth lens is expressed as EHD82.

The horizontal distance in parallel with the optical axis from an inflection point on the object side of the eighth lens that is nearest to the optical axis to the intersection point where the object side of the eighth lens crosses the optical axis is expressed as SGI811. The horizontal distance in parallel with the optical axis from an inflection point on the image side of the eighth lens that is nearest to the optical axis to the intersection point where the image side of the eighth lens crosses the optical axis is expressed as SGI821.

The perpendicular distance between the inflection point on the object side of the eighth lens that is nearest to the optical axis and the optical axis is expressed as HIF811. The perpendicular distance between the inflection point on the image side of the eighth lens that is nearest to the optical axis and the optical axis is expressed as HIF821.

In the present embodiment, related characteristics of descriptions below and inflection point are defined on a basis of the primary reference wavelength 555 nm.

The infrared filter 190 is made of glass. The infrared filter 190 is disposed between the eighth lens 180 and the first image plane 192, and does not affect the focal length of the optical image capturing system.

In the optical image capturing system of the first embodiment, the focal length of the optical image capturing system is f, the entrance pupil diameter of the optical image capturing system is HEP, and a half maximum angle of view of the optical image capturing system is HAF. The values of the parameters are shown as below: f=5.3947 mm, f/HEP=1.2, HAF=55°.

The ratio of the focal length f of the optical image capturing system to the focal length fp of each lens with positive refractive power is PPR. The ratio of the focal length f of the optical image capturing system to the focal length fn of each lens with negative refractive power is NPR. In the optical image capturing system of the first embodiment, a sum of the PPR of all lenses with positive refractive power is ΣPPR and a sum of the NPR of all lenses with negative refractive power is ΣNPR. The following conditions are also satisfied: |f/f1|=0.4204, |f/f2|=0.3695, |f/f3|=0.0986, |f/f4|=0.6333, |f/f5|=0.3560, |f/f6|=0.2635, |f/f7|=0.1252, and |f/f8|=0.0715.

In the optical image capturing system of the first embodiment, the distance from the object side 112 of the first lens to the image side 184 of the eighth lens is InTL. The distance from the object side 112 of the first lens to the first image plane 192 is HOS. The distance from the aperture 100 to the first image plane 192 is InS. A half diagonal length of an effective detection field of the image sensing device 194 is HOI. The distance from the image side 184 of the eighth lens to the first image plane 192 is BFL. The following conditions are met: InTL+BFL=HOS, HOS=51.6062 mm, InTL=46.9488 mm, HOI=7.5 mm, HOS/HOI=6.8808, HOS/f=9.5661, InS=24.2924 mm and InS/HOS=0.4707.

In the optical image capturing system of the first embodiment, a total thickness of all lenses with refractive power on the optical axis is ΣTP. The following conditions are met: ΣTP=21.7939 mm and ΣTP/InTL=0.4642. Therefore, this configuration can keep the contrast ratio of the optical image capturing system and the yield rate about manufacturing lens at the same time, and provide the proper back focal length so as to accommodate other elements.

In the optical image capturing system of the first embodiment, a sum of focal lengths of all lenses with positive refractive power is ΣPP. The following conditions are satisfied: ΣPP=f2+f3+f5+f6+f7=148.001 mm and f2/(f2+f3+f5+f6+f7)=0.0986. Hereby, this configuration is helpful to distribute the positive refractive power of the second lens 120 to other lens with positive refractive power in an appropriate way, so as to suppress the generation of noticeable aberrations in the propagating process of the incident light in the optical image capturing system.

In the optical image capturing system of the first embodiment, the sum of focal lengths of all lenses with negative refractive power is ΣNP. The following conditions are met: ΣNP=f1+f4+f8=−96.8161 mm and f1/(f1+f4+f8)=0.1325. Hereby, this configuration is helpful to distribute the negative refractive power of the eighth lens to other lens with negative refractive power in an appropriate way, so as to suppress the generation of noticeable aberrations in the propagating process of the incident light in the optical image capturing system.

In the optical image capturing system of the first embodiment, the distance between the first lens 110 and the second lens 120 on the optical axis is IN12. The following conditions are met: IN12=22.3504 mm and IN12/f=4.1430. Therefore, this configuration is helpful to improve the chromatic aberration of the lens in order to elevate their performance.

In the optical image capturing system of the first embodiment, the thicknesses of the first lens 110 and the second lens 120 on the optical axis are TP1 and TP2, respectively. The following conditions are satisfied: TP1=3.1800 mm, TP2=3.9903 mm and (TP1+IN12)/TP2=6.3981. Therefore, this configuration is helpful to control the sensitivity generated by the optical image capturing system and elevate its performance.

In the optical image capturing system of the first embodiment, the thicknesses of the sixth lens 160, seventh lens 170 and eighth lens 180 on the optical axis are TP6, TP7 and TP8, respectively. The distance between the sixth lens 160 and the seventh lens 170 on the optical axis is IN67. The distance between the seventh lens 170 and the eighth lens 180 on the optical axis is IN78. The following conditions are satisfied: TP6=3.7720 mm, TP7=3.2362 mm, TP8=0.9274 and (TP8+IN78)/TP7=0.6815. Therefore, this configuration is helpful to control the sensitivity generated by the optical image capturing system and reduce the total height of the optical image capturing system.

In the optical image capturing system of the first embodiment, the thicknesses of the third lens 130, fourth lens 140 and fifth lens 150 on the optical axis are TP3, TP4 and TP5, respectively. The distance between the third lens 130 and the fourth lens 140 on the optical axis is IN34. The distance between the fourth lens 140 and the fifth lens 150 on the optical axis is IN45. The distance from the object side 112 of the first lens to the image side 184 of the eighth lens is InTL. The following conditions are satisfied: TP3=2.2593 mm, TP4=1.8776 mm, TP5=2.5511 mm, IN34=0.7118 mm, IN45=0.2345 mm and (TP3+TP4+TP5)/ΣTP=0.3069. Therefore, this configuration is helpful to slightly correct the aberration of the propagating process of the incident light layer by layer and decrease the total height of the optical image capturing system.

In the optical image capturing system of the first embodiment, a horizontal distance in parallel with the optical axis from a maximum effective half diameter position on the object side 172 of the seventh lens to the intersection point where the object side 172 of the seventh lens crosses the optical axis is InRS71. A horizontal distance in parallel with the optical axis from a maximum effective half diameter position on the image side 174 of the seventh lens to the intersection point where the image side 174 of the seventh lens crosses the optical axis is InRS72. The thickness of the seventh lens 170 on the optical axis is TP7. The following conditions are satisfied: InRS71=2.7049 mm, InRS72=0.3270 mm, and |InRS72|/TP7=0.1010. Hereby, this configuration is favorable to the manufacturing and forming of lens and keeps the miniaturization of the optical image capturing system effectively.

In the optical image capturing system of the first embodiment, the perpendicular distance between a critical point on the object side 172 of the seventh lens and the optical axis is HVT71. The perpendicular distance between a critical point on the image side 174 of the seventh lens and the optical axis is HVT72. The following conditions are satisfied: HVT71=0 mm, HVT72=3.7869 mm and HVT71/HVT720.

In the optical image capturing system of the first embodiment, a distance in parallel with the optical axis from a maximum effective half diameter position on the object side 182 of the eighth lens to the intersection point where the object side 182 of the eighth lens crosses the optical axis is InRS81. A distance in parallel with the optical axis from a maximum effective half diameter position on the image side 184 of the eighth lens to the intersection point where the image side 184 of the eighth lens crosses the optical axis is InRS82. The thickness of the eighth lens 180 on the optical axis is TP8. The following conditions are satisfied: InRS81=−0.8396 mm, InRS82=0.9232 mm, and |InRS82|/TP8=0.9954. Hereby, this configuration is favorable to the manufacturing and forming of lens and keeps the miniaturization of the optical image capturing system effectively.

In the optical image capturing system of the first embodiment, the perpendicular distance between a critical point on the object side 182 of the eighth lens and the optical axis is HVT81. The perpendicular distance between a critical point on the image side 184 of the eighth lens and the optical axis is HVT82. The following conditions are satisfied: HVT81=0 mm and HVT82=0 mm.

In the optical image capturing system of the first embodiment, TV distortion and optical distortion for image formation in the optical image capturing system are TDT and ODT, respectively. The following conditions are satisfied: TDT=1.9874% and ODT=−4.6109%.

In the present embodiment of the disclosure, the light of any field of view may be further divided into the sagittal ray and tangential ray, and the spatial frequency of 110 cycles/mm serves as the benchmark for assessing the focus shifts and the values of MTF. The focus shifts, where the through focus MTF values of the visible sagittal ray at the central field of view, 0.3 field of view and 0.7 field of view of the optical image capturing system are at their respective maximums, are denoted as VSFS0, VSFS3 and VSFS7 (the unit of measurement: mm), respectively, wherein the values of VSFS0, VSFS3 and VSFS7 equal to 0.000 mm, 0.000 mm and 0.010 mm, respectively. The maximum values of the through focus MTF of the visible sagittal ray at the central field of view, 0.3 field of view and 0.7 field of view are denoted as VSMTF0, VSMTF3 and VSMTF7, respectively, wherein the values of VSMTF0, VSMTF3 and VSMTF7 equal to 0.667, 0.717 and 0.418, respectively. The focus shifts, where the through focus MTF values of the visible tangential ray at the central field of view, 0.3 field of view and 0.7 field of view of the optical image capturing system are at their respective maximums, are denoted as VTFS0, VTFS3 and VTFS7 (the unit of measurement: mm), respectively, wherein the values of VTFS0, VTFS3 and VTFS7 equal to 0.000 mm, 0.000 mm, and 0.000 mm, respectively. The maximum values of the through focus MTF of the visible tangential ray at the central field of view, 0.3 field of view and 0.7 field of view are denoted as VTMTF0, VTMTF3 and VTMTF7, respectively, wherein the values of VTMTF0, VTMTF3 and VTMTF7 equal to 0.667, 0.345 and 0.343, respectively. The average focus shift (position) of the aforementioned focus shifts of the visible sagittal ray at three fields of view and focus shifts of the visible tangential ray at three fields of view is denoted as AVFS (the unit of measurement: mm), which meets the absolute value |(VSFS0+VSFS3+VSFS7+VTFS0+VTFS3+VTFS7)/6|=|0.002 mm|.

The focus shifts, where the through focus MTF values of the infrared sagittal ray at the central field of view, 0.3 field of view and 0.7 field of view of the optical image capturing system are at their respective maximums, are denoted as ISFS0, ISFS3 and ISFS7 (the unit of measurement: mm), respectively, wherein the values of ISFS0, ISFS3 and ISFS7 equal to 0.050 mm, 0.040 mm, and 0.060 mm, respectively. The average focus shift (position) of the aforementioned focus shifts of the infrared sagittal ray at three fields of view is denoted as AISFS. The maximum values of the through focus MTF of the infrared sagittal ray at the central field of view, 0.3 field of view and 0.7 field of view are denoted as ISMTF0, ISMTF3, and ISMTF7, respectively, wherein the values of ISMTF0, ISMTF3 and ISMTF7 equal to 0.768, 0.785 and 0.382, respectively. The focus shifts, where the through focus MTF values of the infrared tangential ray at the central field of view, 0.3 field of view and 0.7 field of view of the optical image capturing system are at their respective maximums, are denoted as ITFS0, ITFS3 and ITFS7 (the unit of measurement: mm), respectively, wherein the values of ITFS0, ITFS3 and ITFS7 equal to 0.050, 0.050 and 0.080, respectively. The average focus shift (position) of the aforementioned focus shifts of the infrared tangential ray at three fields of view is denoted as AITFS (the unit of measurement: mm). The maximum values of the through focus MTF of the infrared tangential ray at the central field of view, 0.3 field of view and 0.7 field of view are denoted as ITMTF0, ITMTF3 and ITMTF7, respectively, wherein the values of ITMTF0, ITMTF3 and ITMTF7 equal to 0.768, 0.714 and 0.441, respectively. The average focus shift (position) of the aforementioned focus shifts of the infrared sagittal ray at the three fields of view and the focus shifts of the infrared tangential ray at the three fields of view is denoted as AIFS (the unit of measurement: mm), which meets the absolute value of |(ISFS0+ISFS3+ISFS7+ITFS0+ITFS3+ITFS7)/6|=|0.055 mm|.

The focus shift between the focal points for the visible light and the infrared light at their central fields of view (RGB/IR) of the entire optical image capturing system (i.e. the wavelength of 850 nm versus the wavelength of 555 nm, the unit of measurement: mm) is denoted as FS (the distance between the first and second image planes on the optical axis), which meets the absolute value of |(VSFS0+VTFS0)/2-(ISFS0+ITFS0)/2|=|0.050 mm. The difference (focus shift) between the average focus shift of the visible light at the three fields of view and the average focus shift of the infrared light at the three fields of view (RGB/IR) of the entire optical image capturing system (i.e. the wavelength of 850 nm versus the wavelength of 555 nm, the unit of measurement: mm) is denoted as AFS (the distance on the optical axis between the first average image plane and the second average image plane), which meets the absolute value of |AIFS−AVFS|=|0.053 mm|.

In the optical image capturing system of the first embodiment, A lateral aberration of the shortest operation wavelength of visible light of the positive tangential fan diagram passing through the margin of the aperture and projecting onto the first image plane at 0.7 field of view is expressed as PSTA and its value is −0.009 mm. A lateral aberration of the longest operation wavelength of visible light of a positive tangential fan diagram passing through the margin of the aperture and projecting onto the first image plane at 0.7 field of view is expressed as PLTA and its value is 0.021 mm. A lateral aberration of the shortest operation wavelength of a visible light of a negative tangential fan diagram passing through the margin of the aperture and projecting onto the first image plane at 0.7 field of view is expressed as NSTA and its value is 0.009 mm. A lateral aberration of the longest operation wavelength of visible light of a negative tangential fan diagram passing through the margin of the aperture and projecting onto the first image plane at 0.7 field of view is expressed as NLTA and its value is −0.024 mm. A lateral aberration of the shortest operation wavelength of visible light of the sagittal fan diagram passing through the margin of the aperture and projecting onto the first image plane at 0.7 field of view is expressed as SSTA and its value is 0.011 mm. A lateral aberration of the longest operation wavelength of visible light of a sagittal fan diagram passing through the margin of the aperture and projecting onto the first image plane at 0.7 field of view is expressed as SLTA and its value is 0.011 mm.

The contents in Tables 1 and 2 below should be incorporated into the reference of the present embodiment.

TABLE 1

Lens Parameters for the First Embodiment
f(focal length) = 5.3947 mm; f/HEP = 1.2; HAF(half angle of view) = 55 deg

| Surface No | Curvature Radius | Thickness (mm) | Material | Refractive Index | Coefficient of Dispersion | Focal Length |
|---|---|---|---|---|---|---|
| 0 | Object | 1E+18 | 1E+13 | | | |
| 1 | First Lens | 24.10442007 | 3.180 | Plastic | 1.565 | 58.00 | −12.832 |
| 2 | | 5.320562553 | 24.134 | | | | |
| 3 | Aperture | 1E+18 | −1.783 | | | | |
| 4 | Second Lens | 13.43633803 | 3.990 | Plastic | 1.583 | 30.20 | 14.600 |
| 5 | | −21.01336968 | 0.480 | | | | |

TABLE 1-continued

Lens Parameters for the First Embodiment
f(focal length) = 5.3947 mm; f/HEP = 1.2; HAF(half angle of view) = 55 deg

| Surface No | Curvature Radius | | Thickness (mm) | Material | Refractive Index | Coefficient of Dispersion | Focal Length |
|---|---|---|---|---|---|---|---|
| 6 | Third Lens | 20.93757518 | 2.259 | Plastic | 1.565 | 58.00 | 54.695 |
| 7 | | 61.98504985 | 0.712 | | | | |
| 8 | Fourth Lens | −20.77669725 | 1.878 | Plastic | 1.661 | 20.40 | −8.519 |
| 9 | | 8.099983384 | 0.234 | | | | |
| 10 | Fifth Lens | 12.45426537 | 2.551 | Plastic | 1.565 | 58.00 | 15.154 |
| 11 | | −25.62260651 | 0.050 | | | | |
| 12 | Sixth Lefts | 9.802286731 | 3.772 | Plastic | 1.565 | 58.00 | 20.476 |
| 13 | | 54.30873521 | 0.050 | | | | |
| 14 | Seventh Lens | 30.35740823 | 3.236 | Plastic | 1.514 | 56.80 | 43.076 |
| 15 | | −79.78586782 | 1.278 | | | | |
| 16 | Eighth Lens | −52.80596025 | 0.927 | Plastic | 1.661 | 20.40 | −75.465 |
| 17 | | 1076.551341 | 1.000 | | | | |
| 18 | Infrared Filter | 1E+18 | 0.200 | BK_7 | 1.517 | 64.2 | |
| 19 | | 1E+18 | 3.461 | | | | |
| 20 | First image plane | 1E+18 | −0.004 | | | | |

Reference Wavelength (d-line): 555 nm

TABLE 2

Aspheric Coefficients

| Surface No | 9 | 10 | 11 | 12 | 13 | 14 | 15 |
|---|---|---|---|---|---|---|---|
| k | −1.419080E+00 | 1.160063E+00 | −1.787274E+00 | −3.359494E+00 | 2.480422E+01 | 1.896298E+01 | 5.000000E+01 |
| A4 | −4.511984E−04 | 1.086597E−04 | 6.054571E−04 | −3.568053E−05 | −2.309982E−04 | 6.114576E−04 | 4.127602E−05 |
| A6 | 8.036379E−06 | −5.142695E−06 | 4.573090E−07 | 4.573090E−07 | 1.039199E−05 | 6.870081E−06 | 8.686605E−06 |
| A8 | −1.013564E−07 | 1.029807E−07 | −1.174933E−07 | 8.376295E−08 | −1.687118E−07 | −2.542782E−07 | −1.910974E−08 |
| A10 | 9.022617E−10 | −1.163426E−09 | 1.684909E−10 | −5.325352E−10 | 7.972063E−10 | 3.090262E−09 | 1.618760E−09 |
| A12 | 0.000000E+00 | 0.000000E+00 | 0.000000E+00 | 0.000000E+00 | 0.000000E+00 | 0.000000E+00 | 0.000000E+00 |

| Surface No | 16 | 17 |
|---|---|---|
| k | −4.277708E+01 | −5.000000E+01 |
| A4 | 5.583548E−03 | 1.240671E−04 |
| A6 | 1.948110E−04 | −4.949077E−05 |
| A8 | −1.486947E−05 | 2.088854E−06 |
| A10 | −6.501246E−08 | −1.438383E−08 |
| A12 | 0.000000E+00 | 0.000000E+00 |
| A14 | 0.000000E+00 | 0.000000E+00 |

The values pertaining to the outline curve lengths are obtainable according to the data in Table 1 and Table 2:

First Embodiment (Primary Reference Wavelength Used = 555 nm)

| ARE | ½(HEP) | ARE value | ARE − ½(HEP) | 2(ARE/HEP) % | TP | ARE/TP (%) |
|---|---|---|---|---|---|---|
| 11 | 2.248 | 2.250 | 0.00232 | 100.10% | 3.180 | 70.76% |
| 12 | 2.248 | 2.314 | 0.06635 | 102.95% | 3.180 | 72.77% |
| 21 | 2.248 | 2.258 | 0.00984 | 100.44% | 3.990 | 56.58% |
| 22 | 2.248 | 2.251 | 0.00307 | 100.14% | 3.990 | 56.41% |
| 31 | 2.248 | 2.251 | 0.00290 | 100.13% | 2.259 | 99.62% |
| 32 | 2.248 | 2.247 | −0.00066 | 99.97% | 2.259 | 99.46% |
| 41 | 2.248 | 2.252 | 0.00395 | 100.18% | 1.878 | 119.93% |
| 42 | 2.248 | 2.273 | 0.02498 | 101.11% | 1.878 | 121.05% |
| 51 | 2.248 | 2.260 | 0.01218 | 100.54% | 2.551 | 88.59% |
| 52 | 2.248 | 2.249 | 0.00106 | 100.05% | 2.551 | 88.15% |
| 61 | 2.248 | 2.265 | 0.01727 | 100.77% | 3.772 | 60.05% |
| 62 | 2.248 | 2.248 | −0.00028 | 99.99% | 3.772 | 59.58% |
| 71 | 2.248 | 2.250 | 0.00254 | 100.11% | 3.236 | 69.54% |
| 72 | 2.248 | 2.247 | −0.00054 | 99.98% | 3.236 | 69.44% |
| 81 | 2.248 | 2.248 | 0.00014 | 100.01% | 0.927 | 242.39% |
| 82 | 2.248 | 2.247 | −0.00062 | 99.97% | 0.927 | 242.31% |

-continued

First Embodiment (Primary Reference Wavelength Used = 555 nm)

| ARS | EHD | ARS value | ARS − EHD | (ARS/EHD) % | TP | ARS/TP (%) |
|---|---|---|---|---|---|---|
| 11 | 15.531 | 15.980 | 0.449 | 102.89% | 3.180 | 502.51% |
| 12 | 8.073 | 12.356 | 4.284 | 153.06% | 3.180 | 388.56% |
| 21 | 6.701 | 7.012 | 0.311 | 104.64% | 3.990 | 175.72% |
| 22 | 6.785 | 6.853 | 0.068 | 101.00% | 3.990 | 171.74% |
| 31 | 6.743 | 6.774 | 0.032 | 100.47% | 2.259 | 299.84% |
| 32 | 6.729 | 6.894 | 0.165 | 102.45% | 2.259 | 305.14% |
| 41 | 6.690 | 6.954 | 0.264 | 103.95% | 1.878 | 370.35% |
| 42 | 6.770 | 7.196 | 0.426 | 106.29% | 1.878 | 383.24% |
| 51 | 7.086 | 7.679 | 0.593 | 108.37% | 2.551 | 301.01% |
| 52 | 7.036 | 7.222 | 0.186 | 102.65% | 2.551 | 283.10% |
| 61 | 7.721 | 8.482 | 0.761 | 109.85% | 3.772 | 224.87% |
| 62 | 7.448 | 7.468 | 0.020 | 100.27% | 3.772 | 197.99% |
| 71 | 6.751 | 7.745 | 0.994 | 114.73% | 3.236 | 239.32% |
| 72 | 6.118 | 6.176 | 0.058 | 100.94% | 3.236 | 190.83% |
| 81 | 6.070 | 6.207 | 0.137 | 102.25% | 0.927 | 669.25% |
| 82 | 6.052 | 6.227 | 0.175 | 102.88% | 0.927 | 671.41% |

Table 1 is the detailed structural data for the first embodiment in FIG. 1A, of which the unit for the curvature radius, the thickness, the distance, and the focal length is millimeters (mm). Surfaces 0-16 illustrate the surfaces from the object side to the image side in the optical image capturing system. Table 2 shows the aspheric coefficients of the first embodiment, where k is the cone coefficient in the aspheric surface equation, and A1-A20 are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
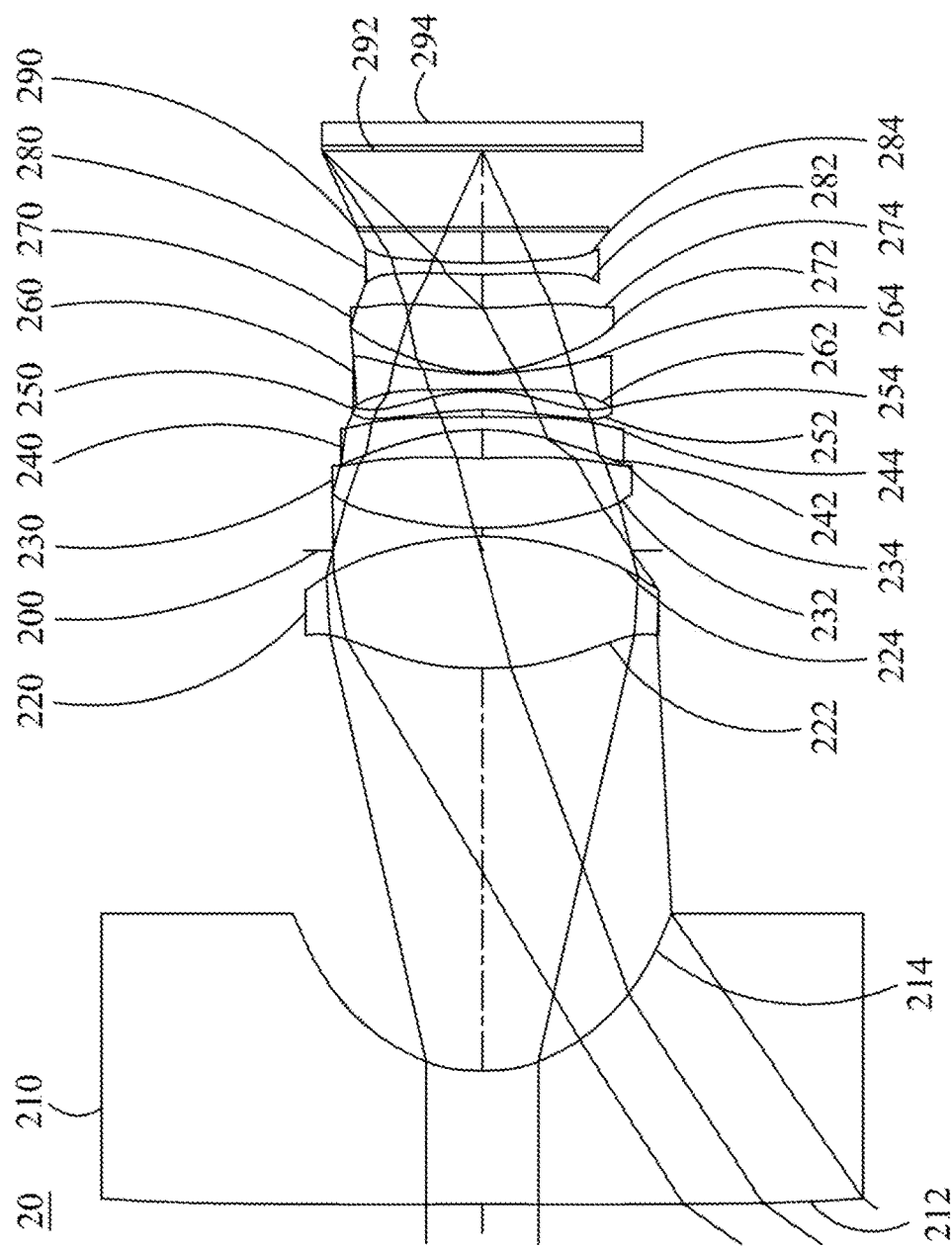
FIG. 2A is a schematic view of the optical image capturing system according to the second embodiment of the present invention.
Figure 2B:
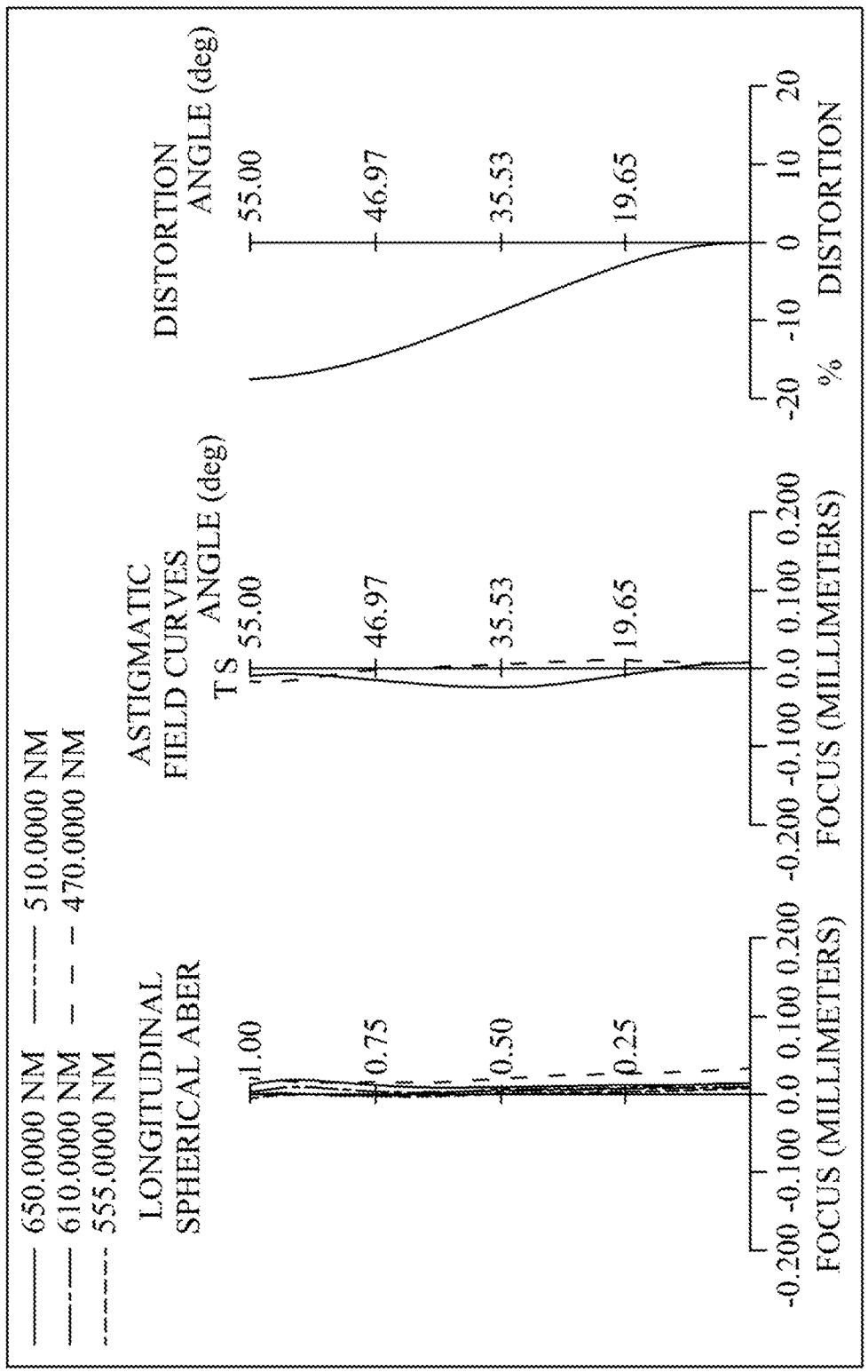
FIG. 2B shows the longitudinal spherical aberration curves, astigmatic field curves, and optical distortion curve of the optical image capturing system in the order from left to right according to the second embodiment of the present invention.
Figure 2C:
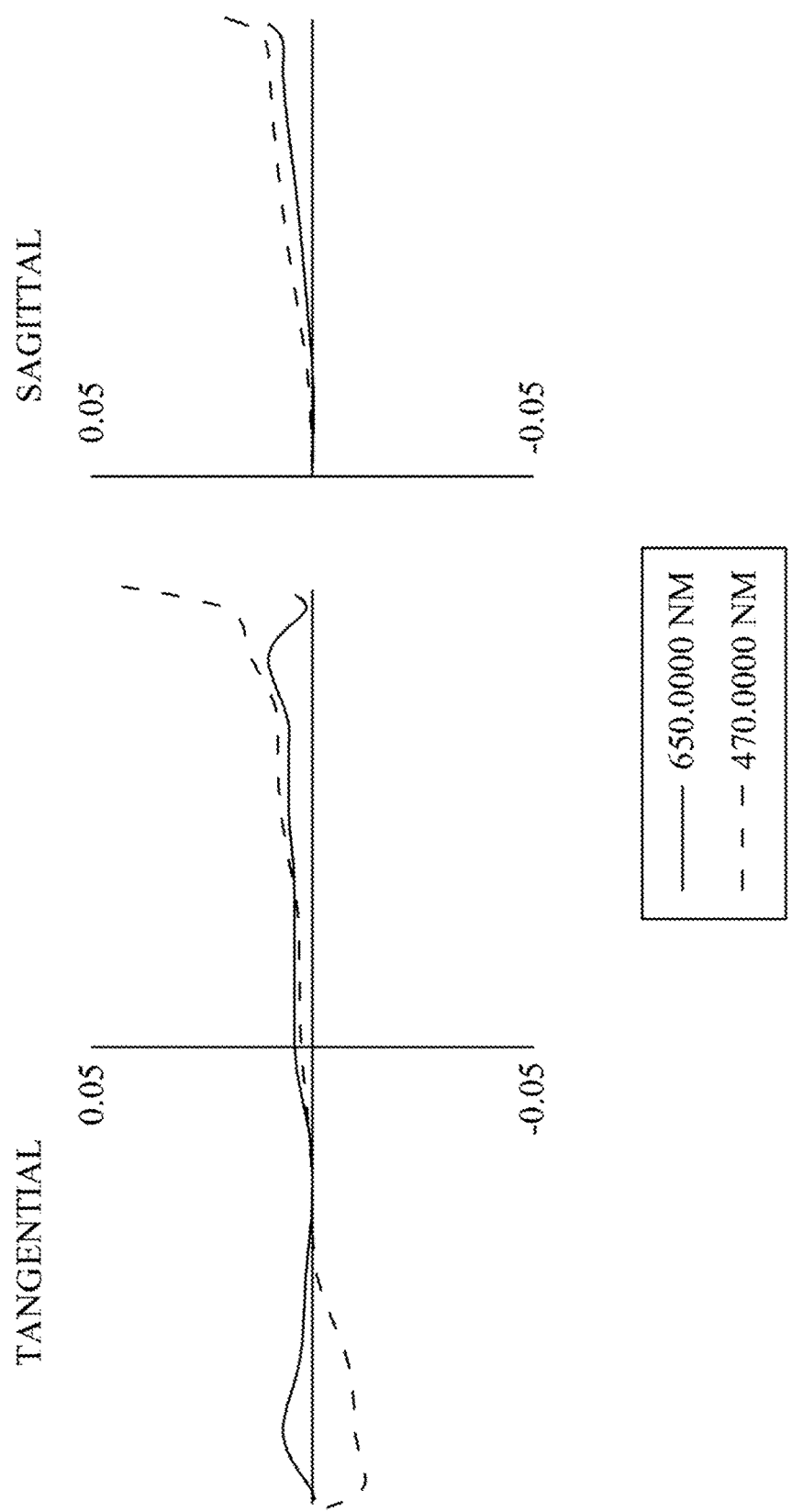
FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the second embodiment of the present disclosure.
Figure 2D:
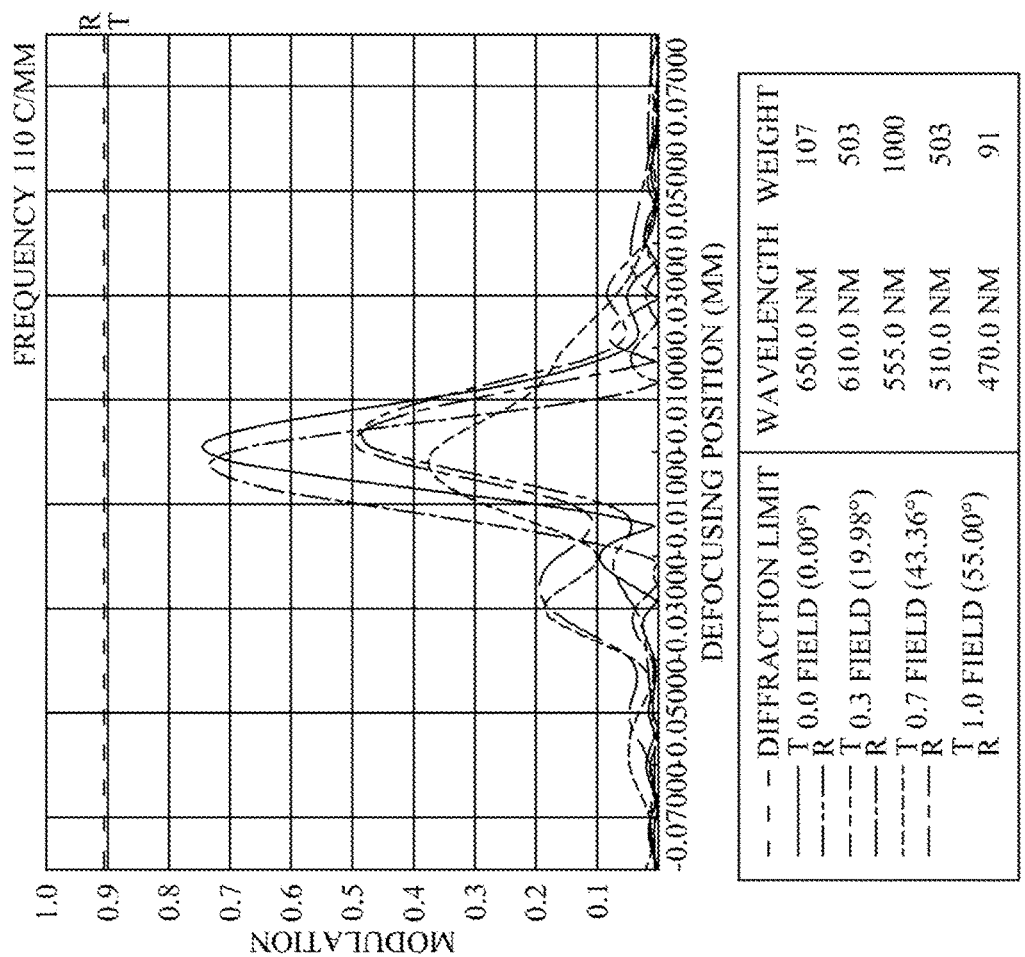
FIG. 2D is a diagram illustrating the through focus MTF values for the visible light spectrum at the central field of view, 0.3 field of view and 0.7 field of view according to the second embodiment of the present disclosure.
Figure 2E:
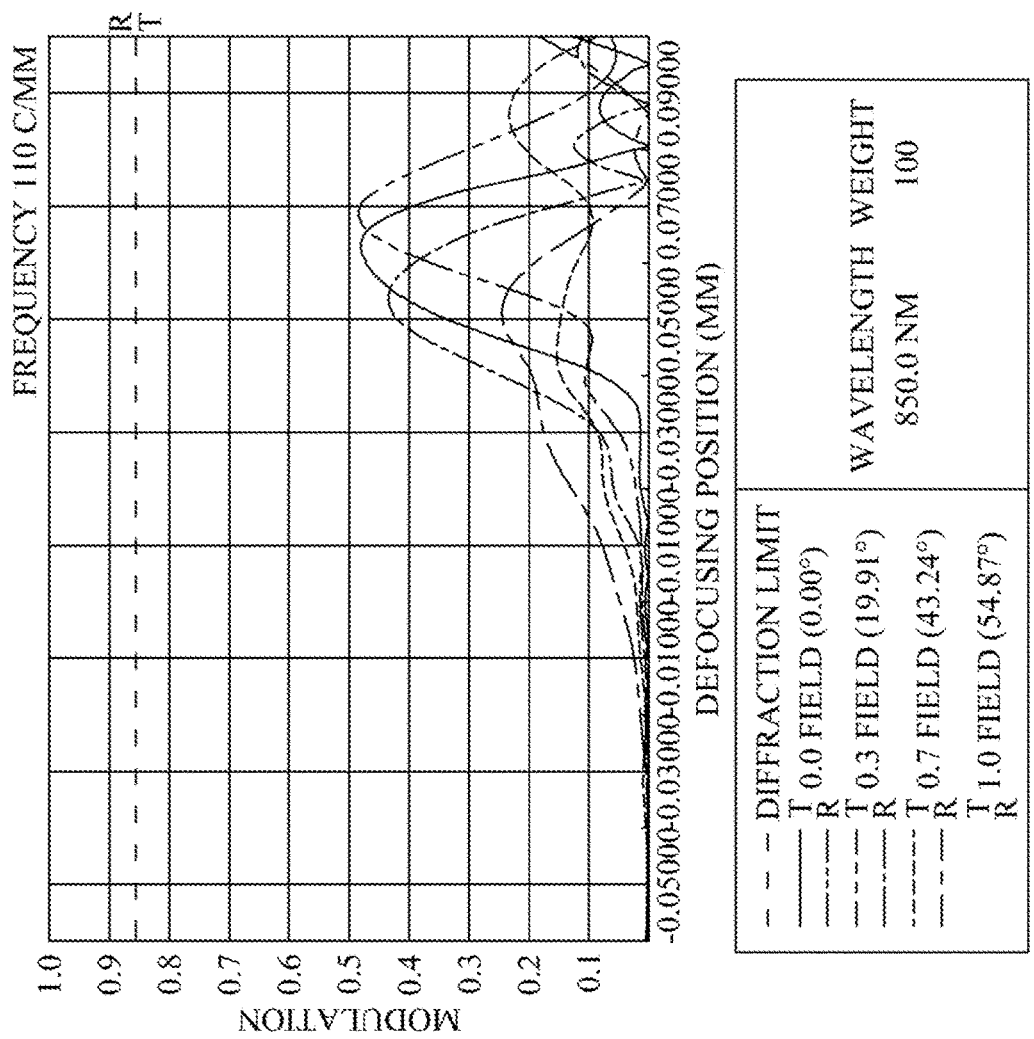
FIG. 2E is a diagram illustrating the through focus MTF values for the infrared light spectrum at the central field of view, 0.3 field of view and 0.7 field of view according to the second embodiment of the present disclosure.

Please refer to FIG. 2A and FIG. 2B, wherein FIG. 2A is a schematic view of the optical image capturing system according to the second embodiment of the present invention and FIG. 2B shows the longitudinal spherical aberration curves, astigmatic field curves, and optical distortion curve of the optical image capturing system in the order from left to right according to the second embodiment of the present invention. FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the second embodiment of the present disclosure. FIG. 2D is a diagram illustrating the through focus MTF values for the visible light spectrum at the central field of view, 0.3 field of view and 0.7 field of view according to the first embodiment of the present disclosure. FIG. 2E is a diagram illustrating the through focus MTF values for the infrared light spectrum at the central field of view, 0.3 field of view and 0.7 field of view according to the second embodiment of the present disclosure.

As shown in FIG. 2A, in the order from the object side to the image side, the optical image capturing system includes a first lens 210, a second lens 220, an aperture 200, a third lens 230, a fourth lens 240, a fifth lens 250, a sixth lens 260, a seventh lens 270, an eighth lens 280, an infrared filter 290, a first image plane 292, a second image plane and an image sensing device 294.

The first lens 210 has negative refractive power and is made of plastic. The object side 212 of the first lens 210 is a concave surface and the image side 214 of the first lens 210 is a concave surface. Both the object side 212 and the image side 214 of the first lens 210 are aspheric. The object side 212 of the first lens 210 has one inflection point.

The second lens 220 has positive refractive power and is made of plastic. The object side 222 of the second lens 220 is a convex surface and the image side 224 of the second lens 220 is a convex surface. Both the object side 222 and the image side 224 of the second lens 220 are aspheric. The object side 222 of the second lens 220 has one inflection point.

The third lens 230 has positive refractive power and is made of plastic. The object side 232 of the third lens 230 is a convex surface and the image side 234 of the third lens 230 is a concave surface. Both the object side 232 and the image side 234 of the third lens 230 are aspheric. Besides, the image side 234 of the third lens 230 has two inflection points.

The fourth lens 240 has negative refractive power and is made of plastic. The object side 242 of the fourth lens 240 is a concave surface and the image side 244 of the fourth lens 240 is a concave surface. Both the object side 242 and the image side 244 of the fourth lens 240 are aspheric. The object side 242 of the fourth lens 240 has one inflection point. The image side 244 of the fourth lens 240 has two inflection points.

The fifth lens 250 has positive refractive power and is made of plastic. The object side 252 of the fifth lens 250 is a concave surface and the image side 254 of the fifth lens 250 is a convex surface. Both the object side 252 and the image side 254 of the fifth lens 250 are aspheric. The object side 252 and the image side 254 of the fifth lens all have one inflection point.

The sixth lens 260 has negative refractive power and is made of plastic. The object side 262 of the sixth lens 260 is a convex surface and the image side 264 of the sixth lens 260 is a concave surface. Both the object side 262 and the image side 264 of the sixth lens 260 are aspheric. The object side 262 and the image side 264 of the sixth lens all have one inflection point. Hereby, the angle incident at the sixth lens 260 at each field of view may be effectively adjusted so as to improve the aberration.

The seventh lens 270 has positive refractive power and is made of plastic material. The object side 272 of the seventh lens 270 is a convex surface and the image side 274 of the seventh lens 270 is a concave surface. Both the object side 272 and the image side 274 of the seventh lens 270 are aspheric. Hereby, the configuration is beneficial to shorten the back focal length of the optical image capturing system so as to keep its miniaturization. Besides, the incident angle of the off-axis rays can be reduced effectively, thereby further correcting the off-axis aberration.

The eighth lens 280 has positive refractive power and is made of plastic. The object side 282 of the eighth lens is a convex surface and the image side 284 of the eighth lens is a concave surface. Both the object side 282 and the image side 284 of the eighth lens are aspheric. Both the object side 282 of the eighth lens has one inflection point. Hereby, the incident angle of the off-axis rays can be reduced effectively, thereby further correcting the off-axis aberration.

The infrared filter 290 is made of glass and is disposed between the eighth lens 280 and the first image plane 292. The infrared filter 290 does not affect the focal length of the optical image capturing system.

The contents in Tables 3 and 4 below should be incorporated into the reference of the present embodiment.

TABLE 3

Lens Parameters for the Second Embodiment
f(focal length) = 6.3764 mm; f/HEP = 1.2; HAF (half angle of view) = 55.0002 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | −1158.176318 | 6.332 | Plastic | 1.565 | 58.00 | −13.326 |
| 2 | | 7.617712959 | 19.118 | | | | |
| 3 | Second Lens | 13.37024126 | 6.256 | Plastic | 1.565 | 54.50 | 13.023 |
| 4 | | −13.69509741 | −0.632 | | | | |
| 5 | Aperture | 1E+18 | 1.027 | | | | |
| 6 | Third Lens | 15.5909139 | 3.306 | Plastic | 1.565 | 58.00 | 45.728 |
| 7 | | 36.12772478 | 1.367 | | | | |
| 8 | Fourth Lens | −10.15029831 | 0.566 | Plastic | 1.661 | 20.40 | −13.255 |
| 9 | | 69.91832335 | 0.353 | | | | |
| 10 | Fifth Lens | −14.71547398 | 0.910 | Plastic | 1.565 | 58.00 | 32.640 |
| 11 | | −8.379458163 | 0.050 | | | | |
| 12 | Sixth Lens | 136.4586744 | 0.774 | Plastic | 1.661 | 20.40 | −30.906 |
| 13 | | 17.86369798 | 0.050 | | | | |
| 14 | Seventh Lens | 6.433934702 | 3.051 | Plastic | 1.565 | 58.00 | 16.081 |
| 15 | | 18.12431707 | 1.627 | | | | |
| 16 | Eighth Lens | 30.67967561 | 0.525 | Plastic | 1.661 | 20.40 | 199.278 |
| 17 | | 39.61629946 | 1.500 | | | | |
| 18 | Infrared Filler | 1E+18 | 0.200 | BK_7 | 1.517 | 64.2 | |
| 19 | | 1E+18 | 3.625 | | | | |
| 20 | First Image Plane | 1E+18 | −0.008 | | | | |

Reference Wavelength (d-line): 555 nm

TABLE 4

The Aspheric Coefficients of the Second Embodiment
Aspheric Coefficients

| Surface No | 1 | 2 | 3 | 4 | 6 | 7 | 8 |
|---|---|---|---|---|---|---|---|
| k | 5.000000E+01 | −4.007026E−01 | −3.689479E−01 | 5.210603E−01 | 3.559240E−02 | −7.591468E+00 | 3.573161E−02 |
| A4 | 8.745338E−06 | 4.480147E−05 | −7.353891E−05 | 2.637359E−04 | −1.821115E−04 | −8.465862E−04 | 6.983037E−04 |
| A6 | −3.776418E−08 | −1.721456E−08 | −1.054626E−06 | −3.804444E−06 | 8.969530E−07 | 9.176486E−06 | −1.260809E−05 |
| A8 | 9.650521E−11 | 4.170810E−09 | −1.640488E−08 | 3.077617E−08 | −2.359672E−08 | −4.634651E−08 | 1.372702E−07 |
| A10 | −8.234251E−14 | −9.460550E−11 | −8.438237E−11 | −1.539478E−10 | 1.403294E−09 | 6.216642E−10 | 2.008860E−10 |
| A12 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 | 14 | 15 |
|---|---|---|---|---|---|---|---|
| k | −4.104538E+01 | −5.000000E+01 | −4.604627E+00 | −5.000000E+01 | −4.991656E+01 | −7.206758E+00 | −7.069013E+00 |
| A4 | −6.559872E−04 | −1.243135E−04 | 3.982165E−04 | −5.218646E−04 | 3.107251E−04 | 4.497917E−04 | −1.065016E−03 |
| A6 | 2.037929E−06 | 3.920058E−06 | −2.778222E−06 | −5.099145E−06 | 8.339285E−06 | −1.374238E−05 | 2.020802E−05 |
| A8 | 2.811369E−08 | 1.485200E−07 | 1.185545E−07 | 1.929204E−07 | −1.937994E−07 | 1.340484E−07 | 9.454363E−07 |
| A10 | 7.477176E−10 | 2.015974E−09 | 4.349302E−09 | −5.270665E−09 | −3.252633E−09 | 3.920312E−09 | 1.946195E−08 |
| A12 | 0.000000E+00 | 0.000000E+00 | 0.000000E+00 | 0.000000E+00 | 0.000000E+00 | 0.000000E+00 | 0.000000E+00 |

| Surface No | 16 | 17 |
|---|---|---|
| k | −5.000000E+01 | 6.618714E+00 |
| A4 | −5.344279E−04 | 2.287351E−05 |

TABLE 4-continued

The Aspheric Coefficients of the Second Embodiment
Aspheric Coefficients

| | | |
|---|---|---|
| A6  | −8.414056E−06 | −3.150623E−07 |
| A8  | 2.234396E−08  | 5.208044E−07  |
| A10 | −1.657816E−09 | −6.182816E−09 |
| A12 | 0.000000E+00  | 0.000000E+00  |

In the second embodiment, the form of the aspheric surface equation therein is presented as that in the first embodiment. Besides, the definition of parameters in the following tables is equivalent to that in the first embodiment, so that the repetitive details are not stated here.

The following conditional values may be obtained according to the data in Table 3 and Table 4.

| Second Embodiment (Primary reference wavelength = 555 nm) ||||||
|---|---|---|---|---|---|
| |f/f1| | |f/f2| | |f/f3| | |f/f4| | |f/f5| | |f/f6| |
| 0.4785 | 0.4896 | 0.1394 | 0.4810 | 0.1954 | 0.2063 |
| |f/f7| | |f/f8| | |f1/f2| | |f2/f3| | |f6/f7| | |f7/f8| |
| 0.3965 | 0.0320 | 1.0233 | 0.2848 | 1.9219 | 0.0807 |
| IN12/f | IN78/f | (TP1 + IN12)/TP2 || (TP8 + IN78)/TP7 ||
| 2.9982 | 0.2552 | 4.0682 || 0.7055 ||
| HOS | InTL | HOS/HOI | InS/HOS | ODT % | TDT % |
| 50.0000 | 44.6833 | 6.6667 | 0.3785 | −17.5935 | 7.4738 |
| HVT11 | HVT12 | HVT21 | HVT22 | HVT31 | HVT32 |
| 5.4701 | 0.0000 | 7.8404 | 0.0000 | 0.0000 | 3.0541 |
| HVT41 | HVT42 | HVT51 | HVT52 | HVT61 | HVT62 |
| 0.0000 | 2.3428 | 4.9474 | 5.2576 | 1.8317 | 0.0000 |
| HVT71 | HVT72 | HVT81 | HVT82 | HVT82/HOI | HVT82/HOS |
| 0.0000 | 3.7425 | 3.1632 | 0.0000 | 0.0000 | 0.0000 |
| PSTA | PLTA | NSTA | NLTA | SSTA | SLTA |
| 0.046 mm | 0.004 mm | −0.004 mm | −0.001 mm | 0.021 mm | 0.011 mm |
| VSFS0 | VSFS3 | VSFS7 | VTFS0 | VTFS3 | VTFS7 |
| 0.000 mm | 0.000 mm | 0.000 mm | 0.000 mm | 0.000 mm | 0.000 mm |
| VSMTF0 | VSMTF3 | VSMTF7 | VTMTF0 | VTMTF3 | VTMTF7 |
| 0.742 | 0.703 | 0.478 | 0.742 | 0.449 | 0.369 |
| ISFS0 | ISFS3 | ISFS7 | ITFS0 | ITFS3 | ITFS7 |
| 0.060 mm | 0.050 mm | 0.050 mm | 0.060 mm | 0.070 mm | 0.090 mm |
| ISMTF0 | ISMTF3 | ISMTF7 | ITMTF0 | ITMTF3 | ITMTF7 |
| 0.472 | 0.419 | 0.245 | 0.472 | 0.482 | 0.224 |
| FS | AIFS | AVFS | AFS | | |
| 0.060 mm | 0.063 mm | 0.000 mm | 0.063 mm | | |

The values pertaining to the outline curve lengths are obtainable according to the data in Table 3 and Table 4:

| Second Embodiment (Primary reference wavelength = 555 nm) |||||||
|---|---|---|---|---|---|---|
| ARE | ½(HEP) | ARE value | ARE − ½(HEP) | 2(ARE/HEP) % | TP | ARE/TP (%) |
| 11 | 2.657 | 2.656 | −0.00082 | 99.97% | 6.332 | 41.94% |
| 12 | 2.657 | 2.712 | 0.05505 | 102.07% | 6.332 | 42.83% |
| 21 | 2.657 | 2.673 | 0.01617 | 100.61% | 6.256 | 42.73% |
| 22 | 2.657 | 2.671 | 0.01454 | 100.55% | 6.256 | 42.70% |
| 31 | 2.657 | 2.668 | 0.01104 | 100.42% | 3.306 | 80.70% |
| 32 | 2.657 | 2.657 | −0.00009 | 100.00% | 3.306 | 80.36% |
| 41 | 2.657 | 2.681 | 0.02451 | 100.92% | 0.566 | 473.33% |
| 42 | 2.657 | 2.656 | −0.00072 | 99.97% | 0.566 | 468.87% |
| 51 | 2.657 | 2.664 | 0.00737 | 100.28% | 0.910 | 292.67% |
| 52 | 2.657 | 2.688 | 0.03145 | 101.18% | 0.910 | 295.31% |
| 61 | 2.657 | 2.656 | −0.00075 | 99.97% | 0.774 | 342.98% |
| 62 | 2.657 | 2.664 | 0.00705 | 100.27% | 0.774 | 343.99% |
| 71 | 2.657 | 2.707 | 0.05062 | 101.91% | 3.051 | 88.73% |
| 72 | 2.657 | 2.660 | 0.00362 | 100.14% | 3.051 | 87.19% |
| 81 | 2.657 | 2.657 | 0.00047 | 100.02% | 0.525 | 505.72% |
| 82 | 2.657 | 2.658 | 0.00134 | 100.05% | 0.525 | 505.89% |

-continued

Second Embodiment (Primary reference wavelength = 555 nm)

| ARS | EHD | ARS value | ARS − EHD | (ARS/EHD) % | TP | ARS/TP (%) |
|---|---|---|---|---|---|---|
| 11 | 17.909 | 17.913 | 0.004 | 100.02% | 6.332 | 282.88% |
| 12 | 8.903 | 12.358 | 3.455 | 138.81% | 6.332 | 195.16% |
| 21 | 8.223 | 8.427 | 0.203 | 102.47% | 6.256 | 134.70% |
| 22 | 8.289 | 8.817 | 0.528 | 106.37% | 6.256 | 140.94% |
| 31 | 7.025 | 7.289 | 0.265 | 103.77% | 3.306 | 220.49% |
| 32 | 6.679 | 6.711 | 0.032 | 100.48% | 3.306 | 203.00% |
| 41 | 6.641 | 6.889 | 0.248 | 103.73% | 0.566 | 1216.09% |
| 42 | 6.419 | 6.471 | 0.052 | 100.81% | 0.566 | 1142.25% |
| 51 | 6.109 | 6.170 | 0.061 | 101.00% | 0.910 | 677.79% |
| 52 | 5.965 | 6.076 | 0.111 | 101.87% | 0.910 | 667.47% |
| 61 | 5.918 | 6.043 | 0.124 | 102.10% | 0.774 | 780.28% |
| 62 | 6.044 | 6.120 | 0.075 | 101.25% | 0.774 | 790.27% |
| 71 | 6.169 | 6.621 | 0.452 | 107.32% | 3.051 | 216.97% |
| 72 | 5.929 | 5.944 | 0.015 | 100.25% | 3.051 | 194.80% |
| 81 | 5.450 | 5.514 | 0.063 | 101.16% | 0.525 | 1049.31% |
| 82 | 5.478 | 5.558 | 0.080 | 101.46% | 0.525 | 1057.86% |

The following conditional values may be obtained according to the data in Table 3 and Table 4.

Values Related to Inflection Point of Second Embodiment
(Primary Reference Wavelength = 555 nm)

| HIF111 | 3.0139 | HIF111/HOI | 0.4019 | SGI111 | −0.0032 | SGI111 /( SGI111 + TP1) | 0.0005 |
|---|---|---|---|---|---|---|---|
| HIF211 | 5.5188 | HIF211/HOI | 0.7358 | SGI211 | 1.0570 | SGI211 /( SGI211 + TP2) | 0.1445 |
| HIF321 | 1.6988 | HIF321/HOI | 0.2265 | SGI321 | 0.0330 | SGI321 /( SGI321 + TP3) | 0.0099 |
| HIF322 | 6.1144 | HIF322/HOI | 0.8152 | SGI322 | −0.253842 | SGI322 /( SGI322 + TP3) | 0.0713 |
| HIF411 | 5.9363 | HIF411/HOI | 0.7915 | SGI411 | −1.3869 | SGI411 /( SGI411 + TP4) | 0.7100 |
| HIF421 | 1.3432 | HIF421/HOI | 0.1791 | SGI421 | 0.0107 | SGI421 /( SGI421 + TP4) | 0.0186 |
| HIF422 | 6.0427 | HIF422/HOI | 0.8057 | SGI422 | −0.4328 | SGI422 /( SGI422 + TP4) | 0.4331 |
| HIF511 | 3.2882 | HIF511/HOI | 0.4384 | 0.2645 | −0.2645 | SGI511 /( SGI511 + TP5) | 0.2251 |
| HIF521 | 3.3722 | HIF521/HOI | 0.4496 | SGI521 | −0.5507 | SGI521 /( SGI521 + TP5) | 0.3769 |
| HIF611 | 1.0656 | HIF611/HOI | 0.1421 | SGI611 | 0.0035 | SGI611 /( SGI611 + TP6) | 0.0045 |
| HIF621 | 4.8554 | HIF621/HOI | 0.6474 | SGI621 | 0.6176 | SGI621 /( SGI621 + TP6) | 0.4437 |
| HIF721 | 2.1128 | HIF721/HOI | 0.2817 | SGI721 | 0.1009 | SGI721 /( SGI721 + TP7) | 0.0320 |
| HIF722 | 5.1581 | HIF722/HOI | 0.6877 | SGI722 | 0.0733 | SGI722 /( SGI722 + TP7) | 0.0235 |
| HIF811 | 1.8666 | HIF811/HOI | 0.2489 | SGI811 | 0.0479 | SGI811 /( SGI811 + TP8) | 0.0830 |

Third Embodiment

Figure 3A:
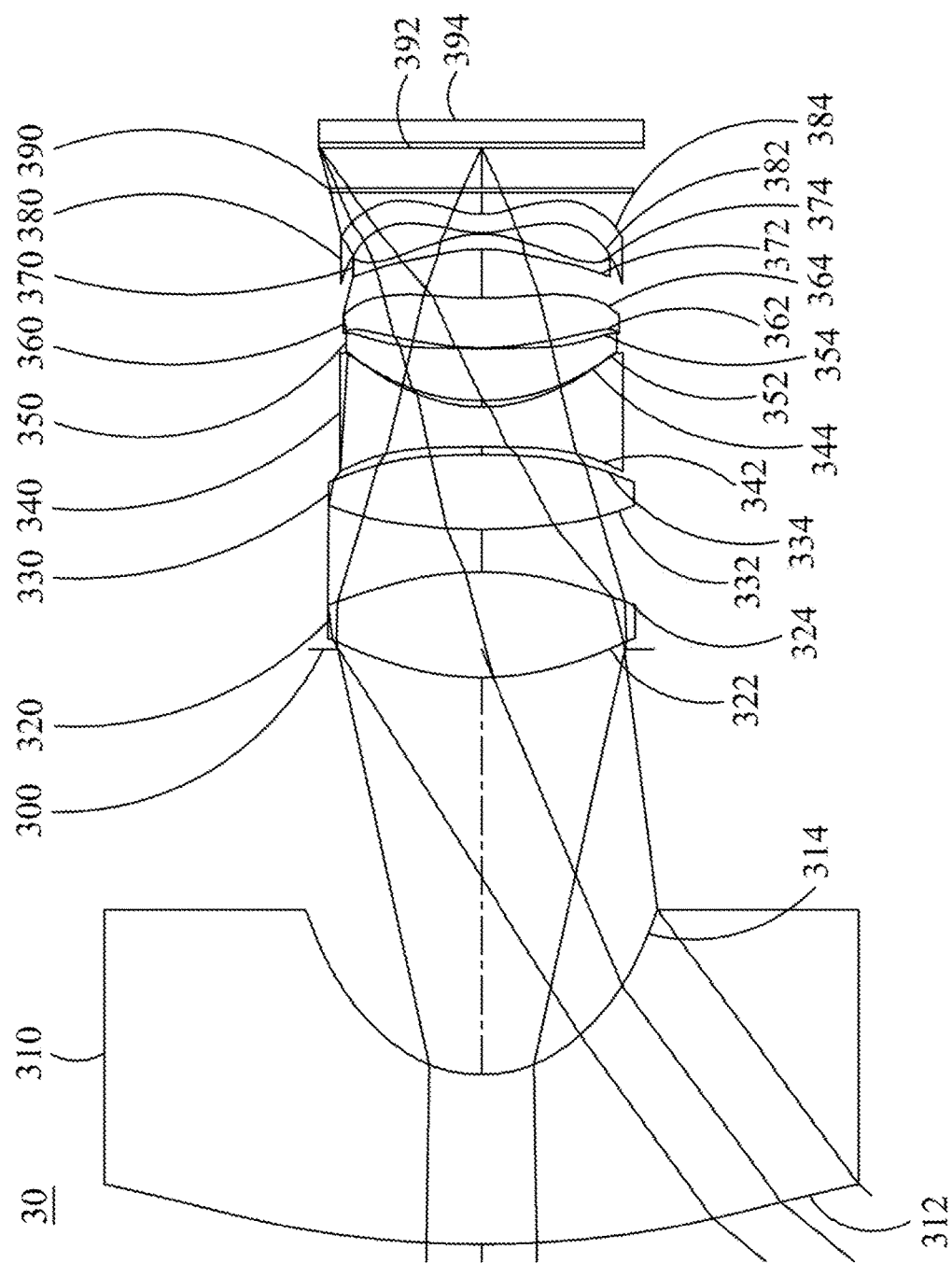
FIG. 3A is a schematic view of the optical image capturing system according to the third embodiment of the present invention.
Figure 3B:
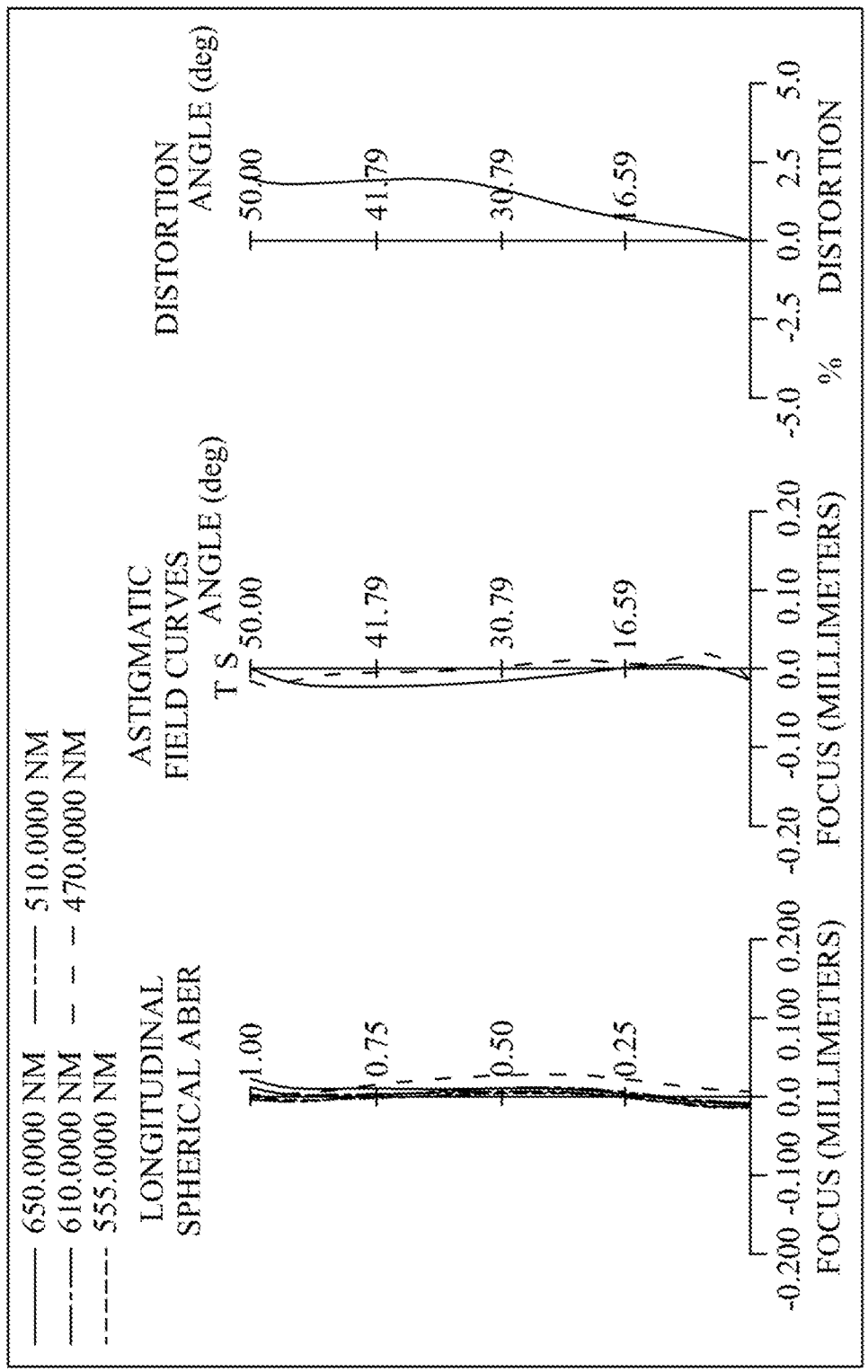
FIG. 3B shows the longitudinal spherical aberration curves, astigmatic field curves, and optical distortion curve of the optical image capturing system in the order from left to right according to the third embodiment of the present invention.
Figure 3C:
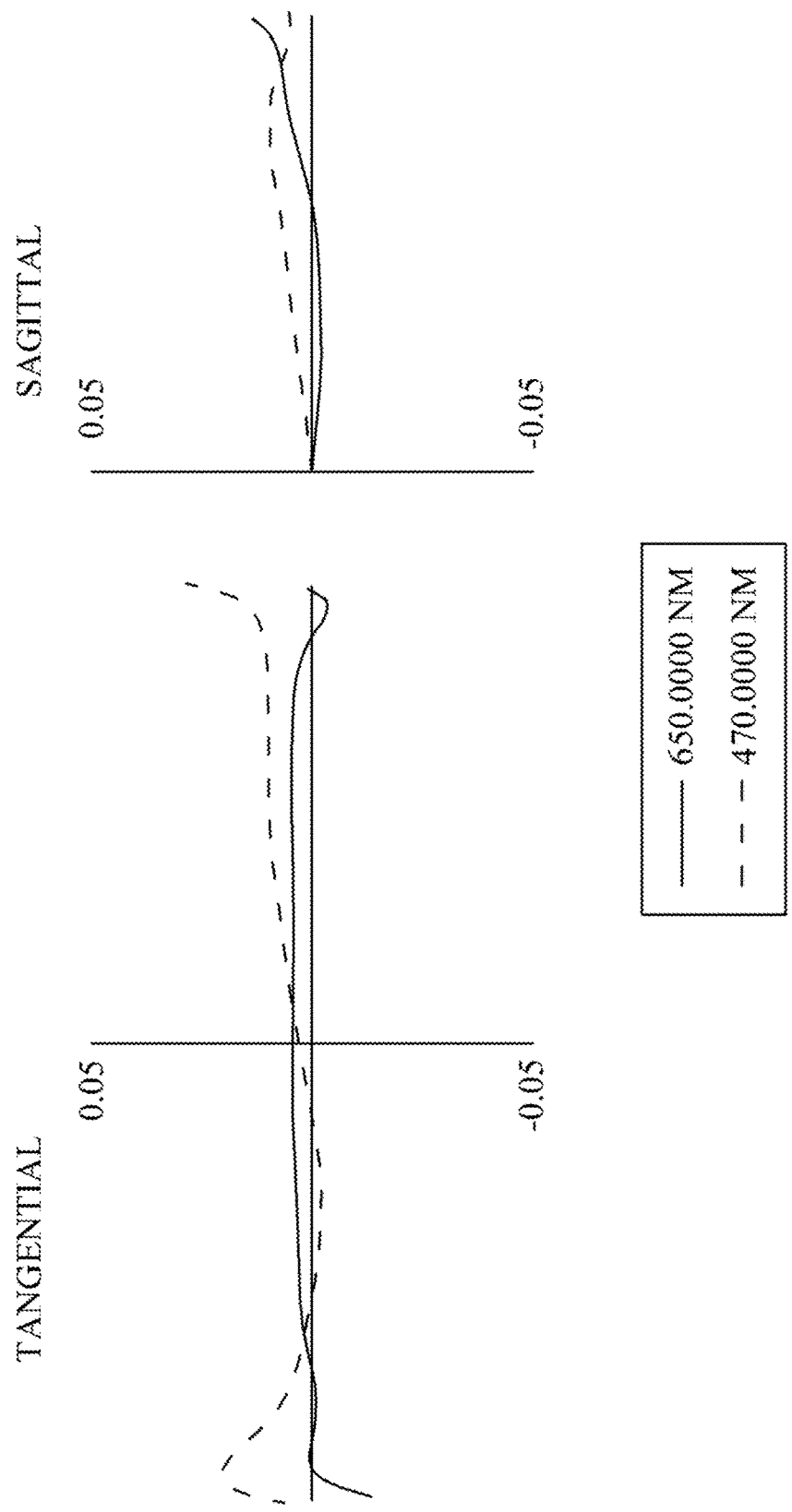
FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the third embodiment of the present disclosure.
Figure 3D:
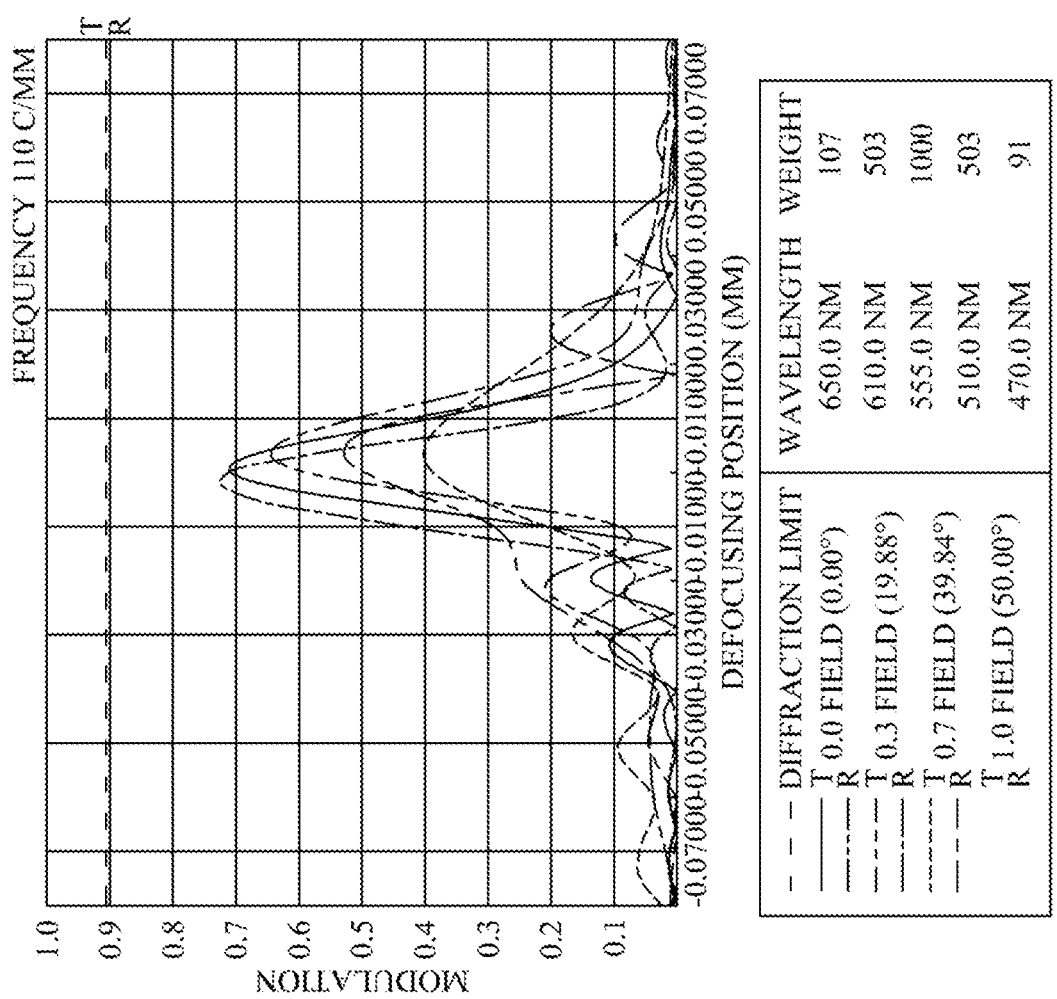
FIG. 3D is a diagram illustrating the through focus MTF values for the visible light spectrum at the central field of view, 0.3 field of view and 0.7 field of view according to the third embodiment of the present disclosure.
Figure 3E:
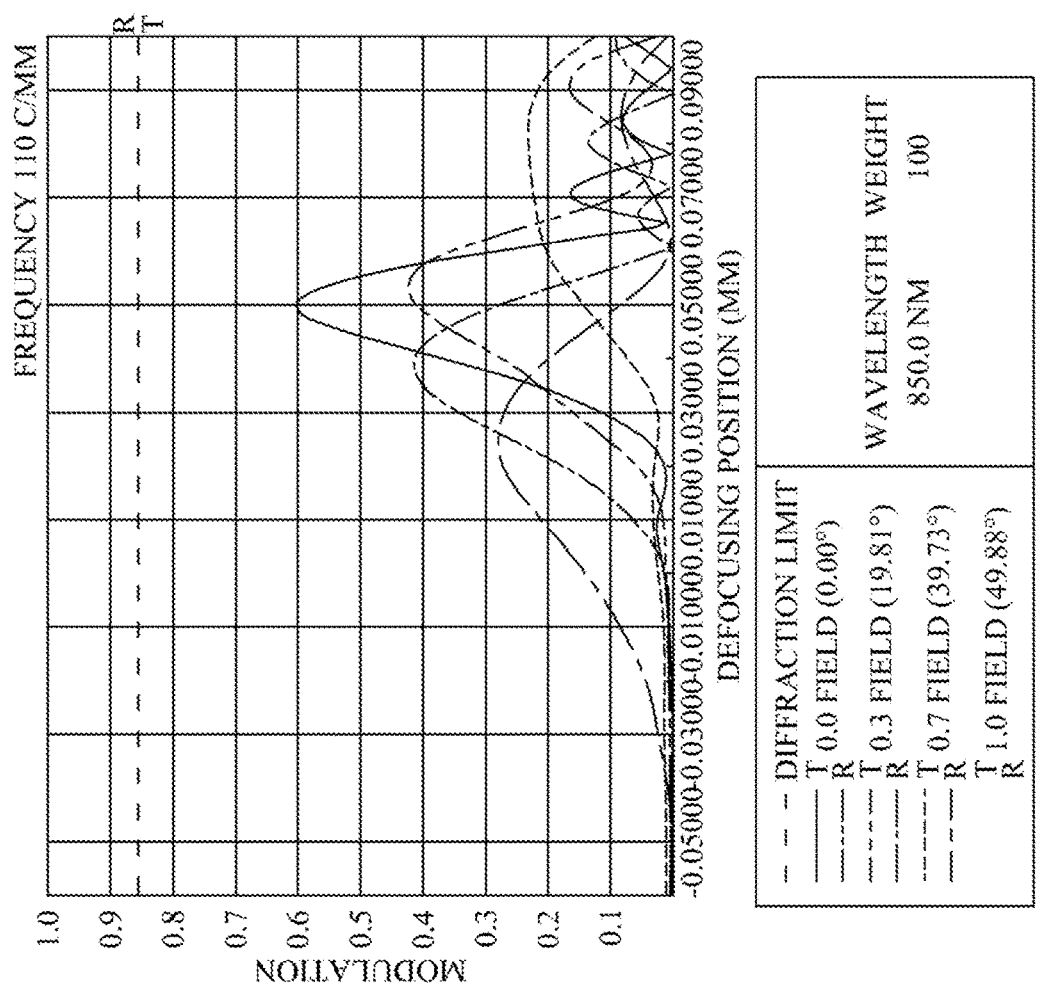
FIG. 3E is a diagram illustrating the through focus MTF values for the infrared light spectrum at the central field of view, 0.3 field of view and 0.7 field of view according to the third embodiment of the present disclosure.

Please refer to FIG. 3A and FIG. 3B, wherein FIG. 3A is a schematic view of the optical image capturing system according to the third embodiment of the present invention and FIG. 3B shows the longitudinal spherical aberration curves, astigmatic field curves, and optical distortion curve of the optical image capturing system in the order from left to right according to the third embodiment of the present invention. FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the third embodiment of the present disclosure. FIG. 3D is a diagram illustrating the through focus MTF values for the visible light spectrum at the central field of view, 0.3 field of view and 0.7 field of view according to the first embodiment of the present disclosure. FIG. 3E is a diagram illustrating the through focus MTF values for the infrared light spectrum at the central field of view, 0.3 field of view and 0.7 field of view according to the third embodiment of the present disclosure.

As shown in FIG. 3A, in the order from an object side to an image side, the optical image capturing system includes a first lens 310, an aperture 300, a second lens 320, a third lens 330, a fourth lens 340, a fifth lens 350, a sixth lens 360, a seventh lens 370, an eighth lens 380, an infrared filter 390, a first image plane 392, a second image plane and an image sensing device 394.

The first lens 310 has negative refractive power and is made of plastic material. The object side 312 of the first lens 310 is a convex surface and the image side 314 of the first lens 310 is a concave surface. Both the object side 312 and the image side 314 of the first lens 310 are aspheric. The object side 312 of the first lens 310 has one inflection point.

The second lens 320 has positive refractive power and is made of plastic. The object side 322 of the second lens 320 is a convex surface and the image side 324 of the second lens 320 is a convex surface. Both the object side 322 and the image side 324 of the second lens 320 are aspheric.

The third lens 330 has positive refractive power and is made of plastic. The object side 332 of the third lens 330 is a convex surface and the image side 334 of the third lens 330 is a convex surface. Both the object side 332 and the image side 334 of the third lens 330 are aspheric. The image side 334 of the third lens 330 has one inflection point.

The fourth lens 340 has negative refractive power and is made of plastic. The object side 342 of the fourth lens 340 is a concave surface and the image side 344 of the fourth lens 340 is a concave surface. The object side 342 of the fourth lens 340 has one inflection point.

The fifth lens 350 has positive refractive power and is made of plastic. The object side 352 of the fifth lens 350 is a convex surface and the image side 354 of the fifth lens 350 is a convex surface. Both the object side 352 and the image side 354 of the fifth lens 350 are aspheric. The image side 354 of the fifth lens 350 has two inflection points.

The sixth lens 360 has positive refractive power and is made of plastic. The object side 362 of the sixth lens 360 is a convex surface and the image side 364 of the sixth lens 360 is a concave surface. Both the object side 362 and the image side 364 of the sixth lens 360 are aspheric. Hereby, the angle of incident at the sixth lens 360 at each field of view may be effectively adjusted so as to improve the aberration.

The seventh lens 370 has positive refractive power and is made of plastic. The object side 372 of the seventh lens is a concave surface and the image side 374 of the seventh lens is a convex surface. Both the object side 372 and the image side 374 of the seventh lens are aspheric. Hereby, the configuration is beneficial to shorten the back focal length of the optical image capturing system so as to keep its miniaturization. Besides, the object side 372 and the image side 374 of the seventh lens all have one inflection point, the incident angle of the off-axis rays can be reduced effectively, thereby further correcting the off-axis aberration.

The eighth lens 380 has negative refractive power and is made of plastic. The object side 382 of the eighth lens 380 is a convex surface and the image side 384 of the eighth lens 380 is a concave surface. Both the object side 382 and the image side 384 of the eighth lens 380 are aspheric. Hereby, the configuration is beneficial to shorten the back focal length of the optical image capturing system so as to keep its miniaturization. Besides, both the object side 382 and the image side 384 of the eighth lens 380 have one inflection point, and the incident angle of the off-axis rays can be reduced effectively, thereby further correcting the off-axis aberration.

The infrared filter 390 is made of glass and is disposed between the eighth lens 380 and the first image plane 392. The infrared filter 390 does not affect the focal length of the optical image capturing system.

The contents in Tables 5 and 6 below should be incorporated into the reference of the present embodiment.

TABLE 5

Lens Parameters for the Embodiment
f(focal length) = 6.1648 mm; f/HEP = 1.2; HAF(half angle of view) = 49.9999 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 54.81314607 | 7.995 | Plastic | 1.565 | 58.00 | −13.317 |
| 2 | | 6.284050813 | 20.021 | | | | |
| 3 | Aperture | 1E+18 | −1.328 | | | | |
| 4 | Second Lens | 12.99154508 | 4.937 | Plastic | 1.565 | 54.50 | 12.905 |
| 5 | | −14.44355481 | 2.003 | | | | |
| 6 | Third Lens | 23.52813799 | 3.515 | Plastic | 1.543 | 56.50 | 25.779 |
| 7 | | −32.99833585 | 0.386 | | | | |
| 8 | Fourth Lens | −50.57829115 | 1.874 | Plastic | 1.661 | 20.40 | −8.706 |
| 9 | | 6.65502044 | 0.304 | | | | |
| 10 | Fifth Lens | 9.990243724 | 2.438 | Plastic | 1.565 | 58.00 | 17.515 |
| 11 | | −1429.027789 | 0.050 | | | | |
| 12 | Sixth Lens | 12.71223434 | 2.349 | Plastic | 1.565 | 58.00 | 62.073 |
| 13 | | 18.57368315 | 2.245 | | | | |
| 14 | Seventh Lens | −5.41231417 | 0.748 | Plastic | 1.565 | 58.00 | 23.578 |
| 15 | | −4.044623666 | 0.050 | | | | |
| 16 | Eighth Lens | 3.980510886 | 0.896 | Plastic | 1.661 | 20.40 | −89.901 |
| 17 | | 3.396424336 | 1.000 | | | | |
| 18 | Infrared Filter | 1E+18 | 0.200 | BK_7 | 1.517 | 64.2 | |
| 19 | | 1E+18 | 1.884 | | | | |
| 20 | First Image Plane | 1E+18 | 0.014 | | | | |

Reference Wavelength (d-line): 555 nm

TABLE 6

The Aspheric Coefficients of the Third Embodiment
Table 6: Aspheric Coefficients

| Surface No | 1 | 2 | 4 | 5 | 6 | 7 | 8 |
|---|---|---|---|---|---|---|---|
| k | 3.370127E+00 | −5.723285E−01 | −4.300995E−01 | 4.644583E−01 | −6.551540E+00 | 9.035099E+00 | 2.915106E+01 |
| A4 | 1.699406E−05 | 1.245508E−04 | −4.871245E−05 | 1.893597E−04 | −1.133139E−04 | −2.387423E−04 | −2.386921E−04 |
| A6 | −1.069473E−07 | 9.426423E−07 | −1.984065E−07 | −5.041696E−07 | 4.541605E−06 | −4.205935E−07 | −6.549488E−06 |

TABLE 6-continued

The Aspheric Coefficients of the Third Embodiment
Table 6: Aspheric Coefficients

| | | | | | | | |
|---|---|---|---|---|---|---|---|
| A8  | 1.465769E−10  | 5.492683E−09  | −1.267792E−08 | −1.354202E−08 | −6.808611E−08 | 2.041335E−08 | 3.567825E−08 |
| A10 | −5.695906E−14 | 1.307686E−10  | 1.198372E−10  | 2.365872E−10  | 1.041814E−09  | 3.522812E−10 | 1.071550E−09 |
| A12 | 0.000000E+00  | 0.000000E+00  | 0.000000E+00  | 0.000000E+00  | 0.000000E+00  | 0.000000E+00 | 0.000000E+00 |

| Surface No | 9 | 10 | 11 | 12 | 13 | 14 | 15 |
|---|---|---|---|---|---|---|---|
| k   | −1.711866E−01 | 8.989668E−01  | 5.000000E+01  | −1.060362E+01 | −1.916015E+01 | −2.550824E+01 | −6.658597E+00 |
| A4  | −8.347412E−04 | 1.414611E−04  | 6.603477E−04  | −2.840374E−04 | −8.231024E−04 | 1.628115E−04  | −1.756415E−04 |
| A6  | 5.094793E−06  | −9.569978E−06 | 1.266918E−05  | 6.019801E−06  | −1.152206E−05 | −2.234133E−05 | 1.309262E−05  |
| A8  | −9.231836E−08 | 2.012949E−07  | −4.607499E−07 | 5.758939E−07  | 4.484477E−07  | 1.681755E−07  | 2.328071E−07  |
| A10 | −1.433059E−09 | −4.444287E−09 | 5.721538E−10  | −1.745097E−08 | −6.051907E−09 | 4.641000E−09  | −1.041996E−10 |
| A12 | 0.000000E+00  | 0.000000E+00  | 0.000000E+00  | 0.000000E+00  | 0.000000E+00  | 0.000000E+00  | 0.000000E+00  |

| Surface No | 16 | 17 |
|---|---|---|
| k   | −1.222669E+01 | −9.226652E+00 |
| A4  | −1.875923E−03 | −2.022724E−03 |
| A6  | −1.205117E−05 | 1.561214E−05  |
| A8  | 9.303431E−07  | −1.440317E−08 |
| A10 | −1.977824E−08 | −3.400772E−09 |
| A12 | 0.000000E+00  | 0.000000E+00  |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.4629 | 0.4777 | 0.2391 | 0.7081 | 0.3520 | 0.0993 |
| \| f/f7 \| | \| f/f8 \| | \| f1/f2 \| | \| f2/f3 \| | \| f6/f7 \| | \| f7/f8 \| |
| 0.2615 | 0.0686 | 1.0319 | 0.5006 | 2.6327 | 0.2623 |
| IN12/f | IN78/f | (TP1 + IN12)/TP2 | | (TP8 + IN78)/TP7 | |
| 3.0322 | 0.0081 | 5.4059 | | 1.2659 | |
| HOS | InTL | HOS/HOI | InS/HOS | ODT % | TDT % |
| 51.5805 | 48.4829 | 6.8774 | 0.4568 | 2.0066 | 0.2173 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 0.0000 | 0.0000 | 0.5127 | 5.7997 | 3.3875 |
| HVT71 | HVT72 | HVT81 | HVT82 | HVT82/HOI | HVT82/HOS |
| 0.0000 | 5.2230 | 3.3227 | 3.6251 | 0.4833 | 0.0703 |
| PSTA | PLTA | NSTA | NLTA | SSTA | SLTA |
| 0.031 mm | 0.001 mm | −0.014 mm | 0.007 mm | 0.006 mm | 0.014 mm |
| VSFS0 | VSFS3 | VSFS7 | VTFS0 | VTFS3 | VTFS7 |
| 0.000 mm | 0.000 mm | 0.000 mm | 0.000 mm | 0.000 mm | 0.000 mm |
| VSMTF0 | VSMTF3 | VSMTF7 | VTMTF0 | VTMTF3 | VTMTF7 |
| 0.708 | 0.711 | 0.497 | 0.708 | 0.590 | 0.388 |
| ISFS0 | ISFS3 | ISFS7 | ITFS0 | ITFS3 | ITFS7 |
| 0.050 mm | 0.040 mm | 0.020 mm | 0.050 mm | 0.050 mm | 0.080 mm |
| ISMTF0 | ISMTF3 | ISMTF7 | ITMTF0 | ITMTF3 | ITMTF7 |
| 0.602 | 0.413 | 0.272 | 0.602 | 0.410 | 0.232 |

-continued

| Third Embodiment (Primary Reference Wavelength = 555 nm) | | | |
|---|---|---|---|
| FS | AIFS | AVFS | AFS |
| 0.050 mm | 0.048 mm | 0.000 mm | 0.048 mm |

The values pertaining to the outline curve lengths are obtainable according to the data in Table 5 and Table 6:

| Third Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 2.569 | 2.569 | 0.00032 | 100.01% | 7.995 | 32.13% |
| 12 | 2.569 | 2.643 | 0.07400 | 102.88% | 7.995 | 33.05% |
| 21 | 2.569 | 2.585 | 0.01586 | 100.62% | 4.937 | 52.35% |
| 22 | 2.569 | 2.581 | 0.01208 | 100.47% | 4.937 | 52.27% |
| 31 | 2.569 | 2.573 | 0.00394 | 100.15% | 3.515 | 73.18% |
| 32 | 2.569 | 2.571 | 0.00275 | 100.11% | 3.515 | 73.15% |
| 41 | 2.569 | 2.570 | 0.00109 | 100.04% | 1.874 | 137.13% |
| 42 | 2.569 | 2.625 | 0.05640 | 102.20% | 1.874 | 140.08% |
| 51 | 2.569 | 2.599 | 0.03039 | 101.18% | 2.438 | 106.61% |
| 52 | 2.569 | 2.568 | −0.00024 | 99.99% | 2.438 | 105.35% |
| 61 | 2.569 | 2.581 | 0.01221 | 100.48% | 2.349 | 109.86% |
| 62 | 2.569 | 2.572 | 0.00301 | 100.12% | 2.349 | 109.47% |
| 71 | 2.569 | 2.594 | 0.02535 | 100.99% | 0.748 | 347.01% |
| 72 | 2.569 | 2.646 | 0.07748 | 103.02% | 0.748 | 353.98% |
| 81 | 2.569 | 2.604 | 0.03509 | 101.37% | 0.896 | 290.50% |
| 82 | 2.569 | 2.620 | 0.05107 | 101.99% | 0.896 | 292.29% |
| ARS | EHD | ARS value | ARS − EHD | (ARS/EHD) % | TP | ARS/TP (%) |
| 11 | 17.862 | 18.166 | 0.304 | 101.70% | 7.995 | 227.21% |
| 12 | 8.259 | 12.291 | 4.031 | 148.81% | 7.995 | 153.73% |
| 21 | 6.930 | 7.211 | 0.280 | 104.04% | 4.937 | 146.06% |
| 22 | 7.145 | 7.353 | 0.208 | 102.92% | 4.937 | 148.95% |
| 31 | 7.102 | 7.245 | 0.143 | 102.02% | 3.515 | 206.09% |
| 32 | 6.876 | 7.036 | 0.160 | 102.32% | 3.515 | 200.15% |
| 41 | 6.614 | 6.811 | 0.197 | 102.98% | 1.874 | 363.45% |
| 42 | 6.246 | 6.861 | 0.615 | 109.85% | 1.874 | 366.10% |
| 51 | 6.332 | 6.903 | 0.570 | 109.01% | 2.438 | 283.14% |
| 52 | 6.321 | 6.397 | 0.077 | 101.21% | 2.438 | 262.41% |
| 61 | 6.321 | 6.421 | 0.101 | 101.60% | 2.349 | 273.34% |
| 62 | 6.474 | 6.736 | 0.262 | 104.05% | 2.349 | 286.74% |
| 71 | 6.035 | 6.192 | 0.157 | 102.60% | 0.748 | 828.39% |
| 72 | 5.986 | 6.209 | 0.224 | 103.74% | 0.748 | 830.63% |
| 81 | 5.997 | 6.660 | 0.663 | 111.05% | 0.896 | 743.03% |
| 82 | 6.591 | 7.328 | 0.737 | 111.19% | 0.896 | 817.64% |

The following values for the conditional expressions can be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF111 | 14.2439 | HIF111/HOI | 1.8992 | SGI111 | 2.0473 | \|SGI111\|/(\|SGI111\| + TP1) | 0.2039 |
| HIF321 | 6.6357 | HIF321/HOI | 0.8848 | SGI321 | −1.1173 | \|SGI321\|/(\|SGI321\| + TP3) | 0.2412 |
| HIF521 | 0.2964 | HIF521/HOI | 0.0395 | SGI521 | −0.000026 | \|SGI521\|/(\|SGI521\| + TP5) | 0.0000 |
| HIF522 | 5.2345 | HIF522/HOI | 0.6979 | SGI522 | 0.4959 | \|SGI522\|/(\|SGI522\| + TP5) | 0.1690 |
| HIF611 | 4.7523 | HIF611/HOI | 0.6336 | SGI611 | 0.6738 | \|SGI611\|/(\|SGI611\| + TP6) | 0.2229 |
| HIF621 | 1.9439 | HIF621/HOI | 0.2592 | SGI621 | 0.0848 | \|SGI621\|/(\|SGI621\| + TP6) | 0.0348 |
| HIF711 | 5.3259 | HIF711/HOI | 0.7101 | SGI711 | −1.0622 | \|SGI711\|/(\|SGI711\| + TP7) | 0.5869 |
| HIF721 | 3.0998 | HIF721/HOI | 0.4133 | SGI721 | −0.7741 | \|SGI721\|/(\|SGI721\| + TP7) | 0.5087 |
| HIF811 | 1.5576 | HIF811/HOI | 0.2077 | SGI811 | 0.2189 | \|SGI811\|/(\|SGI811\| + TP8) | 0.1963 |
| HIF821 | 1.6199 | HIF821/HOI | 0.2160 | SGI821 | 0.2731 | \|SGI821\|/(\|SGI821\| + TP8) | 0.2335 |

Fourth Embodiment

Figure 4A:
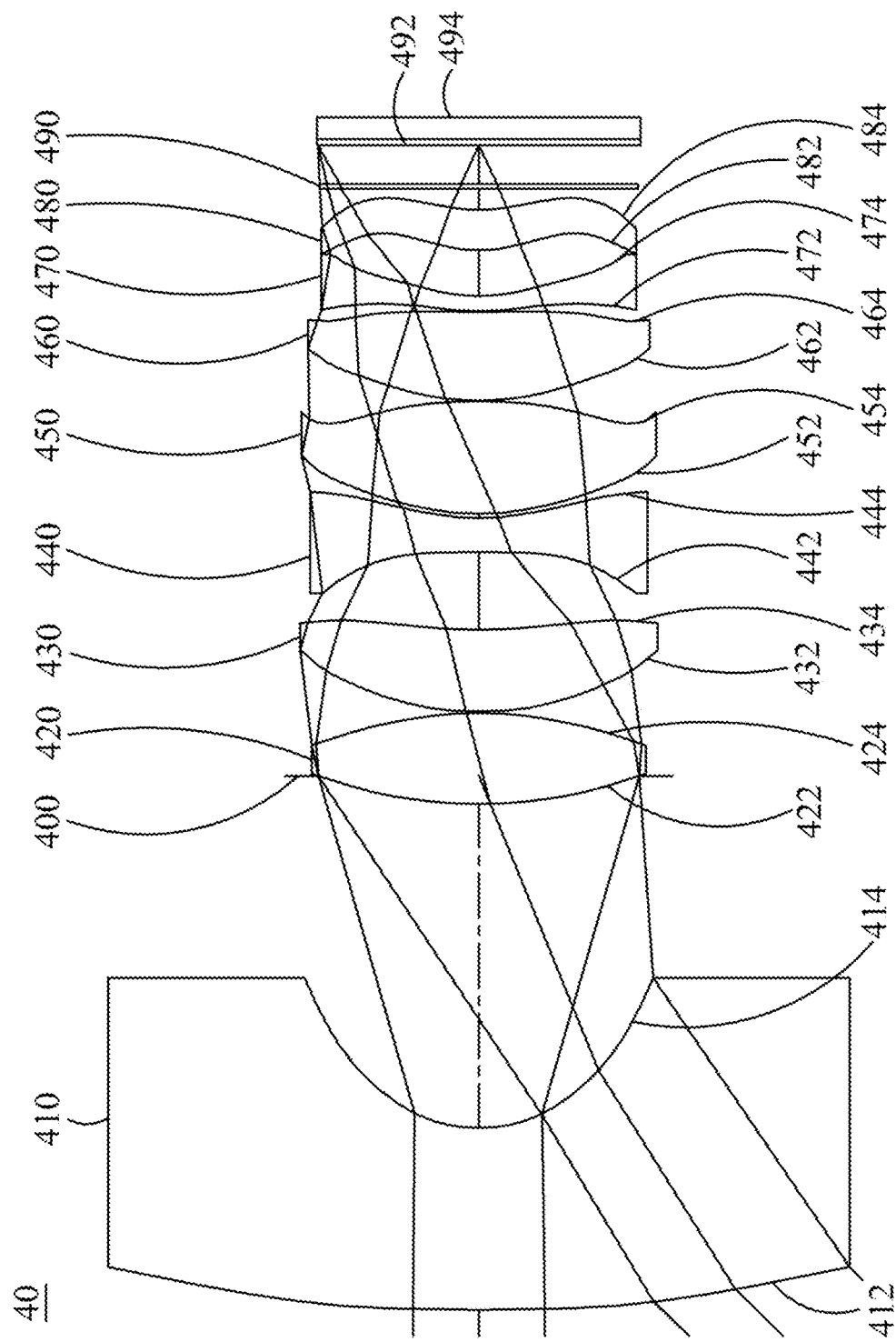
FIG. 4A is a schematic view of the optical image capturing system according to the fourth embodiment of the present invention.
Figure 4B:
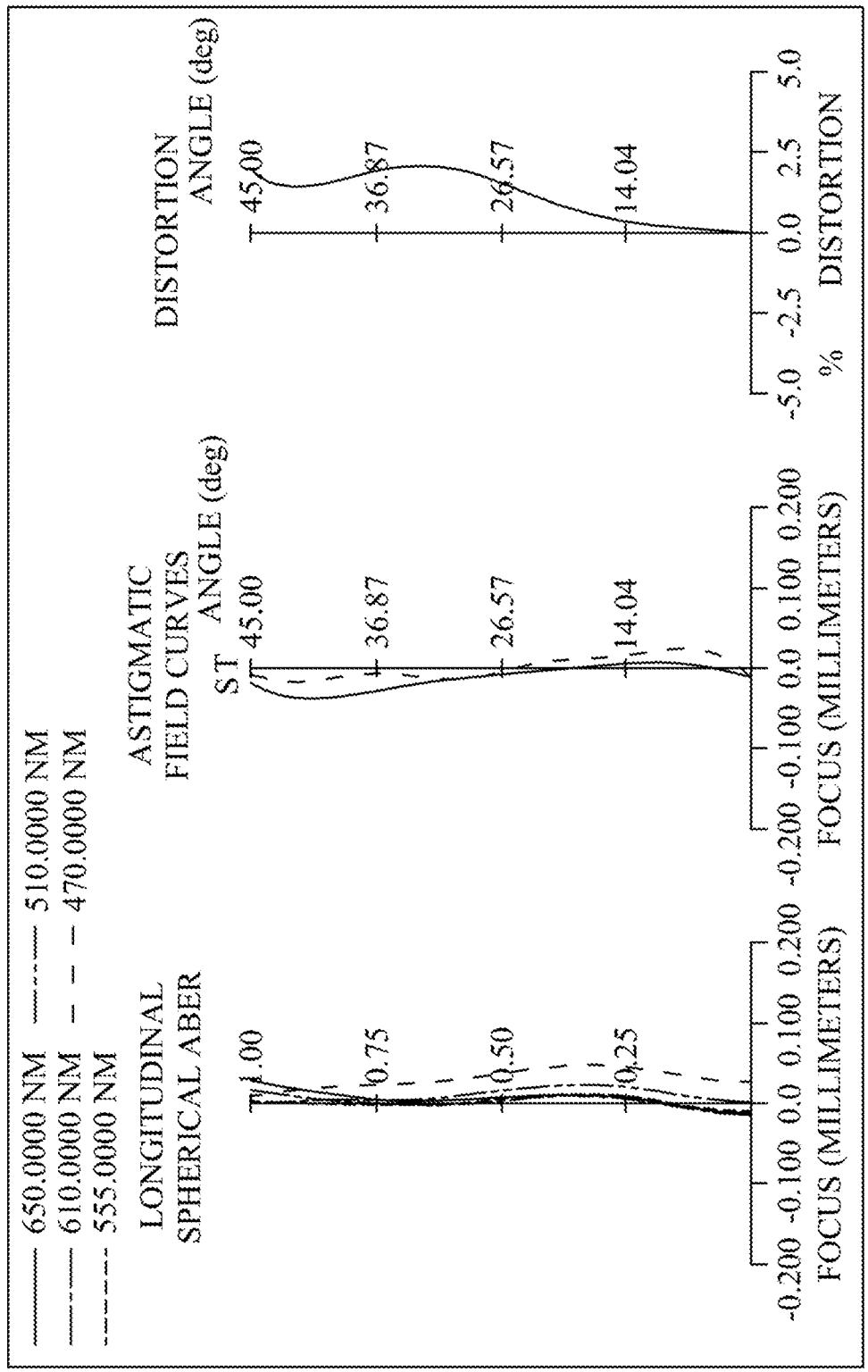
FIG. 4B shows the longitudinal spherical aberration curves, astigmatic field curves, and optical distortion curve of the optical image capturing system in the order from left to right according to the fourth embodiment of the present invention.
Figure 4D:
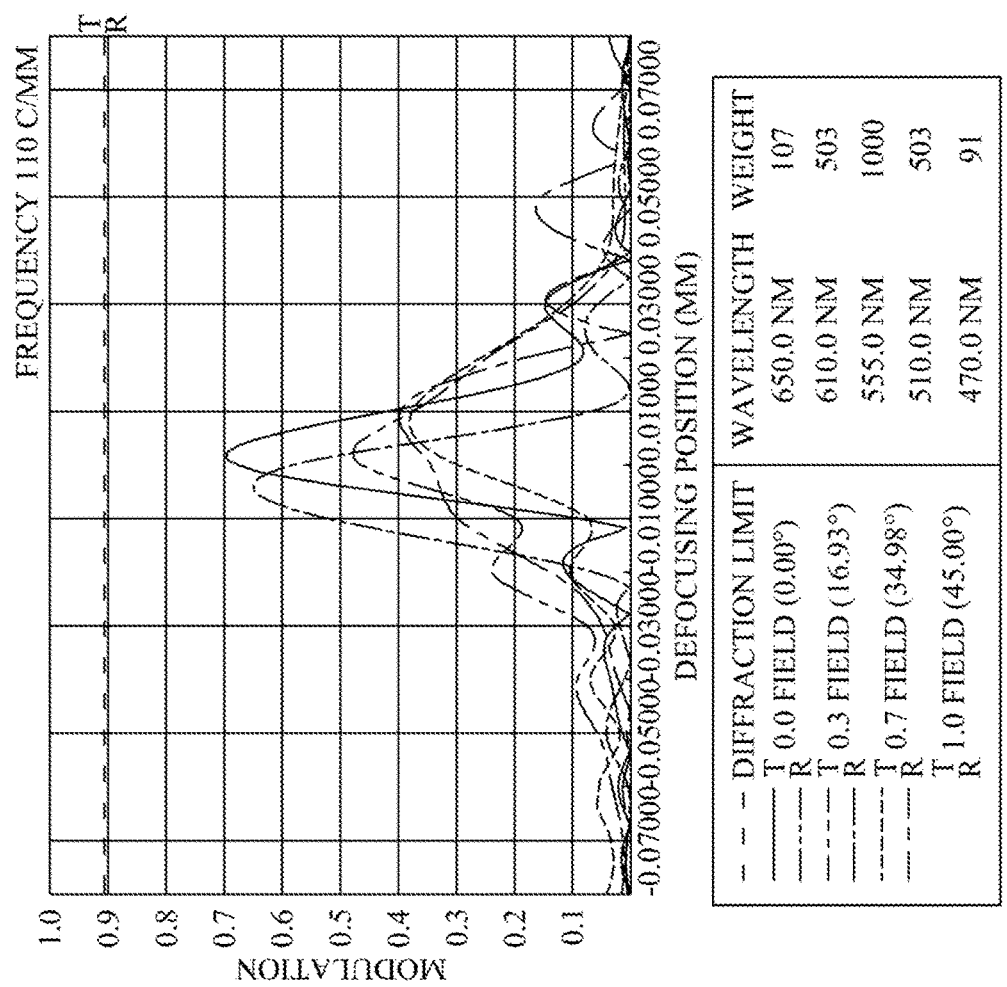
FIG. 4D is a diagram illustrating the through focus MTF values for the visible light spectrum at the central field of view, 0.3 field of view and 0.7 field of view according to the fourth embodiment of the present disclosure.
Figure 4E:
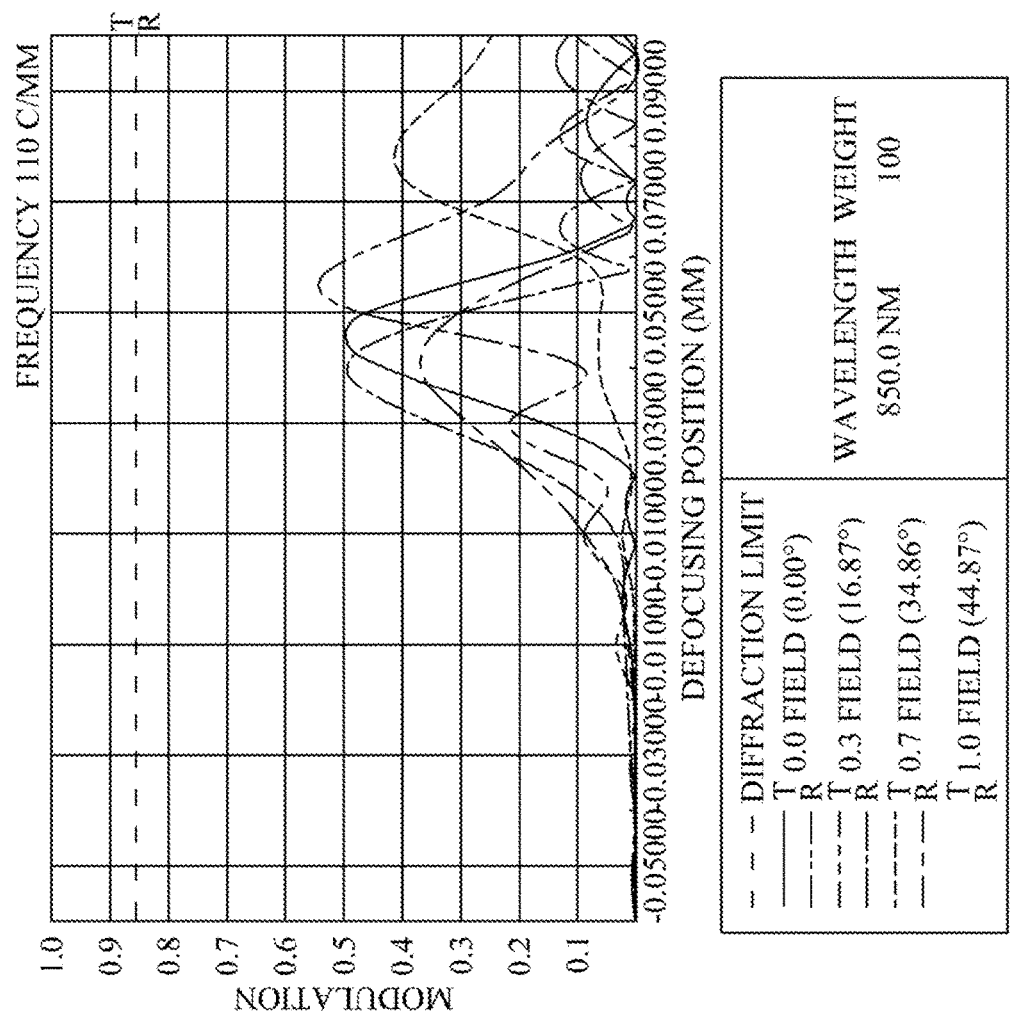
FIG. 4E is a diagram illustrating the through focus MTF values for the infrared light spectrum at the central field of view, 0.3 field of view and 0.7 field of view according to the fourth embodiment of the present disclosure.

Please refer to FIG. 4A and FIG. 4B, wherein FIG. 4A is a schematic view of the optical image capturing system according to the fourth embodiment of the present invention and FIG. 4B shows the longitudinal spherical aberration curves, astigmatic field curves, and optical distortion curve of the optical image capturing system in the order from left to right according to the fourth embodiment of the present invention. FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the fourth embodiment of the present disclosure. FIG. 4D is a diagram illustrating the through focus MTF values for the visible light spectrum at the central field of view, 0.3 field of view and 0.7 field of view according to the first embodiment of the present disclosure. FIG. 4E is a diagram illustrating the through focus MTF values for the infrared light spectrum at the central field of view, 0.3 field of view and 0.7 field of view according to the fourth embodiment of the present disclosure.

As shown in FIG. 4A, in the order from an object side to an image side, the optical image capturing system includes a first lens 410, an aperture 400, a second lens 420, a third lens 430, a fourth lens 440, a fifth lens 450, a sixth lens 460, a seventh lens 470, an eighth lens 480, an infrared filter 490, a first image plane 492, a second image plane and an image sensing device 494.

The first lens 410 has negative refractive power and is made of plastic. The object side 412 of the first lens 410 is a convex surface and the image side 414 of the first lens 410 is a concave surface. Both the object side 412 and the image side 414 of the first lens 410 are aspheric.

The second lens 420 has positive refractive power and is made of plastic. The object side 422 of the second lens 420 is a convex surface and the image side 424 of the second lens 420 is a convex surface. Both the object side 422 and the image side 424 of the second lens 420 are aspheric.

The third lens 430 has positive refractive power and is made of plastic. The object side 432 of the third lens 430 is a convex surface and the image side 434 of the third lens 430 is a concave surface. Both the object side 432 and the image side 434 of the third lens 430 are aspheric. The image side 434 of the third lens 430 has one inflection point.

The fourth lens 440 has negative refractive power and is made of plastic. The object side 442 of the fourth lens 440 is a concave surface and the image side 444 of the fourth lens 440 is a concave surface. Both the object side 442 and the image side 444 of the fourth lens 440 are aspheric. The image side 444 of the fourth lens 440 has one inflection point.

The fifth lens 450 has positive refractive power and is made of plastic. The object side 452 of the fifth lens 450 is a convex surface and the image side 454 of the fifth lens 450 is a convex surface. Both the object side 452 and the image side 454 of the fifth lens 450 are aspheric. The image side 454 of the fifth lens 450 has one inflection point.

The sixth lens 460 has positive refractive power and is made of plastic. The object side 462 of the sixth lens 460 is a convex surface and the image side 464 of the sixth lens 460 is a concave surface. Both the object side 462 and the image side 464 of the sixth lens 460 are aspheric. The image side 464 of the sixth lens 460 has two inflection points. Hereby, the angle of incident at the sixth lens 460 at each field of view may be effectively adjusted so as to improve the aberration.

The seventh lens 470 has negative refractive power and is made of plastic. The object side 472 of the seventh lens is a convex surface and the image side 474 of the seventh lens is a concave surface. Both the object side 472 and the image side 474 of the seventh lens are aspheric. Hereby, the configuration is beneficial to shorten the back focal length of the optical image capturing system so as to keep its miniaturization. Besides, the object side 472 of the seventh lens has two inflection points. Hence, the incident angle of the off-axis rays can be reduced effectively, thereby further correcting the off-axis aberration.

The eighth lens 480 has positive refractive power and is made of plastic. The object side 482 of the eighth lens is a convex surface and the image side 484 of the eighth lens is a concave surface. Both the object side 482 and the image side 484 of the eighth lens are aspheric. Hereby, the configuration is beneficial to shorten the back focal distance of the optical image capturing system so as to keep its miniaturization. Besides, the object side 482 of the eighth lens has two inflection points and the image side 484 of the eighth lens has one inflection point. Hence, the incident angle of the off-axis rays can be reduced effectively, thereby further correcting the off-axis aberration.

The infrared filter 490 is made of glass and is disposed between the eighth lens 480 and the first image plane 492. The infrared filter 480 does not affect the focal length of the optical image capturing system.

The contents in Tables 7 and 8 below should be incorporated into the reference of the present embodiment.

TABLE 7

Lens Parameters for the Fourth Embodiment
f(focal length) = 7.3505 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 130.6954904 | 8.600 | Plastic | 1.544 | 55.96 | −12.991 |
| 2 | | 6.568941867 | 16.614 | | | | |
| 3 | Aperture | 1E+18 | −1.315 | | | | |
| 4 | Second Lens | 22.94517365 | 4.294 | Plastic | 1.544 | 55.96 | 18.461 |
| 5 | | −16.77705805 | 0.050 | | | | |
| 6 | Third Lens | 13.44795534 | 3.884 | Plastic | 1.515 | 56.55 | 65.475 |
| 7 | | 20.13686684 | 3.660 | | | | |
| 8 | Fourth Lens | −55.39944223 | 1.620 | Plastic | 1.661 | 20.40 | −14.217 |
| 9 | | 11.5711111 | 0.171 | | | | |
| 10 | Fifth Lens | 10.77965569 | 5.315 | Plastic | 1.544 | 55.96 | 14.336 |
| 11 | | −23.5686615 | 0.050 | | | | |
| 12 | Sixth Lens | 12.08398012 | 4.171 | Plastic | 1.544 | 55.96 | 24.845 |
| 13 | | 97.50158878 | 0.050 | | | | |
| 14 | Seventh | 10.30872998 | 0.692 | Plastic | 1.661 | 20.40 | −24.656 |

TABLE 7-continued

Lens Parameters for the Fourth Embodiment
f(focal length) = 7.3505 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 15 | Lens | 6.165671024 | 2.175 | | | | |
| 16 | Eighth Lens | 5.723746497 | 1.923 | Plastic | 1.544 | 55.96 | 35.405 |
| 17 | | 7.168238668 | 1.000 | | | | |
| 18 | Infrared Filter | 1E+18 | 0.200 | BK_7 | 1.517 | 64.2 | |
| 19 | | 1E+18 | 1.836 | | | | |
| 20 | First Image Plane | 1E+18 | 0.010 | | | | |

Reference Wavelength (d-line): 555 nm

TABLE 8

The Aspheric Coefficients of the Fourth Embodiment
Table 8: Aspheric Coefficients

| Surface No | 1 | 2 | 4 | 5 | 6 | 7 | 8 |
|---|---|---|---|---|---|---|---|
| k | 4.162173E+01 | −4.456479E−01 | 3.508620E+00 | −2.181717E+00 | 3.278148E−01 | −1.931871E+01 | 4.438016E+01 |
| A4 | 5.696825E−05 | 1.533973E−04 | 2.998711E−05 | 1.454477E−04 | −9.184153E−05 | −2.532770E−04 | −3.969781E−04 |
| A6 | −3.948685E−07 | 6.587300E−07 | −7.122507E−07 | −1.991189E−06 | 1.346556E−06 | 1.885319E−06 | −6.172439E−06 |
| A8 | 1.064376E−09 | −7.405120E−08 | −9.327143E−09 | 1.672638E−09 | −2.570461E−08 | −1.364221E−08 | 9.317159E−08 |
| A10 | −1.046427E−12 | 3.612675E−10 | 3.900179E−11 | 5.441450E−11 | 2.865578E−10 | 9.765145E−12 | 1.926038E−11 |
| A12 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 | 14 | 15 |
|---|---|---|---|---|---|---|---|
| k | −6.952504E−01 | −5.144362E+00 | −2.529828E+01 | −2.733105E+00 | −5.000000E+01 | −5.000000E+01 | −1.554674E+01 |
| A4 | −5.102723E−04 | −5.520288E−05 | −3.640385E−04 | 3.819645E−05 | −3.595740E−04 | −2.634817E−04 | 2.420330E−04 |
| A6 | 2.582546E−06 | −2.833263E−07 | −6.991748E−07 | −2.690161E−06 | −1.287528E−06 | −3.126289E−06 | −4.577104E−07 |
| A8 | −2.330575E−08 | 5.426657E−08 | 1.280869E−07 | −4.230006E−09 | −2.006667E−09 | 1.783224E−08 | −1.103309E−07 |
| A10 | 1.666311E−10 | −2.058989E−10 | −2.559769E−10 | 8.178203E−10 | 1.297532E−09 | 6.844100E−10 | 2.551532E−09 |
| A12 | 0.000000E+00 | 0.000000E+00 | 0.000000E+00 | 0.000000E+00 | 0.000000E+00 | 0.000000E+00 | 0.000000E+00 |

| Surface No | 16 | 17 |
|---|---|---|
| k | −5.190028E+00 | −8.320180E+00 |
| A4 | −1.007866E−03 | −9.167006E−04 |
| A6 | −6.233402E−06 | −6.252415E−06 |
| A8 | 3.841973E−08 | 9.001111E−08 |
| A10 | 2.049076E−09 | 1.889218E−10 |
| A12 | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.5658 | 0.3982 | 0.1123 | 0.5170 | 0.5127 | 0.2959 |
| \| f/f7 \| | \| f/f8 \| | \| f1/f2 \| | \| f2/f3 \| | \| f6/f7 \| | \| f7/f8 \| |
| 0.2981 | 0.2076 | 0.7037 | 0.2820 | 1.0077 | 0.6964 |
| IN12/f | IN78/f | (TP1 + IN12)/TP2 | | (TP8 + IN78)/TP7 | |
| 2.0814 | 0.2959 | 5.5660 | | 5.9171 | |

-continued

| Fourth Embodiment (Primary Reference Wavelength = 555 nm) | | | | | |
|---|---|---|---|---|---|
| HOS | InTL | HOS/HOI | InS/HOS | ODT % | TDT % |
| 55.0000 | 51.9540 | 7.3333 | 0.5416 | 2.0864 | 0.6605 |
| HVT11 | HVT12 | HVT21 | HVT22 | HVT31 | HVT32 |
| 0.0000 | 0.0000 | 0.0000 | 0.0000 | 0.0000 | 6.3693 |
| HVT41 | HVT42 | HVT51 | HVT52 | HVT61 | HVT62 |
| 0.0000 | 0.0000 | 0.0000 | 6.9928 | 0.0000 | 2.6036 |
| HVT71 | HVT72 | HVT81 | HVT82 | HVT82/HOI | HVT82/HOS |
| 4.6860 | 0.0000 | 4.5224 | 4.2454 | 0.5661 | 0.0772 |
| PSTA | PLTA | NSTA | NLTA | SSTA | SLTA |
| 0.014 mm | 0.016 mm | 0.017 mm | −0.014 mm | 0.007 mm | 0.020 mm |
| VSFS0 | VSFS3 | VSFS7 | VTFS0 | VTFS3 | VTFS7 |
| 0.000 mm | 0.000 mm | 0.010 mm | 0.000 mm | 0.000 mm | 0.010 mm |
| VSMTF0 | VSMTF3 | VSMTF7 | VTMTF0 | VTMTF3 | VTMTF7 |
| 0.678 | 0.580 | 0.397 | 0.678 | 0.464 | 0.376 |
| ISFS0 | ISFS3 | ISFS7 | ITFS0 | ITFS3 | ITFS7 |
| 0.050 mm | 0.040 mm | 0.040 mm | 0.050 mm | 0.060 mm | 0.080 mm |
| ISMTF0 | ISMTF3 | ISMTF7 | ITMTF0 | ITMTF3 | ITMTF7 |
| 0.460 | 0.495 | 0.369 | 0.460 | 0.487 | 0.410 |
| FS | AIFS | AVFS | AFS | | |
| 0.050 mm | 0.053 mm | 0.003 mm | 0.050 mm | | |

The values pertaining to the outline curve lengths are obtainable according to the data in Table 7 and Table 8:

| Fourth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 3.063 | 3.062 | −0.00034 | 99.99% | 8.600 | 35.61% |
| 12 | 3.063 | 3.183 | 0.11985 | 103.91% | 8.600 | 37.01% |
| 21 | 3.063 | 3.072 | 0.00902 | 100.29% | 4.294 | 71.54% |
| 22 | 3.063 | 3.077 | 0.01428 | 100.47% | 4.294 | 71.66% |
| 31 | 3.063 | 3.088 | 0.02538 | 100.83% | 3.884 | 79.51% |
| 32 | 3.063 | 3.069 | 0.00669 | 100.22% | 3.884 | 79.03% |
| 41 | 3.063 | 3.066 | 0.00341 | 100.11% | 1.620 | 189.26% |
| 42 | 3.063 | 3.090 | 0.02683 | 100.88% | 1.620 | 190.71% |
| 51 | 3.063 | 3.095 | 0.03252 | 101.06% | 5.315 | 58.23% |
| 52 | 3.063 | 3.072 | 0.00947 | 100.31% | 5.315 | 57.80% |
| 61 | 3.063 | 3.093 | 0.02995 | 100.98% | 4.171 | 74.15% |
| 62 | 3.063 | 3.062 | −0.00064 | 99.98% | 4.171 | 73.41% |
| 71 | 3.063 | 3.074 | 0.01079 | 100.35% | 0.692 | 443.83% |
| 72 | 3.063 | 3.111 | 0.04818 | 101.57% | 0.692 | 449.23% |
| 81 | 3.063 | 3.123 | 0.06034 | 101.97% | 1.923 | 162.44% |
| 82 | 3.063 | 3.097 | 0.03469 | 101.13% | 1.923 | 101.10% |
| ARS | ERD | ARS value | ARS − EHD | (ARS/EDH) % | TP | ARS/TP (%) |
| 11 | 17.873 | 18.064 | 0.190 | 101.07% | 8.600 | 210.05% |
| 12 | 8.210 | 11.768 | 3.558 | 143.34% | 8.600 | 136.84% |
| 21 | 7.479 | 7.632 | 0.152 | 102.04% | 4.294 | 177.74% |
| 22 | 7.788 | 7.983 | 0.194 | 102.50% | 4.294 | 185.92% |
| 31 | 8.329 | 9.009 | 0.680 | 108.17% | 3.884 | 231.96% |
| 32 | 8.023 | 8.046 | 0.023 | 100.29% | 3.884 | 207.18% |
| 41 | 7.341 | 7.817 | 0.476 | 106.49% | 1.620 | 482.54% |
| 42 | 7.912 | 8.026 | 0.114 | 101.44% | 1.620 | 495.40% |
| 51 | 8.314 | 8.940 | 0.626 | 107.54% | 5.315 | 168.21% |
| 52 | 7.940 | 8.098 | 0.158 | 101.99% | 5.315 | 152.36% |
| 61 | 8.034 | 8.590 | 0.556 | 106.92% | 4.171 | 205.95% |
| 62 | 7.619 | 7.656 | 0.037 | 100.49% | 4.171 | 183.56% |
| 71 | 7.465 | 7.497 | 0.032 | 100.43% | 0.692 | 1082.61% |
| 72 | 7.007 | 7.386 | 0.379 | 105.42% | 0.692 | 1066.61% |

-continued

Fourth Embodiment (Primary Reference Wavelength = 555 nm)

| 81 | 7.023 | 7.264 | 0.241 | 103.43% | 1.923 | 377.82% |
| 82 | 7.406 | 7.888 | 0.483 | 106.52% | 1.923 | 410.29% |

The following values for the conditional expressions can be obtained from the data in Table 7 and Table 8.

Values Related to Inflection Point of fourth Embodiment (Primary Reference Wavelength = 555 nm)

| HIF321 | 3.2949 | HIF321/HOI | 0.4393 | SGI321 | 0.2151 | \|SGI321\|/(\|SGI321\| + TP3) | 0.0525 |
| HIF421 | 4.2685 | HIF421/HOI | 0.5691 | SGI421 | 0.6396 | \|SGI421\|/(\|SGI421\| + TP4) | 0.2831 |
| HIF521 | 5.3685 | HIF521/HOI | 0.7158 | SGI521 | −0.7243 | \|SGI521\|/(\|SGI521\| + TP5) | 0.1199 |
| HIF621 | 1.5128 | HIF621/HOI | 0.2017 | SGI621 | 0.0098 | \|SGI621\|/(\|SGI621\| + TP6) | 0.0023 |
| HIF622 | 6.0372 | HIF622/HOI | 0.8050 | SGI622 | −0.2812 | \|SGI622\|/(\|SGI622\| + TP6) | 0.0632 |
| HIF711 | 2.1805 | HIF711/HOI | 0.2907 | SGI711 | 0.1592 | \|SGI711\|/(\|SGI711\| + TP7) | 0.1869 |
| HIF712 | 6.6515 | HIF712/HOI | 0.8869 | SGI712 | 0.1607 | \|SGI712\|/(\|SGI712\| + TP7) | 0.1884 |
| HIF811 | 2.4102 | HIF811/HOI | 0.3214 | SGI811 | 0.4022 | \|SGI811\|/(\|SGI811\| + TP8) | 0.1730 |
| HIF812 | 6.6483 | HIF812/HOI | 0.8864 | SGI812 | 0.1425 | \|SGI812\|/(\|SGI812\| + TP8) | 0.0690 |
| HIF821 | 2.2716 | HIF821/HOI | 0.3029 | SGI821 | 0.2855 | \|SGI821\|/(\|SGI821\| + TP8) | 0.1293 |

Fifth Embodiment

Figure 5A:
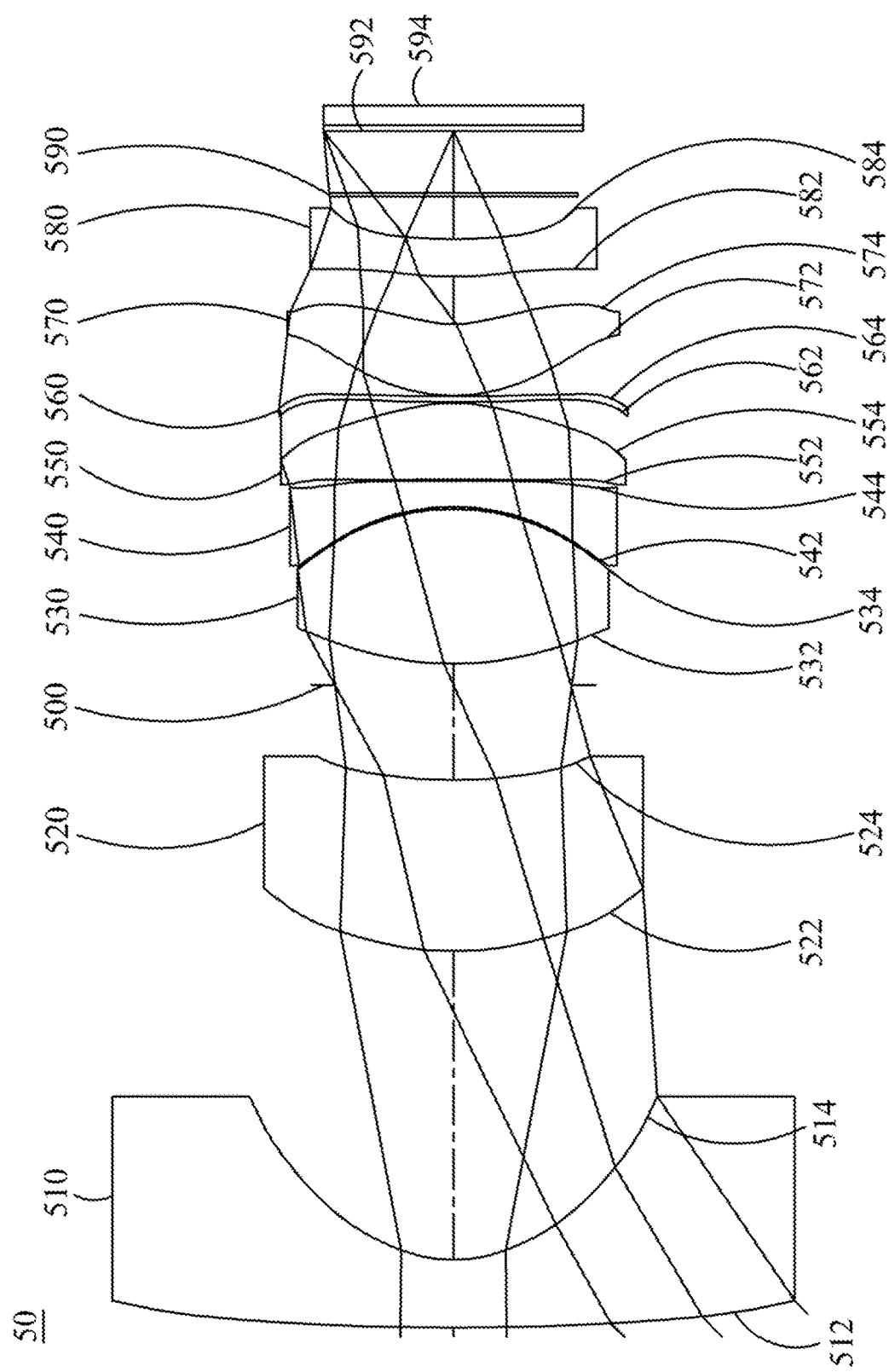
FIG. 5A is a schematic view of the optical image capturing system according to the fifth embodiment of the present invention.
Figure 5B:
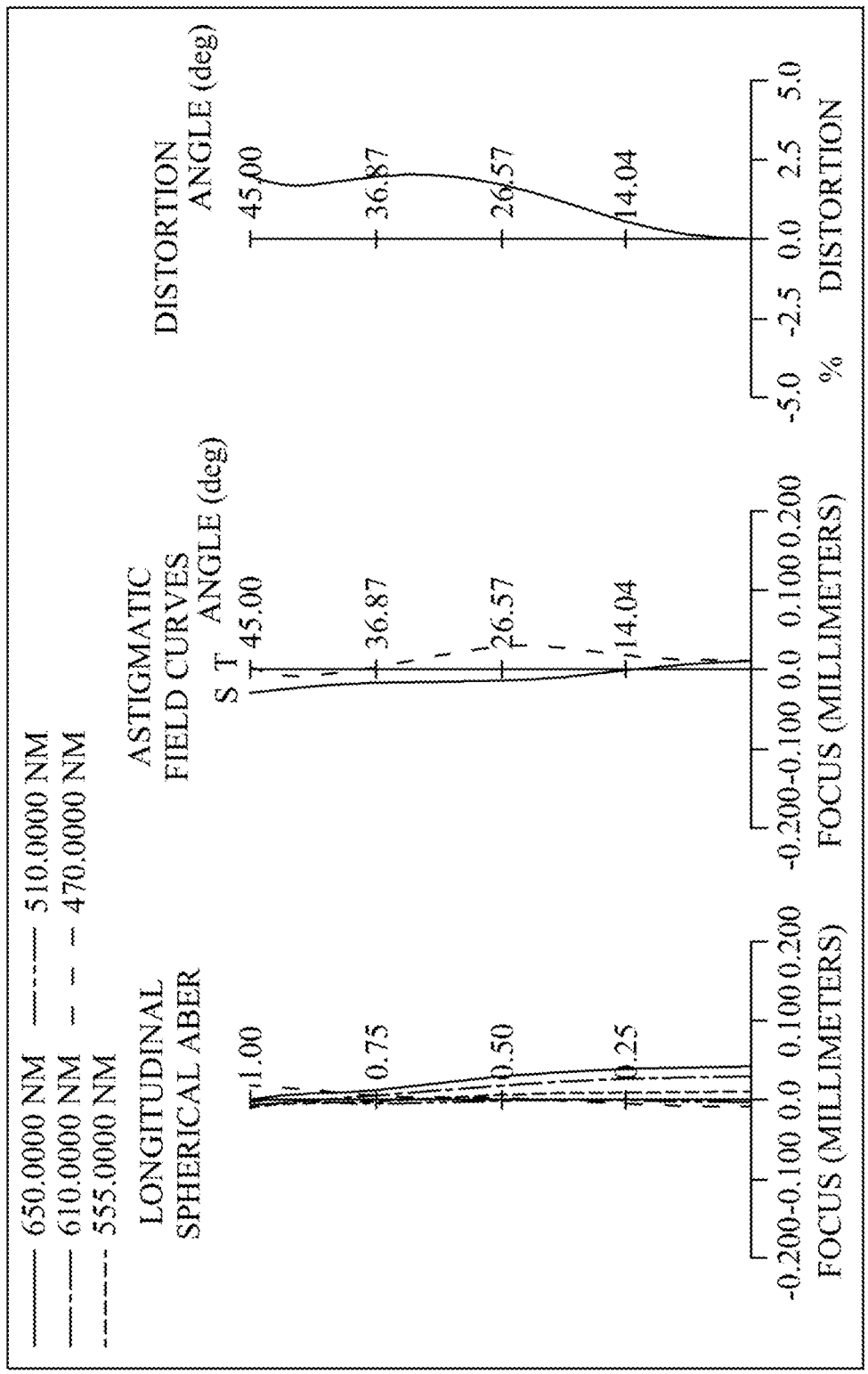
FIG. 5B shows the longitudinal spherical aberration curves, astigmatic field curves, and optical distortion curve of the optical image capturing system in the order from left to right according to the fifth embodiment of the present invention.
Figure 5D:
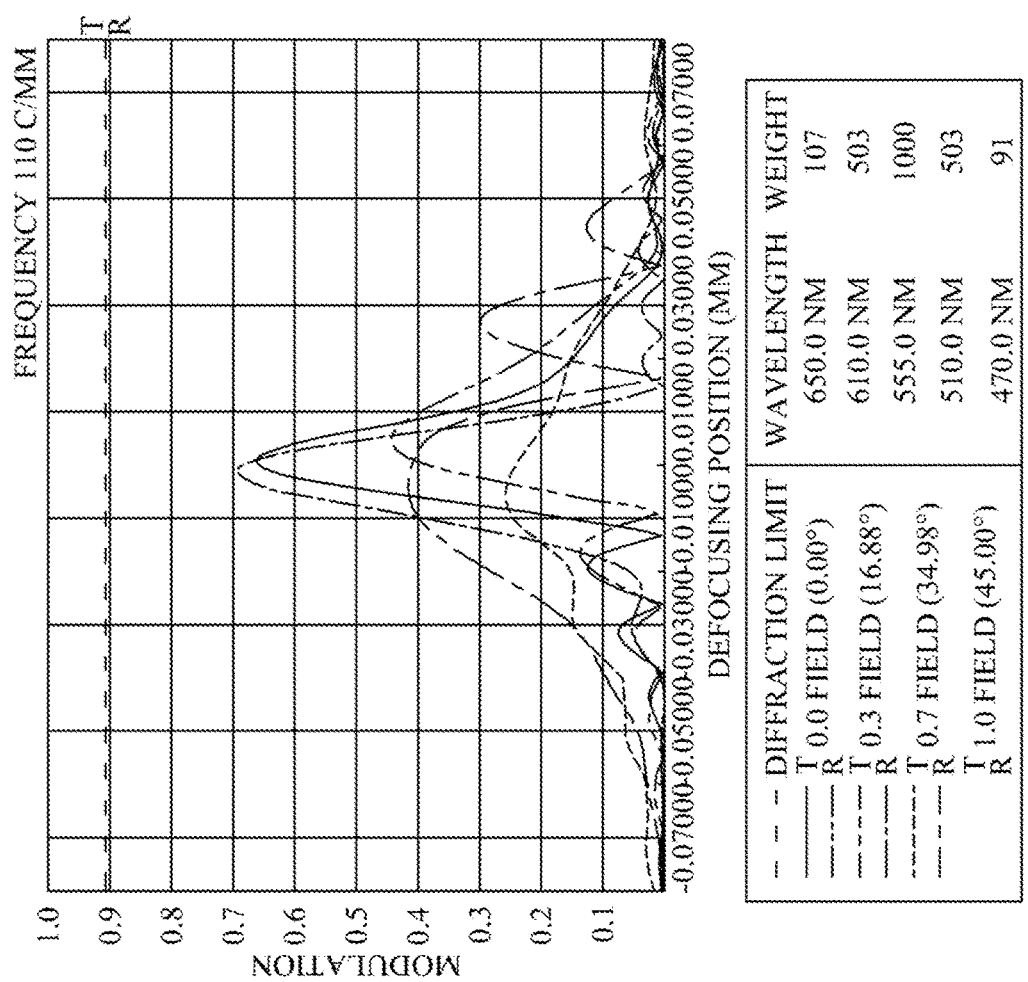
FIG. 5D is a diagram illustrating the through focus MTF values for the visible light spectrum at the central field of view, 0.3 field of view and 0.7 field of view according to the fifth embodiment of the present disclosure.
Figure 5E:
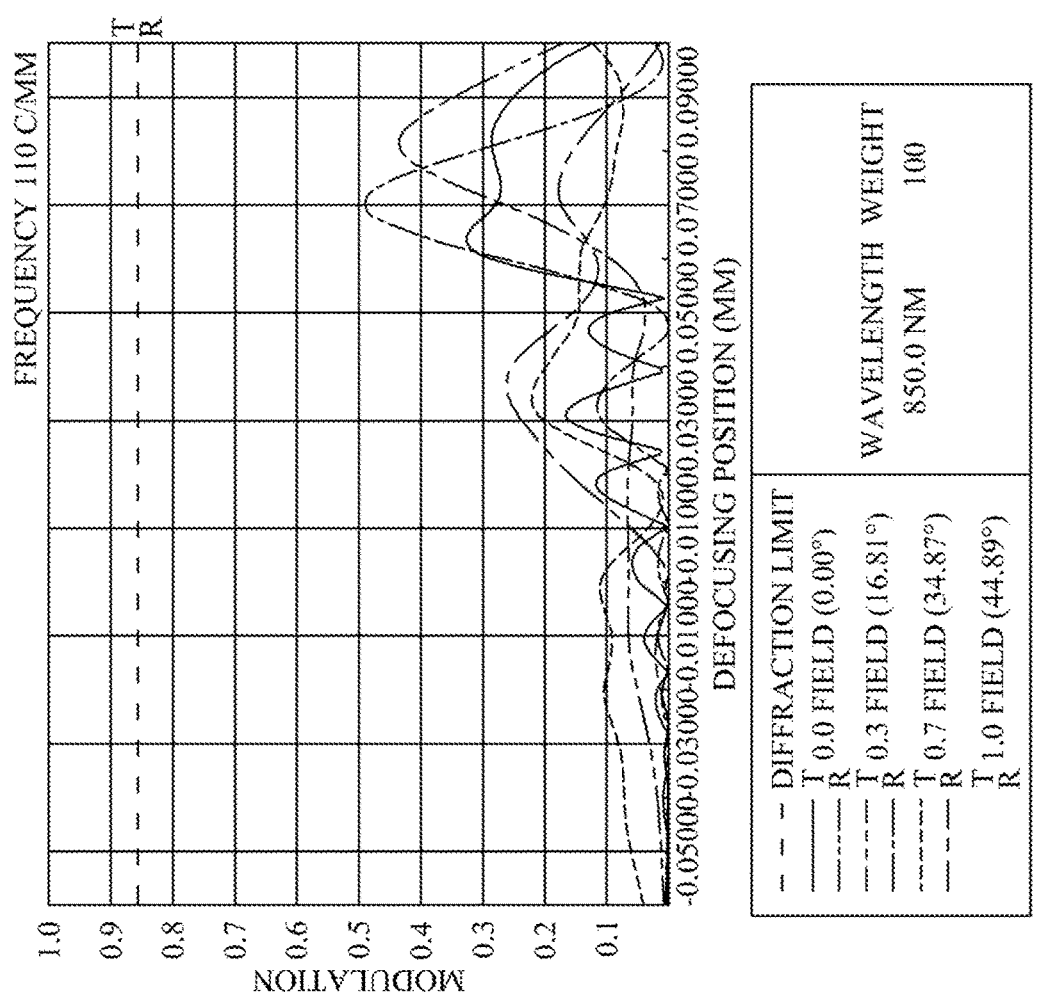
FIG. 5E is a diagram illustrating the through focus MTF values for the infrared light spectrum at the central field of view, 0.3 field of view and 0.7 field of view according to the fifth embodiment of the present disclosure.

Please refer to FIG. 5A and FIG. 5B, wherein FIG. 5A is a schematic view of the optical image capturing system according to the fifth embodiment of the present invention and FIG. 5B shows the longitudinal spherical aberration curves, astigmatic field curves, and optical distortion curve of the optical image capturing system in the order from left to right according to the fifth embodiment of the present invention. FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the fifth embodiment of the present disclosure. FIG. 5D is a diagram illustrating the through focus MTF values for the visible light spectrum at the central field of view, 0.3 field of view and 0.7 field of view according to the first embodiment of the present disclosure. FIG. 5E is a diagram illustrating the through focus MTF values for the infrared light spectrum at the central field of view, 0.3 field of view and 0.7 field of view according to the fifth embodiment of the present disclosure.

As shown in FIG. 5A, in the order from an object side to an image side, the optical image capturing system includes a first lens 510, a second lens 520, an aperture 500, a third lens 530, a fourth lens 540, a fifth lens 550, a sixth lens 560, a seventh lens 570, an eighth lens 580, an infrared filter 590, a first image plane 592, a second image plane and an image sensing device 594.

The first lens 510 has negative refractive power and is made of plastic. The object side 512 of the first lens 510 is a convex surface and the image side 514 of the first lens 510 is a concave surface. Both the object side 512 and the image side 514 of the first lens 510 are aspheric.

The second lens 520 has positive refractive power and is made of plastic. The object side 522 of the second lens 520 is a convex surface and the image side 524 of the second lens 520 is a concave surface. Both the object side 522 and the image side 524 of the second lens 520 are aspheric.

The third lens 530 has positive refractive power and is made of plastic. The object side 532 of the third lens 530 is a convex surface and the image side 534 of the third lens 530 is a convex surface. Both the object side 532 and the image side 534 of the third lens 530 are aspheric.

The fourth lens 540 has negative refractive power and is made of plastic. The object side 542 of the fourth lens 540 is a concave surface and the image side 544 of the fourth lens 540 is a concave surface. Both object side 542 and image side 544 of the fourth lens 540 are aspheric. The object side 542 of the fourth lens 540 has one inflection point. The image side 544 of the fourth lens 540 has two inflection points.

The fifth lens 550 has positive refractive power and is made of plastic. The object side 552 of the fifth lens 550 is a concave surface and the image side 554 of the fifth lens 550 is a convex surface. Both the object side 552 and image side 554 of the fifth lens 550 are aspheric. The object side 552 of the fifth lens 550 has two inflection points.

The sixth lens 560 has positive refractive power and is made of plastic. The object side 562 of the sixth lens 560 is a convex surface and the image side 564 of the sixth lens 560 is a concave surface. Both the object side 562 and the image side 564 of the sixth lens 560 are aspheric. Both the object side 562 and the image side 564 of the sixth lens 560 have one inflection point. Hereby, the angle incident at the sixth lens 560 at each field of view may be effectively adjusted so as to improve the aberration.

The seventh lens 570 has negative refractive power and is made of plastic. The object side 572 of the seventh lens is a convex surface and the image side 574 of the seventh lens is a concave surface. Both object side 572 and image side 574 of the seventh lens are aspheric. Hereby, the configuration is beneficial to shorten the back focal distance of the optical image capturing system so as to keep its miniaturization. Besides, the object side 572 of the seventh lens has one inflection point, and the incident angle of the off-axis rays can be reduced effectively, thereby further correcting the off-axis aberration.

The eighth lens 580 has positive refractive power and is made of plastic. The object side 582 of the eighth lens is a convex surface and the image side 584 of the eighth lens is a concave surface. Both the object side 582 and image side 584 of the eighth lens are aspheric. Hereby, the configuration is beneficial to shorten the back focal distance of the optical image capturing system so as to keep its miniaturization.

Besides, the object side 584 of the eighth lens has two inflection points, and the incident angle of the off-axis rays can be reduced effectively, thereby further correcting the off-axis aberration.

The infrared filter 590 is made of glass and is disposed between the eighth lens 580 and the first image plane 592.

The infrared filter 590 does not affect the focal length of the optical image capturing system.

The contents in Tables 9 and 10 below should be incorporated into the reference of the present embodiment.

TABLE 9

Lens Parameters for the Fifth Embodiment
f(focal length) = 7.3571 mm; f/HEP = 1.2; HAF(half angle of view) = 44.9997 deg

| Surface No | | Curvature Radius | Thickness (mm) | Material | Retractive Index | Coefficient of Dispersion | Focal Length |
|---|---|---|---|---|---|---|---|
| 0 | Object | 1E+18 | 1E+13 | | | | |
| 1 | First Lens | 149.2454576 | 4.001 | Plastic | 1.544 | 55.96 | −17.088 |
| 2 | | 8.694486638 | 18.047 | | | | |
| 3 | Second Lens | 19.19098407 | 10.000 | Plastic | 1.661 | 20.40 | 60.612 |
| 4 | | 28.92532783 | 5.536 | | | | |
| 5 | Aperture | 1E+18 | 1.259 | | | | |
| 6 | Third Lens | 16.81939528 | 9.042 | Plastic | 1.544 | 55.96 | 16.094 |
| 7 | | −14.89483591 | 0.145 | | | | |
| 8 | Fourth Lens | −12.37939063 | 1.525 | Plastic | 1.661 | 20.40 | −17.185 |
| 9 | | 161.6615218 | 0.084 | | | | |
| 10 | Fifth Lens | −163.347088 | 4.447 | Plastic | 1.544 | 55.96 | 20.102 |
| 11 | | −10.37943203 | 0.050 | | | | |
| 12 | Sixth Lens | 60.01492715 | 0.364 | Plastic | 1.544 | 55.96 | 169.298 |
| 13 | | 170.8702429 | 0.050 | | | | |
| 14 | Seventh Lens | 10.39138989 | 4.211 | Plastic | 1.544 | 55.96 | −219.381 |
| 15 | | 8.193541607 | 2.769 | | | | |
| 16 | Eighth Lens | 20.58579661 | 2.174 | Plastic | 1.585 | 27.86 | 61.486 |
| 17 | | 45.87539651 | 0.500 | | | | |
| 18 | Infrared Filter | 1E+18 | 0.200 | BK_7 | 1.517 | 64.2 | |
| 19 | | 1E+18 | 5.605 | | | | |
| 20 | First Image Plane | 1E+18 | −0.011 | | | | |

Reference Wavelength (d-line): 555 nm

TABLE 10

The Aspheric Coefficients of the Fifth Embodiment
Table 10: Aspheric Coefficients

| Surface No | 1 | 2 | 3 | 4 | 6 | 7 | 8 |
|---|---|---|---|---|---|---|---|
| k | 1.986691E+01 | −5.281953E−01 | −9.160089E−01 | 8.594970E+00 | 1.117947E−01 | 9.005434E−01 | 2.180481E−01 |
| A4 | 3.445215E−06 | −6.442926E−05 | −7.025456E−06 | −6.274507E−05 | −1.248868E−04 | −1.250503E−04 | 7.693388E−05 |
| A6 | −3.817675E−08 | −1.511598E−07 | 2.888502E−07 | 8.416746E−07 | 3.183830E−07 | 1.353870E−06 | −1.710585E−06 |
| A8 | 1.182963E−10 | −1.345124E−09 | −1.031081E−09 | −5.715452E−09 | 8.261522E−09 | −7.315375E−09 | 2.088310E−08 |
| A10 | −9.534673E−14 | −2.321608E−12 | 1.315692E−11 | 7.906733E−11 | −7.382921E−11 | 1.195825E−10 | 4.244397E−11 |
| A12 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 | 14 | 15 |
|---|---|---|---|---|---|---|---|
| k | −5.000000E+01 | 4.180664E+01 | −6.845659E+00 | −4.164509E+01 | 5.000000E+01 | −4.680110E−02 | −7.826917E+00 |
| A4 | −1.926452E−04 | 8.685984E−05 | 8.969345E−05 | −6.872017E−05 | 7.120534E−06 | −6.102086E−05 | −2.629936E−04 |
| A6 | 4.296803E−07 | −4.524145E−07 | −8.047216E−07 | −4.457900E−07 | 4.765182E−07 | −2.292008E−06 | 8.008647E−08 |
| A8 | 5.043954E−09 | −5.767309E−09 | −9.242761E−09 | 5.930461E−09 | −9.886153E−09 | 2.031550E−08 | −1.691147E−09 |
| A10 | 4.216277E−11 | −5.839831E−12 | 2.822081E−11 | −8.580317E−11 | −5.276553E−11 | −2.627500E−10 | 4.114340E−11 |
| A12 | 0.000000E+00 | 0.000000E+00 | 0.000000E+00 | 0.000000E+00 | 0.000000E+00 | 0.000000E+00 | 0.000000E+00 |

TABLE 10-continued

The Aspheric Coefficients of the Fifth Embodiment
Table 10: Aspheric Coefficients

| Surface No | 16 | 17 |
|---|---|---|
| k | −2.715940E+01 | 3.770944E+01 |
| A4 | −1.246684E−04 | 2.710741E−04 |
| A6 | −2.046634E−06 | 3.638254E−06 |
| A8 | 1.381005E−08 | −8.492884E−08 |
| A10 | 2.459707E−10 | 9.920610E−10 |
| A12 | 0.000000E+00 | 0.000000E+00 |

In the fifth embodiment, the form of the aspheric surface 15 equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.4305 | 0.1214 | 0.4571 | 0.4281 | 0.3660 | 0.0435 |
| \|f/f7\| | \|f/f8\| | \|f1/f2\| | \|f2/f3\| | \|f6/f7\| | \|f7/f8\| |
| 0.0335 | 0.1197 | 0.2819 | 3.7662 | 0.7717 | 3.5680 |
| IN12/f | IN78/f | (TP1 + IN12)/TP2 | | (TP8 + IN78)/TP7 | |
| 2.4531 | 0.3764 | 2.2049 | | 1.1739 | |
| HOS | InTL | HOS/HOI | InS/HOS | ODT % | TDT % |
| 70.0000 | 63.7059 | 9.3333 | 0.4631 | 2.0446 | 0.3703 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 2.8677 | 0.0000 | 0.0000 | 6.2336 | 7.2512 |
| HVT71 | HVT72 | HVT81 | HVT82 | HVT82/HOI | HVT82/HOS |
| 0.0000 | 7.0151 | 0.0000 | 0.0000 | 0.0000 | 0.0000 |
| PSTA | PLTA | NSTA | NLTA | SSTA | SLTA |
| 0.016 mm | 0.009 mm | 0.00014 mm | 0.008 mm | 0.022 mm | 0.004 mm |
| VSFS0 | VSFS3 | VSFS7 | VTFS0 | VTFS3 | VTFS7 |
| 0.000 mm | 0.000 mm | 0.000 mm | 0.000 mm | 0.010 mm | −0.010 mm |
| VSMTF0 | VSMTF3 | VSMTF7 | VTMTF0 | VTMTF3 | VTMTF7 |
| 0.658 | 0.685 | 0.410 | 0.658 | 0.396 | 0.244 |
| ISFS0 | ISFS3 | ISFS7 | ITFS0 | ITFS3 | ITFS7 |
| 0.060 mm | 0.070 mm | 0.040 mm | 0.060 mm | 0.080 mm | 0.030 mm |
| ISMTF0 | ISMTF3 | ISMTF7 | ITMTF0 | ITMTF3 | ITMTF7 |
| 0.290 | 0.490 | 0.254 | 0.290 | 0.432 | 0.201 |
| FS | AIFS | AVFS | AFS | | |
| 0.060 mm | 0.057 mm | 0.000 mm | 0.057 mm | | |

The values pertaining to the outline curve lengths are obtainable according to the data in Table 9 and Table 10:

| Fifth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 3.065 | 3.065 | −0.00023 | 99.99% | 4.001 | 76.61% |
| 12 | 3.065 | 3.128 | 0.06254 | 102.41% | 4.001 | 78.18% |
| 21 | 3.065 | 3.078 | 0.01250 | 100.41% | 10.000 | 30.78% |
| 22 | 3.065 | 3.071 | 0.00526 | 100.17% | 10.000 | 30.71% |
| 31 | 3.065 | 3.081 | 0.01530 | 100.50% | 9.042 | 34.07% |
| 32 | 3.065 | 3.089 | 0.02382 | 100.78% | 9.042 | 34.17% |
| 41 | 3.065 | 3.096 | 0.03096 | 101.01% | 1.525 | 203.00% |
| 42 | 3.065 | 3.065 | −0.00041 | 99.99% | 1.525 | 200.95% |
| 51 | 3.065 | 3.065 | −0.00035 | 99.99% | 4.447 | 68.92% |
| 52 | 3.065 | 3.098 | 0.03233 | 101.05% | 4.447 | 69.65% |
| 61 | 3.065 | 3.066 | 0.00057 | 100.02% | 0.364 | 841.50% |
| 62 | 3.065 | 3.065 | −0.00027 | 99.99% | 0.364 | 841.28% |
| 71 | 3.065 | 3.109 | 0.04402 | 101.44% | 4.211 | 73.84% |
| 72 | 3.065 | 3.106 | 0.04069 | 101.33% | 4.211 | 73.77% |
| 81 | 3.065 | 3.072 | 0.00684 | 100.22% | 2.174 | 141.30% |

Fifth Embodiment (Primary Reference Wavelength = 555 nm)

| | | | | | | |
|---|---|---|---|---|---|---|
| 82 | 3.065 | 3.069 | 0.00388 | 100.13% | 2.174 | 141.16% |

| ARS | EHD | ARS value | ARS − EHD | (ARS/EDH) % | TP | ARS/TP (%) |
|---|---|---|---|---|---|---|
| 11 | 20.445 | 20.569 | 0.125 | 100.61% | 4.001 | 514.08% |
| 12 | 11.952 | 16.418 | 4.466 | 137.37% | 4.001 | 410.33% |
| 21 | 11.064 | 11.947 | 0.884 | 107.99% | 10.000 | 119.47% |
| 22 | 7.997 | 8.191 | 0.193 | 102.42% | 10.000 | 81.91% |
| 31 | 8.551 | 8.814 | 0.263 | 103.08% | 9.042 | 97.49% |
| 32 | 9.040 | 9.934 | 0.894 | 109.90% | 9.042 | 109.87% |
| 41 | 8.982 | 9.803 | 0.821 | 109.14% | 1.525 | 642.72% |
| 42 | 9.532 | 9.555 | 0.023 | 100.25% | 1.525 | 626.43% |
| 51 | 9.571 | 9.603 | 0.032 | 100.33% | 4.447 | 215.92% |
| 52 | 10.060 | 10.771 | 0.711 | 107.07% | 4.447 | 242.19% |
| 61 | 10.132 | 10.358 | 0.226 | 102.23% | 0.364 | 2842.87% |
| 62 | 10.225 | 10.522 | 0.297 | 102.90% | 0.364 | 2887.78% |
| 71 | 9.781 | 10.573 | 0.793 | 108.11% | 4.211 | 251.10% |
| 77 | 9.633 | 9.796 | 0.163 | 101.69% | 4.211 | 232.65% |
| 81 | 8.486 | 8.509 | 0.023 | 100.27% | 2.174 | 391.33% |
| 82 | 7.185 | 7.672 | 0.487 | 106.78% | 2.174 | 352.85% |

The following values for the conditional expressions can be obtained from the data in Table 9 and Table 10.

Values Related to Inflection Point of Fifth Embodiment (Primary Reference Wavelength = 555 nm)

| | | | | | | |
|---|---|---|---|---|---|---|
| HIF411 | 8.1265 | HIF411/HOI | 1.0835 | SGI411 | −2.8646 | \|SGI411\|/(\|SGI411\| + TP4) 0.6525 |
| HIF421 | 1.6425 | HIF421/HOI | 0.2190 | SGI421 | 0.0069 | \|SGI421\|/(\|SGI421\| + TP4) 0.0045 |
| HIF422 | 7.4335 | HIF422/HOI | 0.9911 | SGI422 | −0.2803 | \|SGI422\|/(\|SGI422\| + TP4) 0.1552 |
| HIF511 | 2.5754 | HIF511/HOI | 0.3434 | SGI511 | −0.0167 | \|SGI511\|/(\|SGI511\| + TP5) 0.0037 |
| HIF512 | 5.8064 | HIF512/HOI | 0.7742 | SGI512 | −0.0309 | \|SGI512\|/(\|SGI512\| + TP5) 0.0069 |
| HIF611 | 3.7228 | HIF611/HOI | 0.4964 | SGI611 | 0.0971 | \|SGI611\|/(\|SGI611\| + TP6) 0.2104 |
| HIF621 | 5.6966 | HIF621/HOI | 0.7595 | SGI621 | 0.1072 | \|SGI621\|/(\|SGI621\| + TP6) 0.2274 |
| HIF711 | 7.2665 | HIF711/HOI | 0.9689 | SGI711 | 2.4786 | \|SGI711\|/(\|SGI711\| + TP7) 0.3705 |
| HIF721 | 3.4458 | HIF721/HOI | 0.4594 | SGI721 | 0.5460 | \|SGI721\|/(\|SGI721\| + TP7) 0.1148 |
| HIF811 | 3.3080 | HIF811/HOI | 0.4411 | SGI811 | 0.2143 | \|SGI811\|/(\|SGI811\| + TP8) 0.0897 |
| HIF812 | 6.9658 | HIF812/HOI | 0.9288 | SGI812 | 0.4014 | \|SGI812\|/(\|SGI812\| + TP8) 0.1558 |

Sixth Embodiment

Figure 6A:
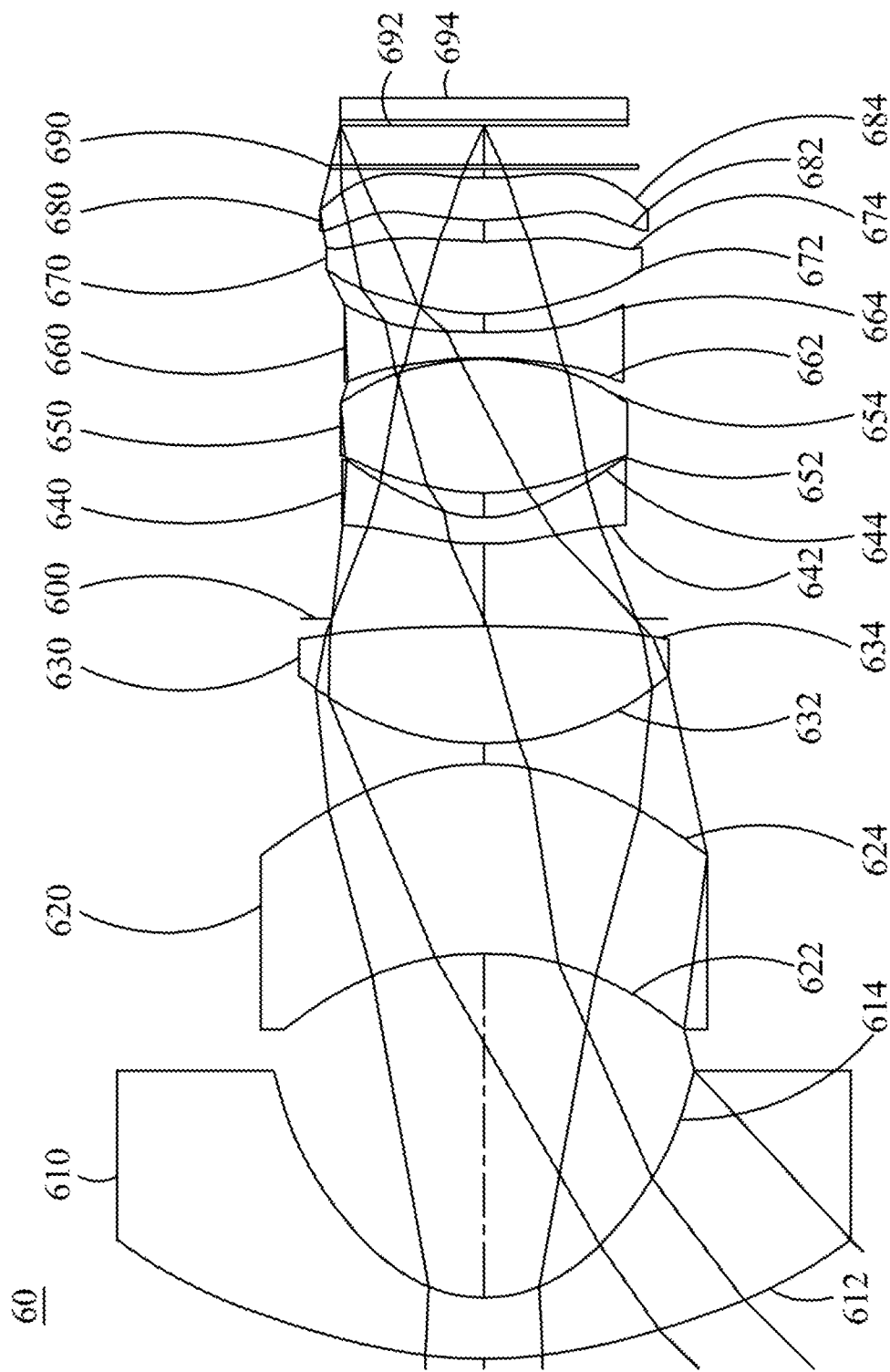
FIG. 6A is a schematic view of the optical image capturing system according to the sixth embodiment of the present invention.
Figure 6B:
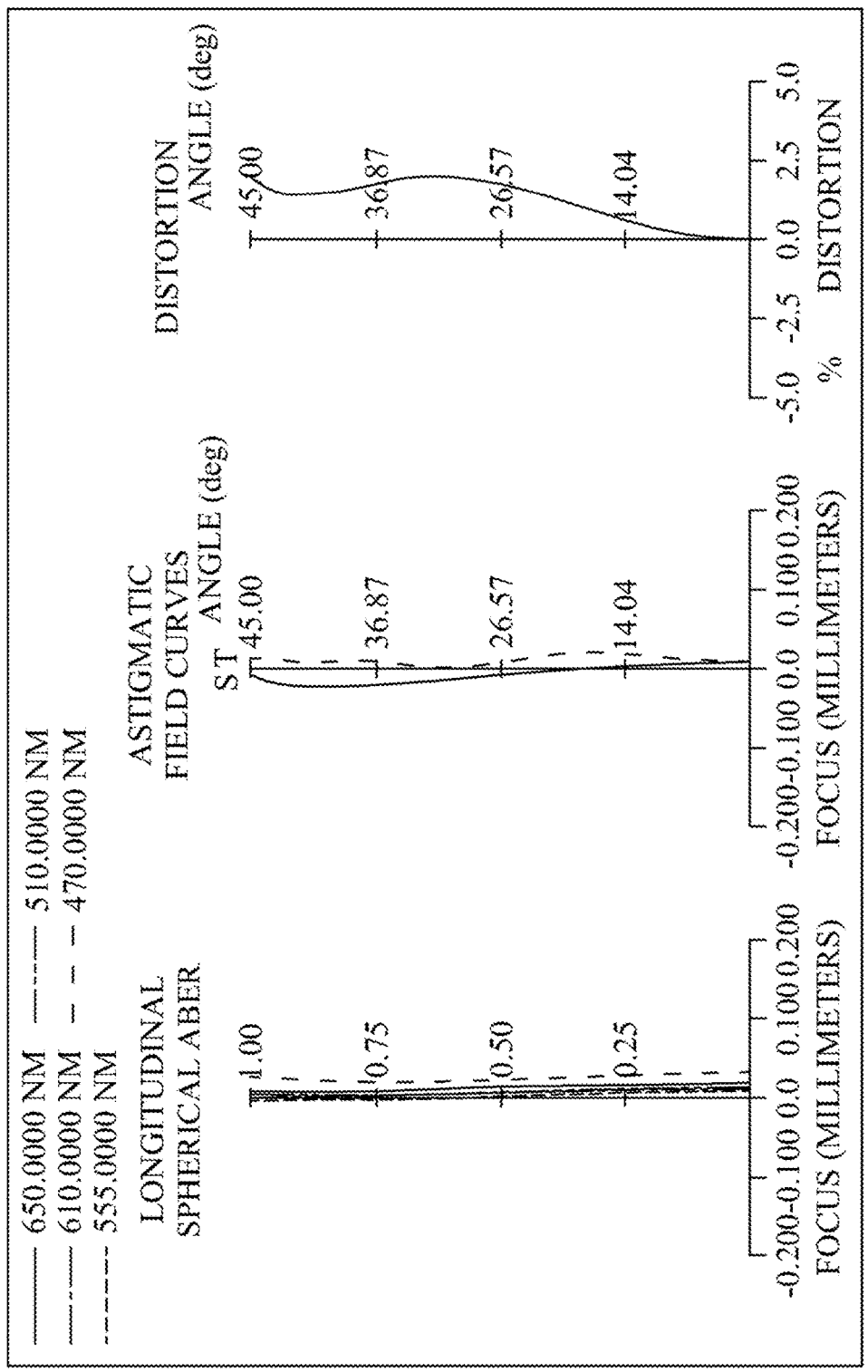
FIG. 6B shows the longitudinal spherical aberration curves, astigmatic field curves, and optical distortion curve of the optical image capturing system in the order from left to right according to the sixth embodiment of the present invention.
Figure 6D:
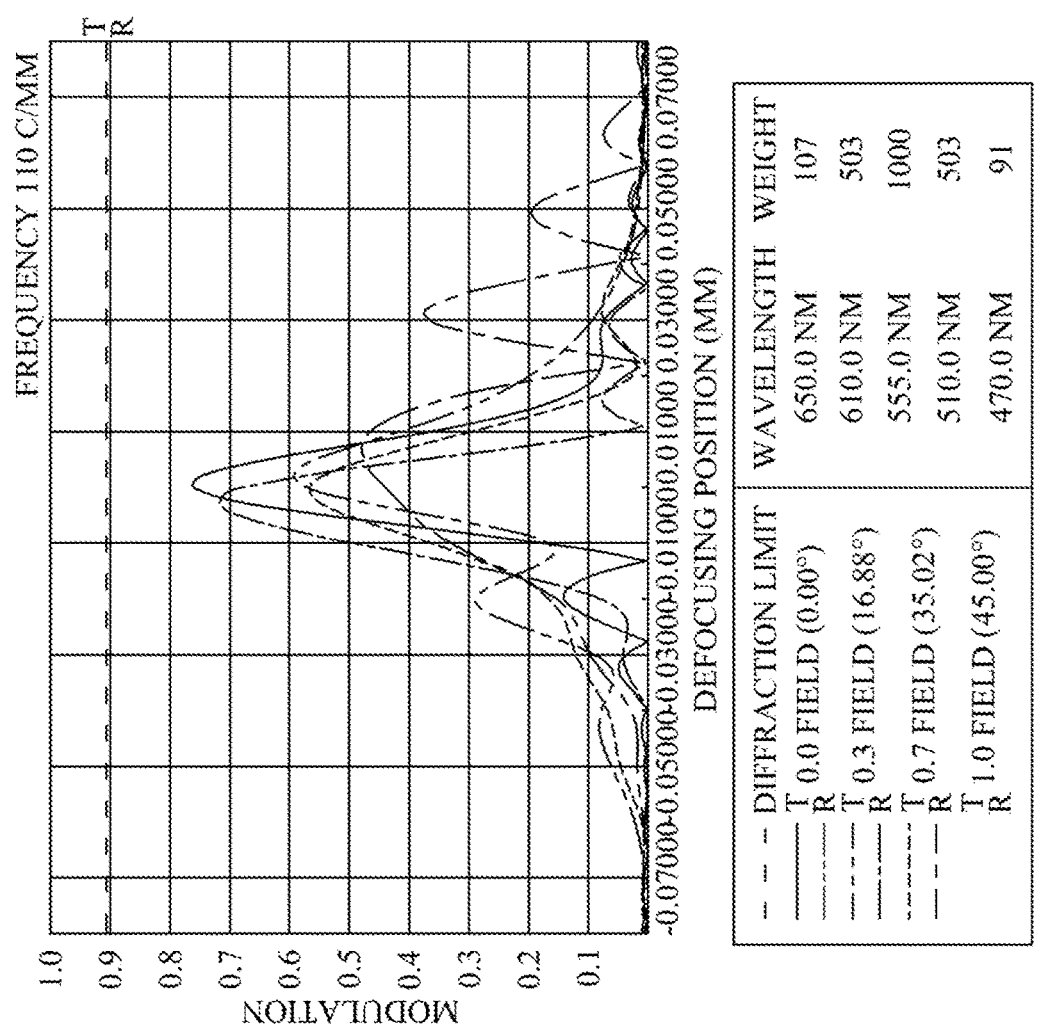
FIG. 6D is a diagram illustrating the through focus MTF values for the visible light spectrum at the central field of view, 0.3 field of view and 0.7 field of view according to the sixth embodiment of the present disclosure.
Figure 6E:
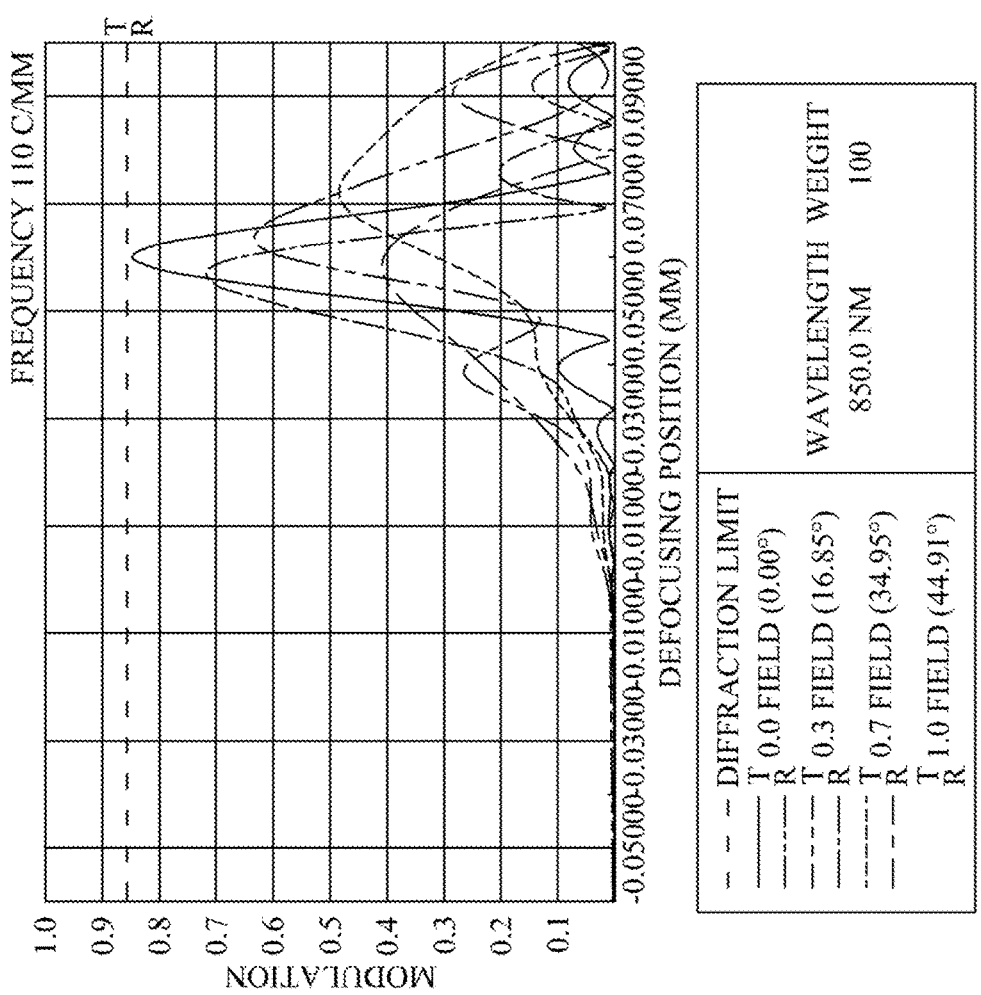
FIG. 6E is a diagram illustrating the through focus MTF values for the infrared light spectrum at the central field of view, 0.3 field of view and 0.7 field of view according to the sixth embodiment of the present disclosure.

Please refer to FIG. 6A and FIG. 6B, wherein FIG. 6A is a schematic view of the optical image capturing system according to the sixth embodiment of the present invention and FIG. 6B shows the longitudinal spherical aberration curves, astigmatic field curves, and optical distortion curve of the optical image capturing system in the order from left to right according to the sixth embodiment of the present invention. FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the first image plane, according to the sixth embodiment of the present disclosure. FIG. 6D is a diagram illustrating the through focus MTF values for the visible light spectrum at the central field of view, 0.3 field of view and 0.7 field of view according to the first embodiment of the present disclosure. FIG. 6E is a diagram illustrating the through focus MTF values for the infrared light spectrum at the central field of view, 0.3 field of view and 0.7 field of view according to the sixth embodiment of the present disclosure.

As shown in FIG. 6A, in the order from an object side to an image side, the optical image capturing system includes a first lens 610, a second lens 620, a third lens 630, an aperture 600, a fourth lens 640, a fifth lens 650, a sixth lens 660, a seventh lens 670, an eighth lens 680, an Infrared filter 690, a first image plane 692, a second image plane and an image sensing device 694.

The first lens 610 has negative refractive power and is made of plastic. The object side 612 of the first lens 610 is a convex surface and the image side 614 of the first lens 610 is a concave surface. Both the object side 612 and the image side 614 of the first lens 610 are aspheric.

The second lens 620 has positive refractive power and is made of plastic. The object side 622 of the second lens 620 is a concave surface and the image side 624 of the second lens 620 is a convex surface. Both the object side 622 and the image side 624 of the second lens 620 are aspheric.

The third lens 630 has positive refractive power and is made of plastic. The object side 632 of the third lens 630 is a convex surface and the image side 634 of the third lens 630 is a convex surface. Both the object side 632 and the image side 634 of the third lens 630 are aspheric.

The fourth lens 640 has negative refractive power and is made of plastic. The object side 642 of the fourth lens 640 is a convex surface and the image side 644 of the fourth lens 640 is a concave surface. Both the object side 642 and the image side 644 of the fourth lens 640 are aspheric. The object side 642 of the fourth lens 640 has one inflection point.

The fifth lens 650 has positive refractive power and is made of plastic. The object side 652 of the fifth lens 650 is a convex surface and the image side 654 of the fifth lens 650 is a convex surface. Both the object side 652 and the image side 654 of the fifth lens 650 are aspheric.

The sixth lens 660 has negative refractive power and is made of plastic. The object side 662 of the sixth lens is a concave surface and the image side 664 of the sixth lens is a concave surface. The image side 664 of the sixth lens has one inflection point. Hereby, the angle of incident at the sixth lens 660 at each field of view may be effectively adjusted so as to improve the aberration.

The seventh lens 670 has positive refractive power and is made of plastic. The object side 672 of the seventh lens is a convex surface and the image side 674 of the seventh lens is a concave surface. Both the object side 672 and the image side 674 of the seventh lens are aspheric. Hereby, the configuration is beneficial to shorten the back focal length of the optical image capturing system so as to keep its miniaturization. Besides, the image side 674 of the seventh lens has two inflection point, and the incident angle of the off-axis rays can be reduced effectively, thereby further correcting the off-axis aberration.

The eighth lens 680 has positive refractive power and is made of plastic. The object side 682 of the eighth lens is a convex surface and the image side 684 of the eighth lens is a concave surface. Both the object side 682 and the image side 684 of the eighth lens are aspheric. Hereby, the configuration is beneficial to shorten the back focal length of the optical image capturing system so as to keep its miniaturization. Besides, the object side 682 of the eighth lens 684 has two inflection point and the image side 684 of the eighth lens has one inflection point. Hence, the incident angle of the off-axis rays can be reduced effectively, thereby further correcting the off-axis aberration.

The infrared filter 690 is made of glass and is disposed between the eighth lens 680 and the first image plane 692. The infrared filter 690 does not affect the focal length of the optical image capturing system.

The contents in Tables 11 and 12 below should be incorporated into the reference of the present embodiment.

TABLE 11

Lens Parameters for the Sixth Embodiment
f(focal length) = 7.3531 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 24.9075617 | 3.214 | Plastic | 1.544 | 55.96 | −18.760 |
| 2 | | 6.925415043 | 18.126 | | | | |
| 3 | Second Lens | −15.28352775 | 10.000 | Plastic | 1.544 | 55.96 | 61.509 |
| 4 | | −12.92832646 | 1.097 | | | | |
| 5 | Third Lens | 15.06441645 | 6.171 | Plastic | 1.544 | 55.96 | 24.301 |
| 6 | | −94.85564658 | 0.373 | | | | |
| 7 | Aperture | 1E+18 | 3.967 | | | | |
| 8 | Fourth Lens | 13.2312653 | 1.426 | Plastic | 1.661 | 20.40 | −21.175 |
| 9 | | 6.536072626 | 1.261 | | | | |
| 10 | Fifth Lens | 11.72773733 | 7.050 | Plastic | 1.544 | 55.96 | 13.337 |
| 11 | | 15.11697129 | 0.050 | | | | |
| 12 | Sixth Lens | −20.33731539 | 1.378 | Plastic | 1.661 | 20.40 | −19.467 |
| 13 | | 36.85459385 | 0.967 | | | | |
| 14 | Seventh Lens | 11.66567627 | 3.829 | Plastic | 1.544 | 55.96 | 36.881 |
| 15 | | 24.53000752 | 1.116 | | | | |
| 16 | Eighth Lens | 11.07671935 | 2.218 | Plastic | 1.544 | 55.96 | 57.262 |
| 17 | | 15.94484917 | 0.500 | | | | |
| 18 | Infrared Filter | 1E+18 | 0.200 | BK_7 | 1.517 | 64.2 | |
| 19 | | 1E+18 | 2.065 | | | | |
| 20 | First Image Plane | 1E+18 | −0.009 | | | | |

Reference Wavelength (d-line) = 555 nm

TABLE 12

The Aspheric Coefficients of the Sixth Embodiment
Table 12: Aspheric Coefficients

| Surface No | 1 | 2 | 3 | 4 | 5 | 6 | 8 |
|---|---|---|---|---|---|---|---|
| k | −5.903833E+00 | −6.284402E−01 | −1.060348E−01 | −5.108237E−01 | −2.671403E−01 | 3.924666E+01 | −4.409373E+00 |
| A4 | 1.730627E−05 | −2.971559E−05 | −3.479391E−05 | 6.552243E−05 | 3.704974E−05 | −8.231106E−06 | −1.719753E−04 |
| A6 | −1.001672E−07 | −3.967353E−07 | 5.752757E−07 | −1.494390E−07 | −5.145991E−08 | −1.970678E−07 | −1.126433E−06 |
| A8 | 3.243862E−10 | −1.574672E−09 | −4.243890E−09 | 5.958865E−10 | −1.654385E−09 | 8.403642E−10 | −2.638073E−08 |

TABLE 12-continued

The Aspheric Coefficients of the Sixth Embodiment
Table 12: Aspheric Coefficients

| | | | | | | | |
|---|---|---|---|---|---|---|---|
| A10 | −2.879641E−13 | −1.545706E−11 | 2.231149E−11 | 1.613342E−12 | 2.488785E−12 | 1.872257E−12 | 4.432152E−10 |
| A12 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 | 14 | 15 |
|---|---|---|---|---|---|---|---|
| k | −5.023494E−01 | −7.476458E−01 | 4.020210E−02 | −2.098997E+01 | 1.606360E+01 | −6.602454E+00 | −3.351592E+01 |
| A4 | −7.265707E−04 | −2.044166E−04 | −2.052647E−04 | −8.231208E−05 | 9.706853E−05 | −3.920000E−05 | −6.044105E−04 |
| A6 | 2.790998E−06 | 1.251767E−06 | 1.087788E−06 | −2.301963E−07 | 4.684983E−06 | 8.821735E−07 | 2.425457E−06 |
| A8 | −6.607737E−08 | 1.124577E−08 | 4.670362E−08 | −6.810348E−09 | −3.103645E−08 | 1.703334E−08 | −6.168510E−09 |
| A10 | 4.919844E−10 | −2.167425E−10 | −6.646516E−10 | −3.517111E−10 | −5.300518E−10 | −4.963404E−11 | 6.724603E−10 |
| A12 | 0.000000E+00 | 0.000000E+00 | 0.000000E+00 | 0.000000E+00 | 0.000000E+00 | 0.000000E+00 | 0.000000E+00 |

| Surface No | 16 | 17 |
|---|---|---|
| k | 1.864447E−01 | −9.214718E+01 |
| A4 | −1.458535E−03 | −7.126849E−04 |
| A6 | 5.757181E−06 | −4.195083E−06 |
| A8 | 3.246285E−08 | 1.068011E−08 |
| A10 | −1.073703E−10 | −4.485247E−10 |
| A12 | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12.

Sixth Embodiment (Primary Reference Wavelength = 555 nm)

| |f/f1| | |f/f2| | |f/f3| | |f/f4| | |f/f5| | |f/f6| |
|---|---|---|---|---|---|
| 0.3920 | 0.1195 | 0.3026 | 0.3473 | 0.5513 | 0.3777 |
| |f/f7| | |f/f8| | |f1/f2| | |f2/f3| | |f6/f7| | |f7/f8| |
| 0.1994 | 0.1284 | 0.3050 | 2.5311 | 0.5278 | 0.6441 |
| IN12/f | IN78/f | (TP1 + IN12)/TP2 | | (TP8 + IN78)/TP7 | |
| 2.4651 | 0.1518 | 2.1340 | | 0.8709 | |
| HOS | InTL | HOS/HOI | InS/HOS | ODT % | TDT % |
| 65.0000 | 62.2432 | 8.6667 | 0.4003 | 2.0037 | 0.6237 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 0.0000 | 0.0000 | 0.0000 | 0.0000 | 0.0000 |
| HVT71 | HVT72 | HVT81 | HVT82 | HVT82/HOI | HVT82/HOS |
| 0.0000 | 3.7355 | 4.4583 | 4.0712 | 0.5428 | 0.0626 |
| PSTA | PLTA | NSTA | NLTA | SSTA | SLTA |
| 0.010 mm | 0.011 mm | 0.011 mm | −0.019 mm | 0.016 mm | 0.013 mm |
| VSFS0 | VSFS3 | VSFS7 | VTFS0 | VTFS3 | VTFS7 |
| 0.000 mm | 0.000 mm | 0.010 mm | 0.000 mm | 0.000 mm | 0.000 mm |
| VSMTF0 | VSMTF3 | VSMTF7 | VTMTF0 | VTMTF3 | VTMTF7 |
| 0.760 | 0.677 | 0.465 | 0.760 | 0.571 | 0.566 |
| ISFS0 | ISFS3 | ISFS7 | ITFS0 | ITFS3 | ITFS7 |
| 0.060 mm | 0.060 mm | 0.060 mm | 0.060 mm | 0.060 mm | 0.070 mm |
| ISMTF0 | ISMTF3 | ISMTF7 | ITMTF0 | ITMTF3 | ITMTF7 |
| 0.848 | 0.660 | 0.407 | 0.848 | 0.580 | 0.478 |
| FS | AIFS | AVFS | AFS | | |
| 0.060 mm | 0.062 mm | 0.002 mm | 0.060 mm | | |

The values pertaining to the outline curve lengths are obtainable according to the data in Table 11 and Table 12:

Sixth Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 3.064 | 3.071 | 0.00672 | 100.22% | 3.214 | 95.53% |
| 12 | 3.064 | 3.163 | 0.09961 | 103.25% | 3.214 | 98.42% |

| Sixth Embodiment (Primary Reference Wavelength = 555 nm) | | | | | | |
|---|---|---|---|---|---|---|
| 21 | 3.064 | 3.084 | 0.02045 | 100.67% | 10.000 | 30.84% |
| 22 | 3.064 | 3.091 | 0.02705 | 100.88% | 10.000 | 30.91% |
| 31 | 3.064 | 3.085 | 0.02109 | 100.69% | 6.171 | 49.99% |
| 32 | 3.064 | 3.064 | −0.00022 | 99.99% | 6.171 | 49.64% |
| 41 | 3.064 | 3.085 | 0.02104 | 100.69% | 1.426 | 216.40% |
| 42 | 3.064 | 3.158 | 0.09402 | 103.07% | 1.426 | 221.52% |
| 51 | 3.064 | 3.094 | 0.03068 | 101.00% | 7.050 | 43.89% |
| 52 | 3.064 | 3.087 | 0.02340 | 100.76% | 7.050 | 43.79% |
| 61 | 3.064 | 3.073 | 0.00918 | 100.30% | 1.378 | 223.00% |
| 62 | 3.064 | 3.068 | 0.00392 | 100.13% | 1.378 | 222.62% |
| 71 | 3.064 | 3.091 | 0.02729 | 100.89% | 3.829 | 80.73% |
| 72 | 3.064 | 3.066 | 0.00196 | 100.06% | 3.829 | 80.06% |
| 81 | 3.064 | 3.082 | 0.01790 | 100.58% | 2.218 | 138.92% |
| 82 | 3.064 | 3.071 | 0.00768 | 100.25% | 2.218 | 138.45% |
| ARS | EHD | ARS value | ARS − EHD | (ARS/EHD) % | TP | ARS/TP (%) |
| 11 | 18.576 | 19.726 | 1.150 | 106.19% | 3.214 | 613.69% |
| 12 | 10.794 | 16.572 | 5.778 | 153.53% | 3.214 | 515.58% |
| 21 | 10.051 | 10.906 | 0.855 | 108.51% | 10.000 | 109.06% |
| 22 | 11.318 | 12.417 | 1.099 | 109.71% | 10.000 | 124.17% |
| 31 | 9.566 | 10.378 | 0.813 | 108.50% | 6.171 | 168.18% |
| 32 | 8.747 | 8.773 | 0.026 | 100.30% | 6.171 | 142.17% |
| 41 | 7.414 | 7.494 | 0.080 | 101.08% | 1.426 | 525.72% |
| 42 | 7.202 | 7.918 | 0.715 | 109.93% | 1.426 | 555.43% |
| 51 | 7.294 | 7.608 | 0.314 | 104.30% | 7.050 | 107.92% |
| 52 | 7.558 | 8.073 | 0.515 | 106.82% | 7.050 | 114.52% |
| 61 | 7.184 | 7.359 | 0.175 | 102.44% | 1.378 | 534.02% |
| 62 | 7.425 | 7.664 | 0.239 | 103.21% | 1.378 | 556.14% |
| 71 | 8.558 | 9.079 | 0.521 | 106.09% | 3.829 | 237.11% |
| 72 | 8.499 | 8.600 | 0.101 | 101.18% | 3.829 | 224.59% |
| 81 | 8.771 | 8.938 | 0.167 | 101.90% | 2.218 | 402.90% |
| 82 | 8.903 | 9.582 | 0.678 | 107.62% | 2.218 | 431.92% |

The following values for the conditional expressions can be obtained from the data in Table 11 and Table 12:

| Values Related to Inflection Point of Sixth Embodiment (Primary Reference Wavelength = 555 nm) | | | | | | |
|---|---|---|---|---|---|---|
| HIF411 | 4.1340 | HIF411/HOI | 0.5512 | SGI411 | 0.5420 | |SGI411|/(|SGI411| + TP4) 0.2755 |
| HIF621 | 7.1316 | HIF621/HOI | 0.9509 | SGI621 | 1.3414 | |SGI621|/(|SGI621| + TP6) 0.4933 |
| HIF721 | 2.0724 | HIF721/HOI | 0.2763 | SGI721 | 0.0720 | |SGI721|/(|SGI721| + TP7) 0.0185 |
| HIF722 | 6.5145 | HIF722/HOI | 0.8686 | SGI722 | −0.2160 | |SGI722|/(|SGI722| + TP7) 0.0534 |
| HIF811 | 2.4547 | HIF811/HOI | 0.3273 | SGI811 | 0.2244 | |SGI811|/(|SGI811| + TP8) 0.0919 |
| HIF812 | 7.2133 | HIF812/HOI | 0.9618 | SGI812 | −0.1855 | |SGI812|/(|SGI812| + TP8) 0.0771 |
| HIF821 | 2.3299 | HIF821/HOI | 0.3107 | SGI821 | 0.1418 | |SGI821|/(|SGI821| + TP8) 0.0601 |

Although the present invention is disclosed by the aforementioned embodiments, those embodiments do not serve to limit the scope of the present invention. A person skilled in the art can perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with negative refractive power;
   a second lens with positive refractive power;
   a third lens with positive refractive power;
   a fourth lens with negative refractive power;
   a fifth lens with positive refractive power;
   a sixth lens with positive or negative refractive power;
   a seventh lens with positive or negative refractive power;
   an eighth lens with positive or negative refractive power;
   a first image plane, which is an image plane specifically for visible light and perpendicular to an optical axis, and a through focus modulation transfer rate (MTF) at central field of view of the first image plane has a maximum value at a first spatial frequency; and
   a second image plane, which is an image plane specifically for infrared light and perpendicular to the optical axis, and a through focus modulation transfer rate (MTF) at central field of view of the second image plane has a maximum value at the first spatial frequency;
      wherein only one lens among the sixth lens to the eighth lens has negative refractive power, focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a distance on the optical axis from an object side of the first lens to the first image plane is denoted as HOS, a distance on the optical axis from the object side of the first lens to an image side of the eighth lens is denoted as InTL, a half maximum angle of view of the optical image capturing system is denoted as HAF, the optical image capturing system has a maximum image height HOI perpendicular to the optical axis on the first image plane, a distance on the optical axis between the first image plane and the second image plane is denoted as FS, and conditions as follows are satisfied: $1.0 \leq f/HEP \leq 10.0$, $0 \text{ deg} < HAF \leq 60 \text{ deg}$, and $|FS| \leq 100$ μm.

2. The optical image capturing system of claim 1, wherein a wavelength of the infrared light ranges from 700 nm to 1300 nm, the first spatial frequency is denoted as SP1, and a condition as follows is satisfied: $SP1 \leq 440$ cycles/mm.

3. The optical image capturing system of claim 1, wherein when a vertical height of ½HEP from the optical axis is smaller than a half maximum diameter of any one of the eight lenses, an outline curve starting from an intersection point of the optical axis and any surface of the any one of the eight lenses, travelling along an outline of the surface, and ending at a coordinate point on the surface which has the vertical height of ½HEP from the optical axis, has an outline curve length denoted as ARE, and a condition as follows is satisfied: $0.9 \leq 2(ARE/HEP) \leq 2.0$.

4. The optical image capturing system of claim 1, wherein a maximum effective half diameter of any surface of any one of the eight lenses is denoted as EHD, an outline curve starting from an intersection point of the optical axis and any surface of any one of the eight lenses, travelling along an outline of the surface, and ending at a final point which is the maximum effective half diameter position of the surface, has an outline curve length denoted as ARS, and a condition as follows is satisfied: $0.9 \leq ARS/EHD \leq 2.0$.

5. The optical image capturing system of claim 1, wherein the optical image capturing system satisfies a condition as follows: $10 \text{ deg} < HAF \leq 55 \text{ deg}$.

6. The optical image capturing system of claim 1, wherein when a vertical height of ½HEP from the optical axis is smaller than a half maximum diameter of the eighth lens, an outline curve starting from a first intersection point of the optical axis and the object side of the eighth lens, travelling along an outline of the surface, and ending at a first coordinate point on the surface which has the vertical height of ½HEP from the optical axis, has an outline curve length denoted as ARE81, an outline curve starting from a second intersection point of the optical axis and the image side of the eighth lens, travelling along an outline of the surface, and ending at a second coordinate point on the surface which has the vertical height of ½HEP from the optical axis, has an outline curve length denoted as ARE82, a thickness of the eighth lens on the optical axis is denoted as TP8, and conditions as follows are satisfied: $0.05 \leq ARE81/TP8 \leq 35$ and $0.05 \leq ARE82/TP8 \leq 35$.

7. The optical image capturing system of claim 1, wherein there is a maximum image height HOI of the optical image capturing system on the first image plane, a lateral aberration of a longest operation wavelength of visible light of a positive tangential fan of the optical image capturing system passing through a margin of the entrance pupil and projecting onto the first image plane by 0.7 HOI is expressed as PLTA, and a lateral aberration of a shortest operation wavelength of visible light of the positive tangential fan of the optical image capturing system passing through the margin of the entrance pupil and projecting onto the first image plane by 0.7 HOI is expressed as PSTA, a lateral aberration of the longest operation wavelength of visible light of a negative tangential fan of the optical image capturing system passing through the margin of the entrance pupil and projecting onto the first image plane by 0.7 HOI is expressed as NLTA, a lateral aberration of the shortest operation wavelength of visible light of the negative tangential fan of the optical image capturing system passing through the margin of the entrance pupil and projecting onto the first image plane by 0.7 HOI is expressed as NSTA, a lateral aberration of the longest operation wavelength of visible light of a sagittal fan of the optical image capturing system passing through the margin of the entrance pupil and projecting onto the first image plane by 0.7 HOI is expressed as SLTA, a lateral aberration of the shortest operation wavelength of visible light of the sagittal fan of the optical image capturing system passing through the margin of the entrance pupil and projecting onto the first image plane by 0.7 HOI is expressed as SSTA, following conditions are satisfied: $PLTA \leq 100$ Pm; $PSTA \leq 100$ Pm; $NLTA \leq 100$ Pm; $NSTA \leq 100$ Pm; $SLTA \leq 100$ Pm; and $SSTA \leq 100$.

8. The optical image capturing system of claim 1, further comprising an aperture, wherein a distance on the optical axis from the aperture to the first image plane is denoted as InS, and a condition as follows is satisfied: $0.2 \leq InS/HOS \leq 1.1$.

9. An optical image capturing system, from an object side to an image side, comprising:
a first lens with negative refractive power;
a second lens with positive refractive power;
a third lens with positive refractive power;
a fourth lens with negative refractive power;
a fifth lens with positive refractive power;
a sixth lens with positive or negative refractive power;
a seventh lens with positive or negative refractive power;
an eighth lens with positive or negative refractive power;
a first image plane, which is an image plane specifically for visible light and perpendicular to an optical axis, and a through focus modulation transfer rate (MTF) at central field of view of the first image plane has a maximum value at a first spatial frequency of 110 cycles/mm; and
a second image plane, which is an image plane specifically for infrared light and perpendicular to the optical axis, and a through focus modulation transfer rate (MTF) at central field of view of the second image plane has a maximum value at the first spatial frequency of 110 cycles/mm (110 cycles/mm);
wherein at least one lens among the first lens to the eighth lens is made of plastic, the optical image capturing system has a maximum image height HOI perpendicular to the optical axis on the first image plane, only one lens among the sixth lens to the eighth lens has negative positive refractive power, focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a distance on the optical axis from an object side of the first lens to the first image plane is denoted as HOS, a distance on the optical axis from the object side of the first lens to an image side of the eighth lens is denoted as InTL, a half maximum angle of view of the optical image capturing system is denoted as HAF, a distance on the optical axis between the first image plane and the second image plane is denoted as FS, when a vertical height of ½HEP from the optical axis is smaller than a half maximum diameter of any one of the eight lenses, an outline curve starting from an intersection point of the optical axis and any surface of the any one of the eight lenses, travelling along an outline of the surface, and ending at a coordinate point on the surface which has the vertical height of ½HEP from the optical axis, has an outline curve length denoted as ARE, and conditions as follows are satisfied: 1.0≤f/HEP≤10.0, 0 deg<HAF≤60 deg, |FS|≤100 μm and 0.9≤2(ARE/HEP)≤2.0.

10. The optical image capturing system of claim 9, wherein a maximum effective half diameter of any surface of any one of the eight lenses is denoted as EHD, an outline curve starting from an intersection point of the optical axis and any surface of any one of the eight lenses, travelling along an outline of the surface, and ending at a final point which is the maximum effective half diameter position of the surface, has an outline curve length denoted as ARS, and a condition as follows is satisfied: 0.9≤ARS/EHD≤2.0.

11. The optical image capturing system of claim 9, wherein there is an air gap between each lens among the eight lenses.

12. The optical image capturing system of claim 9, wherein at least one surface of at least one lens among the first lens to the eighth lens has at least one inflection point.

13. The optical image capturing system of claim 9, there is a maximum image height HOI of the optical image capturing system on the first image plane, a lateral aberration of a longest operation wavelength of visible light of a positive tangential fan of the optical image capturing system passing through a margin of the entrance pupil and projecting onto the first image plane by 0.7 HOI is expressed as PLTA, and a lateral aberration of a shortest operation wavelength of visible light of the positive tangential fan of the optical image capturing system passing through the margin of the entrance pupil and projecting onto the first image plane by 0.7 HOI is expressed as PSTA, a lateral aberration of the longest operation wavelength of visible light of a negative tangential fan of the optical image capturing system passing through the margin of the entrance pupil and projecting onto the first image plane by 0.7 HOI is expressed as NLTA, a lateral aberration of the shortest operation wavelength of visible light of the negative tangential fan of the optical image capturing system passing through the margin of the entrance pupil and projecting onto the first image plane by 0.7 HOI is expressed as NSTA, a lateral aberration of the longest operation wavelength of visible light of a sagittal fan of the optical image capturing system passing through the margin of the entrance pupil and projecting onto the first image plane by 0.7 HOI is expressed as SLTA, a lateral aberration of the shortest operation wavelength of visible light of the sagittal fan of the optical image capturing system passing through the margin of the entrance pupil and projecting onto the first image plane by 0.7 HOI is expressed as SSTA, following conditions are satisfied: PLTA≤200 μm; PSTA≤<200;m; NLTA≤200;m; NSTA≤200;m; SLTA≤200;m; and SSTA≤200;m.

14. The optical image capturing system of claim 9, wherein at least two lenses among the first lens to the eighth lens respectively have at least one inflection point on at least one surface thereof.

15. The optical image capturing system of claim 9, wherein a distance between the first lens and the second lens on the optical axis is IN12, and a condition as follows is satisfied: 0<IN12/f≤5.

16. The optical image capturing system of claim 9, wherein the optical image capturing system has the maximum image height HOI perpendicular to the optical axis on the first image plane, and a condition as follows is satisfied: HOS/HOI≥1.2.

17. The optical image capturing system of claim 9, wherein at least one lens among the first, second, third, fourth, fifth, sixth, seventh, and eighth lenses of the optical image capturing system is a light filtering element for filtering light with a wavelength less than 500 nm.

18. An optical image capturing system, from an object side to an image side, comprising:
    a first lens with negative refractive power;
    a second lens with positive refractive power;
    a third lens with positive refractive power;
    a fourth lens with negative refractive power;
    a fifth lens with positive refractive power;
    a sixth lens with positive or negative refractive power;
    a seventh lens with positive or negative refractive power;
    an eighth lens with positive or negative refractive power;
    a first average image plane, which is an image plane specifically for visible light and perpendicular to an optical axis, and the first average image plane is disposed at an average position of the defocusing positions, where through focus modulation transfer rates (values of MTF) of visible light at central field of view, 0.3 field of view, and 0.7 field of view of the optical image capturing system are respectively at corresponding maximum value at a first spatial frequency of 110 cycles/mm; and
    a second average image plane, which is an image plane specifically for infrared light and perpendicular to the optical axis, and the second average image plane is disposed at an average position of the defocusing positions, where through focus modulation transfer rates of the infrared light (values of MTF) at central field of view, 0.3 field of view, and 0.7 field of view of the optical image capturing system are at their respective maximum at the first spatial frequency of 110 cycles/mm;
    wherein only one lens among the sixth lens to the eighth lens has negative refractive power, the optical image capturing system has a maximum image height HOI perpendicular to the optical axis on the first image plane, focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a half maximum angle of view of the optical image capturing system is denoted as HAF, a distance on the optical axis from an object side of the first lens to the first average image plane is denoted as HOS, a distance on the optical axis from the object side of the first lens to an image side of the eighth lens is denoted as InTL, a distance on the optical axis between the first average image plane and the second average image plane is denoted as AFS, when a vertical height of ½HEP from the optical axis is smaller than a half maximum diameter of any one of the eight lenses, an outline curve starting from an intersection point of the optical axis and any surface of the any one of the eight lenses, travelling along an outline of the surface, and ending at a coordinate point on the surface which has the vertical height of ½HEP from the optical axis, has an outline curve length denoted as ARE, and conditions as follows are satisfied: 1≤f/HEP≤10, 0 deg<HAF≤60 deg, |AFS|≤100 μm, and 0.9≤2(ARE/HEP)≤2.0.

19. The optical image capturing system of claim 18, wherein a maximum effective half diameter of any surface of any one of the eight lenses is denoted as EHD, an outline curve starting from an intersection point of the optical axis and any surface of any one of the eight lenses, travelling along an outline of the surface, and ending at a final point which is the maximum effective half diameter position of the surface, has an outline curve length denoted as ARS, and a condition as follows is satisfied: $0.9 \leq ARS/EHD \leq 2.0$.

20. The optical image capturing system of claim 18, wherein there is an air gap between each lens among the eight lenses.

21. The optical image capturing system of claim 18, further comprising an aperture and an image sensing device, wherein the image sensing device is disposed on a rear side of first average image plane and is disposed with at least 100 thousand pixels, there is a distance InS on the optical axis from the aperture to the first average image plane, the following condition is satisfied: $0.2 \leq InS/HOS \leq 1.1$.

\* \* \* \* \*